US008877992B2

(12) United States Patent
Appel et al.

(10) Patent No.: US 8,877,992 B2
(45) Date of Patent: *Nov. 4, 2014

(54) METHODS AND APPARATUS FOR CONVERTING WASTE MATERIALS INTO FUELS AND OTHER USEFUL PRODUCTS

(75) Inventors: Brian S. Appel, West Hempstead, NY (US); Terry N. Adams, Seattle, WA (US); James H. Freiss, Stony Brook, NY (US); Craig T. Einfeldt, Collegeville, PA (US); William F. Lange, Wilmette, IL (US); Shannon M. Jones, Durham, NC (US)

(73) Assignee: AB-CWT LLC, West Hempstead, NY (US)

( * ) Notice: Subject to any disclaimer, the term of this patent is extended or adjusted under 35 U.S.C. 154(b) by 1336 days.

This patent is subject to a terminal disclaimer.

(21) Appl. No.: 12/140,899

(22) Filed: Jun. 17, 2008

(65) Prior Publication Data

US 2009/0062581 A1 Mar. 5, 2009

Related U.S. Application Data

(63) Continuation-in-part of application No. 12/037,914, filed on Feb. 26, 2008, now abandoned, and a continuation-in-part of application No. 11/529,825, filed on Sep. 29, 2006, now Pat. No. 7,771,699, and a continuation-in-part of application No. 10/717,076, filed on Nov. 18, 2003, now Pat. No. 8,003,833.

(60) Provisional application No. 60/458,520, filed on Mar. 28, 2003, provisional application No. 60/727,491, filed on Oct. 17, 2005, provisional application No. 60/778,034, filed on Feb. 28, 2006, provisional application No. 60/812,275, filed on Jun. 9, 2006, provisional application No. 60/840,207, filed on Aug. 25, 2006.

(51) Int. Cl.
*C07C 1/20* (2006.01)

(52) U.S. Cl.
USPC .......................................... 585/240; 585/241

(58) Field of Classification Search
None
See application file for complete search history.

(56) References Cited

U.S. PATENT DOCUMENTS 3,558,426 A 1/1971 Hess et al.
3,704,108 A 11/1972 Alpert
(Continued)

FOREIGN PATENT DOCUMENTS

CA 1093102 1/1981
CN 1392224 A 1/2003
(Continued)

OTHER PUBLICATIONS

Related U.S. Appl. No. 12/037,914, filed Feb. 26, 2008 entitled Methods and Apparatus for Converting Waste Materials Into Fuels and Other Useful Products.

(Continued)

*Primary Examiner* — Tam M Nguyen
(74) *Attorney, Agent, or Firm* — Downs Rachlin Martin PLLC

(57) ABSTRACT

Conversion of waste and other organic feedstock into sustainable energy, feed, fertilizer, and other useful products of reliable purities is accomplished using water, heat, and pressure. More specifically, the invention provides methods and apparatus that handle mixed streams of various feedstocks, e.g. agricultural waste, biological waste, municipal solid waste, municipal sewage sludge, and shredder residue, to yield gas, oil, specialty chemicals, and carbon solids that can be used as is or are further processed. Useful products can be diverted at various points of the process or internalized to enhance the efficiency of the system.

65 Claims, 19 Drawing Sheets
(7 of 19 Drawing Sheet(s) Filed in Color)

(56) References Cited

U.S. PATENT DOCUMENTS

| | | | |
|---|---|---|---|
| 3,733,255 A | 5/1973 | Appel et al. |
| 3,838,199 A | 9/1974 | Coe et al. |
| 3,946,679 A | 3/1976 | Varani |
| 4,002,438 A | 1/1977 | Fleming |
| 4,010,098 A | 3/1977 | Fassell |
| 4,054,590 A | 10/1977 | Gerberich |
| 4,057,401 A | 11/1977 | Boblitz |
| 4,089,773 A | 5/1978 | Espenscheid |
| 4,093,516 A | 6/1978 | Lang |
| 4,094,740 A | 6/1978 | Lang |
| 4,113,185 A | 9/1978 | Marsh et al. |
| 4,118,281 A | 10/1978 | Yan |
| 4,164,396 A | 8/1979 | Jones |
| 4,192,734 A | 3/1980 | Pavlica et al. |
| 4,260,473 A | 4/1981 | Bauer |
| 4,271,326 A | 6/1981 | Mego |
| 4,280,817 A | 7/1981 | Chauhan et al. |
| 4,289,625 A | 9/1981 | Tarman et al. |
| 4,298,621 A | 11/1981 | Samis et al. |
| 4,321,150 A | 3/1982 | McMullen |
| 4,321,151 A | 3/1982 | McMullen |
| 4,344,770 A | 8/1982 | Capaner et al. |
| 4,364,745 A | 12/1982 | Weil |
| 4,439,209 A | 3/1984 | Wilwerding et al. |
| 4,515,659 A | 5/1985 | Wingfield, Jr. et al. |
| 4,552,621 A | 11/1985 | Lyakhevich et al. |
| 4,578,163 A | 3/1986 | Kunter et al. |
| 4,618,735 A | 10/1986 | Bridle et al. |
| 4,636,318 A | 1/1987 | Baker |
| 4,657,681 A | 4/1987 | Hughes et al. |
| 4,755,300 A | 7/1988 | Fischel et al. |
| 4,795,841 A | 1/1989 | Elliott et al. |
| 4,842,692 A | 6/1989 | Baker |
| 4,842,728 A | 6/1989 | Baker |
| 4,871,426 A | 10/1989 | Lechert et al. |
| 4,871,462 A | 10/1989 | Fischel et al. |
| 4,891,459 A | 1/1990 | Knight et al. |
| 4,897,205 A | 1/1990 | Landry et al. |
| 4,923,604 A | 5/1990 | Baker |
| 4,935,038 A | 6/1990 | Wolf |
| 4,938,876 A | 7/1990 | Ohsol |
| 4,941,952 A | 7/1990 | Betz |
| 4,950,309 A | 8/1990 | Schulz |
| 4,971,703 A | 11/1990 | Sealock, Jr. et al. |
| 4,980,029 A | 12/1990 | Bolz et al. |
| 4,981,579 A | 1/1991 | Paspek et al. |
| 5,221,357 A | 6/1993 | Brink |
| 5,269,947 A | 12/1993 | Baskis |
| 5,359,061 A | 10/1994 | Evans et al. |
| 5,360,553 A | 11/1994 | Baskis |
| 5,387,267 A | 2/1995 | Warf et al. |
| 5,389,258 A | 2/1995 | Smis et al. |
| 5,425,925 A | 6/1995 | Kline et al. |
| 5,466,383 A | 11/1995 | Lee |
| 5,485,728 A | 1/1996 | Dickinson |
| 5,498,827 A | 3/1996 | Khan et al. |
| 5,543,061 A | 8/1996 | Baskis |
| 5,608,136 A | 3/1997 | Maezawa et al. |
| 5,609,113 A | 3/1997 | Galipeault et al. |
| 5,636,580 A | 6/1997 | Kanis |
| 5,639,934 A | 6/1997 | Yamasaki et al. |
| 5,685,153 A | 11/1997 | Dickinson et al. |
| 5,711,235 A | 1/1998 | May et al. |
| 5,817,282 A | 10/1998 | Radlein et al. |
| 5,852,062 A | 12/1998 | Carpenter |
| 5,888,307 A | 3/1999 | Solheim |
| 5,891,926 A | 4/1999 | Hunt et al. |
| 6,172,275 B1 | 1/2001 | Tadauchi |
| 6,180,845 B1 | 1/2001 | Catallo et al. |
| 6,197,081 B1 | 3/2001 | Schmidt |
| 6,387,221 B1 | 5/2002 | Schoenhard |
| 6,465,707 B1 | 10/2002 | Procida |
| 6,504,068 B1 | 1/2003 | Matsubara et al. |
| 6,548,560 B1 | 4/2003 | Kovalak et al. |
| 6,699,708 B1 | 3/2004 | Muller et al. |
| 6,822,126 B2 | 11/2004 | Miller |
| 6,905,600 B2 | 6/2005 | Lee, Jr. |
| 7,179,379 B2 | 2/2007 | Appel et al. |
| 7,301,060 B2 | 11/2007 | Appel et al. |
| 7,476,296 B2 | 1/2009 | Appel et al. |
| 8,003,833 B2 | 8/2011 | Lange et al. |
| 2002/0010222 A1 | 1/2002 | Sendijarevic |
| 2002/0185447 A1 | 12/2002 | Blount |
| 2003/0121851 A1 | 7/2003 | Lee, Jr. |
| 2003/0153797 A1 | 8/2003 | Percell |
| 2003/0212851 A1 | 11/2003 | Drescher et al. |
| 2004/0192980 A1 | 9/2004 | Appel et al. |
| 2004/0192981 A1 | 9/2004 | Appel et al. |
| 2005/0113611 A1 | 5/2005 | Adams et al. |
| 2006/0231510 A1 | 10/2006 | Benachenhou |
| 2007/0098625 A1 | 5/2007 | Appel et al. |
| 2009/0062581 A1 | 3/2009 | Appel et al. |
| 2011/0306808 A1 | 12/2011 | Appel et al. |

FOREIGN PATENT DOCUMENTS

| | | |
|---|---|---|
| DE | 4313123 A1 | 1/1995 |
| EP | 0204354 | 12/1986 |
| EP | 0204354 A1 | 12/1986 |
| EP | 1117463 B1 | 7/2002 |
| JP | 53049855 A | 5/1978 |
| JP | 58156023 A | 9/1983 |
| JP | 59047292 A | 3/1984 |
| JP | 09201590 | 8/1997 |
| JP | 2001137812 | 2/2001 |
| JP | 2002018393 | 1/2002 |
| RU | 2022666 | 11/1994 |
| RU | 2169075 | 6/2001 |
| RU | 2185892 | 7/2002 |
| SU | 1087077 | 3/1972 |
| SU | 727152 | 4/1980 |
| WO | 9406721 | 3/1994 |
| WO | 9521903 | 8/1995 |
| WO | 0013811 | 3/2000 |
| WO | 2004087619 | 10/2004 |
| WO | 2008073186 | 6/2008 |
| WO | 2009108761 | 9/2009 |

OTHER PUBLICATIONS

Related U.S. Appl. No. 11/529,825, filed Sep. 29, 2006 entitled Depolyermization Process of Conversion of Organic and Non-Organic Waste Materials Into Useful Products.

Restriction Requirement dated Jun. 9, 2008, in related U.S. Appl. No. 11/529,825.

Response to Restriction Requirement dated Oct. 9, 2008, in related U.S. Appl. No. 11/529,825.

First Office Action dated Nov. 13, 2008, in related U.S. Appl. No. 11/529,825.

Response to First Office Action dated May 13, 2009, in related U.S. Appl. No. 11/529,825.

International Search Report and Written Opinion dated May 13, 2008, in related International Application No. PCT/US05/34881.

International Search Report and Written Opinion dated Jan. 16, 2008, in related International Application No. PCT/US06/38024.

International Search Report and Written Opinion dated Apr. 14, 2009, in related International Application No. PCT/US09/35258.

Restriction Requirement dated Dec. 1, 2006, in related U.S. Appl. No. 10/716,839 now U.S. Patent No. 7,476,296.

Response to Restriction Requirement dated Feb. 5, 2007, in related U.S. Appl. No. 10/716,839 now U.S. Patent No. 7,476,296.

Office Action dated Apr. 4, 2007, in related U.S. Appl. No. 10/716,839 now U.S. Patent No. 7,476,296.

Response to Office Action dated Oct. 4, 2007, in related U.S. Appl. No. 10/716,839 now U.S. Patent No. 7,476,296.

Final Office Action dated Nov. 9, 2007, in related U.S. Appl. No. 10/716,839 now U.S. Patent No. 7,476,296.

Response to Office Action dated Apr. 9, 2008, in related U.S. Appl. No. 10/716,839 now U.S. Patent No. 7,476,296.

Office Action dated Jun. 23, 2008, in related U.S. Appl. No. 10/716,839 now U.S. Patent No. 7,476,296.

(56) References Cited

OTHER PUBLICATIONS

Response to Office Action dated Jul. 17, 2008, in related U.S. Appl. No. 10/716,839 now U.S. Patent No. 7,476,296.
Notice of Allowance dated Sep. 12, 2008, in related U.S. Appl. No. 10/716,839 now U.S. Patent No. 7,476,296.
Office Action dated Feb. 22, 2006, in related U.S. Appl. No. 10/716,837 now U.S. Patent No. 7,179,379.
Response to Office Action dated Aug. 22, 2006, in related U.S. Appl. No. 10/716,837 now U.S. Patent No. 7,179,379.
Notice of Allowance dated Oct. 12, 2006, in related U.S. Appl. No. 10/716,837 now U.S. Patent No. 7,179,379.
Restriction Requirement dated Jul. 27, 2006, in related U.S. Appl. No. 10/957,540 now U.S. Patent No. 7,301,060.
Response to Restriction Requirement dated Sep. 20, 2006, in related U.S. Appl. No. 10/957,540 now U.S. Patent No. 7,301,060.
Office Action dated Dec. 13, 2006, in related U.S. Appl. No. 10/957,540 now U.S. Patent No. 7,301,060.
Terminal Disclaimer dated Dec. 20, 2006, in related U.S. Appl. No. 10/957,540 now U.S. Patent No. 7,301,060.
Response to Office Action dated Apr. 13, 2007, in related U.S. Appl. No. 10/957,540 now U.S. Patent No. 7,301,060.
Notice of Allowance dated Jul. 24, 2007, in related U.S. Appl. No. 10/957,540 now U.S. Patent No. 7,301,060.
Terminal Disclaimer dated Dec. 20, 2006, in related U.S. Appl. No. 10/954,691.
Restriction Requirement dated Feb. 4, 2008, in related U.S. Appl. No. 10/954,691.
Response to Restriction Requirement dated Mar. 4, 2008, in related U.S. Appl. No. 10/954,691.
Office Action dated May 14, 2008, in related U.S. Appl. No. 10/954,691.
Response to Office Action dated Oct. 14, 2008, in related U.S. Appl. No. 10/954,691.
Second Office Action dated Nov. 20, 2008, in related U.S. Appl. No. 10/954,691.
Response to Second Office Action dated May 20, 2009, in related U.S. Appl. No. 10/954,691.
Restriction Requirement dated Oct. 4, 2005, in related U.S. Appl. No. 10/717,076.
Response to Restriction Requirement dated Nov. 4, 2005, in related U.S. Appl. No. 10/717,076.
Office Action dated Jan. 26, 2006, in related U.S. Appl. No. 10/717,076.
Response to Office Action dated Apr. 5, 2006, in related U.S. Appl. No. 10/717,076.
Final Office dated Jun. 28, 2006, in related U.S. Appl. No. 10/717,076.
Response to Final Office Action dated Sep. 20, 2006, in related U.S. Appl. No. 10/717,076.
Response to Final Office Action Refiled dated Oct. 18, 2006, in related U.S. Appl. No. 10/717,076.
Advisory Action dated Nov. 15, 2006, in related U.S. Appl. No. 10/717,076.
Notice of Appeal Terminal Disclaimer dated Dec. 20, 2006, in related U.S. Appl. No. 10/717,076.
Restriction Requirement dated May 10, 2007, in related U.S. Appl. No. 10/717,076.
Response to Restriction Requirement dated Nov. 13, 2007, in related U.S. Appl. No. 10/717,076.
Statement of Relatedness dated Feb. 7, 2008, in related U.S. Appl. No. 10/717,076.
Restriction Requirement dated Feb. 6, 2008, in related U.S. Appl. No. 10/717,076.
Response to Restriction Requirement dated May 6, 2008, in related U.S. Appl. No. 10/717,076.
Restriction Requirement dated Sep. 3, 2008, in related U.S. Appl. No. 10/717,076.
Response to Restriction Requirement dated Oct. 22, 2008, in related U.S. Appl. No. 10/717,076.
Office Action dated Jan. 12, 2009, in related U.S. Appl. No. 10/717,076.
Response to Office Action dated Jun. 12, 2009, in related U.S. Appl. No. 10/717,076.
Supplementary European Search Report dated Apr. 29, 2011, in related European Patent Application No. 04758275.4.
Supplementary European Search Report dated Jun. 20, 2011, in related European Patent Application No. 05803185.7.
First Examination Report dated Jun. 15, 2011, in Australian Patent Application No. 2006303016 in the name of AB-CWT, LLC.
First Examination Report dated Jul. 29, 2011, in Indian Patent Application No. 3485/CHENP/2007 in the name of AB-CWT, LLC.
First Examination Report dated Aug. 4, 2011, in European Patent Application No. 04758275.4 in the name of AB-CWT, LLC.
Notice of Allowance dated Jan. 11, 2010, with regard to related U.S. Appl. No. 10/954,691, filed Sep. 29, 2004; entitled Apparatus and Process for Separation of Organic Materials From Attached Insoluble Solids, and Conversion into Useful Products; ADAMS.
Final Office Action dated Jan. 21, 2011 in related U.S. Appl. No. 10/717,076.
Lemley, B., "Anything Into Oil", Discover, May 2003, pp. 51-57.
Staedter, T., "Garbage Into Oil", Technology Review, Jun. 2003 (www.technologyreview.com/articles/print_version/visualize0603.asp).
Elliott et al., "Liquid Hydrocarbon Fuels from Biomass," Amer. Chem. Soc., Div. Fuel Chem. Preprints (1989) 34 (4):1160-1166.
Matar et al., "Crude Oil Processing and Production of Hydrocarbon Intermediates," Chemistry of Petrochemical Processes (2001) Chapter Three, pp. 49-109.
Yoshida et al., "Production of Organic Acids and Amino Acids from Fish Meat by Sub-Critical Water Hydrolysis," Biotechnol. Prof. (1999) 15:1090-1094.
Raymus, "Handling of Bulk Solids and Packaging of Solids and Liquids," in Perry's Chemical Engineers' Handbook, 7th ed. (1997), pp. 21-5-21-10.
Rubio et al., "Overview of floatation as a wastewater treatment technique," Minerals Engineering (2002) 15:139-155.
Response to Final Office Action dated Mar. 21, 2011 in related U.S. Appl. No. 10/717,076.
Final Office Action dated Sep. 9, 2009 in related pending U.S. Appl. No. 11/529,825.
Examiner Interview Summary dated Oct. 14, 2009 in related pending U.S. Appl. No. 11/529,825.
Final Office Action dated Sep. 17, 2009 in related pending U.S. Appl. No. 10/717,076.
Third Office Action dated Aug. 31, 2009 in related pending U.S. Appl. No. 10/954,691.
Office Action dated Apr. 12, 2010 in related Japanese Patent Application No. 2006-509261.
Office Action dated Apr. 16, 2010 in related U.S. Appl. No. 10/717,076.
Amendment/Response to Office Action dated Oct. 18, 2010 in related U.S. Appl. No. 10/717,076.
Terminal Disclaimer dated Oct. 18, 2010 in related U.S. Appl. No. 10/717,076.
Response to Office Action dated Nov. 25, 2009, in related pending U.S. Appl. No. 10/954,691, filed Sep. 29, 2004.
Supplementary European Search Report received Nov. 5, 2009, in related pending European Patent Application No. 06815770.0.
Response to Final Office Action dated Nov. 17, 2009, in related pending U.S. Appl. No. 10/717,076, filed Nov. 18, 2003.
Notice of Allowance dated Nov. 19, 2009, in related pending U.S. Appl. No. 11/529,825, filed Sep. 29, 2006.
312 Amendment dated Nov. 24, 2009, in related pending U.S. Appl. No. 11/529,825, filed Sep. 29, 2006.
Notice of Allowance dated Apr. 1, 2011 in related U.S. Appl. No. 10/717,076.
Supplementary European Search Report dated Aug. 4, 2011, in EU Patent Application No. 09714171.7 filed in the name of AB-CWT, LLC.
"National Master Plan for Development of Waste-to-Energy in India," Technical Memorandum on Waste-to-Energy Technologies, URL:http://mnre.gov.in/nmp/technology-we.pdf. Dec. 31, 2004.

(56) References Cited

OTHER PUBLICATIONS

"Types of Anaerobic Digesters for Solid Wastes," by P. Vandevivere et al. Sep. 7, 2008, pp. 1-31.

"Granule Development in a Split-Feed Anaerobic Baffled Reactor," by P.J. Sallis et al. Bioresource Technology, vol. 89, pp. 255-265, Dec. 31, 2003.

"The Use of the Anaerobic Baffled Reactor (ABR) for Wastewater Treatment: A Review," by William P. Barber et al. Water Research, vol. 33, No. 7, pp. 1559-1578, Dec. 31, 1999.

"A Review of Current Status of Anaerobic Digestion Technology for Treatment of Municipal Solid Waste." Institute of Science and Technology Research and Development, Nov. 1998.

"Multi-Stage Digestion of Municipal Waste to Fuel Gas," by D.L. Wise et al. Resource Recovery and Conservation vol. 3, pp. 41-59, Dec. 31, 1977.

Translated Office Action in related Japanese Application No. 2007-534738 dated Nov. 10, 2011.

Translated Office Action in related Japanese Application No. 2007-534737 dated Nov. 11, 2011.

"Hydrothermal Processing of Biomass," by P.E. Savage, R.B. Levine and C.M. Huelsman, Thermochemical Conversion of Biomass to Liquid Fuels and Chemicals, RSC Energy and Environment Series No. 1, RSC Publishing, 2010, Chapter 8, pp. 192-221.

Translated Notice of Reasons for Rejection dated Mar. 1, 2012, in related Japanese Patent Application No. 2006-509261.

Translated Notice of Reasons for Rejection dated Mar. 12, 2012, in related Japanese Patent Application No. 2007-534738.

Office Action dated Mar. 27, 2012, in related Canadian Patent Application No. 2,582,351.

Office Action dated Mar. 28, 2012, in related Canadian Patent Application No. 2,582,364.

Translated Comments of Examiner in Office Action dated Apr. 5, 2012, in related Chinese Patent Application No. 200480013665.0.

Second Examination Report dated Jul. 5, 2012, in related Australian Patent Application No. 2006303016.

Restriction Requirement dated May 23, 2013, in connection with related U.S. Appl. No. 13/213,454, filed Aug. 19, 2011.

METHODS AND APPARATUS FOR CONVERTING WASTE MATERIALS INTO FUELS AND OTHER USEFUL PRODUCTS

CROSS-REFERENCES TO RELATED APPLICATIONS

The present application is a continuation-in-part of U.S. patent application Ser. No. 10/717,076, filed Nov. 18, 2003 and published as U.S. 2004-0192980, now U.S. Pat. No. 8,003,833 which claims the benefit of priority under 35 U.S.C. §119(e) to U.S. Provisional Application No. 60/458,520, filed Mar. 28, 2003, the contents of which are incorporated herein by reference in their entirety. The present application is also a continuation-in-part of U.S. patent application Ser. No. 11/529,825, filed Sep. 29, 2006 and published on May 3, 2007 as U.S. 2007-0098625, now U.S. Pat. No. 7,771,699 which claims the benefit of priority under 35 U.S.C. §119(e) to U.S. Provisional Application Nos. 60/721,836, 60/727,491, filed Oct. 17, 2005, 60/778,034, filed Feb. 28, 2006, 60/812,275, filed Jun. 9, 2006, and 60/840,207, filed Aug. 25, 2006, the contents of which are incorporated herein by reference in their entirety. The present application is a further continuation in part of U.S. patent application Ser. No. 12/037,914, filed Feb. 26, 2008, now abandoned which claims priority also to U.S. patent application Ser. No. 10/717,076 now U.S. Pat. No. 8,003,833. In addition, the present application is a continuation-in-part of U.S. patent application Ser. No. 10/954,691, filed Sep. 29, 2004 and published on May 26, 2005 as U.S. 2005-0113611 now U.S. Pat. No. 7,692,050 the contents of which are incorporated herein by reference in their entirety, which also claims priority to U.S. patent application Ser. No. 10/717,076 now U.S. Pat. No. 8,003,833, as a continuation-in-part. The present application is also related to U.S. patent application Ser. No. 10/716,839, filed Nov. 18, 2003, now U.S. Pat. No. 7,476,296; and Ser. No. 10/957,540, filed Sep. 30, 2004, now U.S. Pat. No. 7,301,060; and to U.S. Pat. No. 7,179,379 issued Feb. 20, 2007.

FIELD OF THE INVENTION

The present invention relates to methods and apparatuses for sustainable waste management and production of fuels and other useful materials therefrom.

BACKGROUND OF THE INVENTION

Due to the continuing depletion of fossil fuels, the emerging effects of $CO_2$ emissions, and the rising demands for energy, there is a greater need than ever for alternatives to traditional fossil fuels. The relatively high rate of waste production is another problem the world must grapple with. Waste management has become an increasingly complex matter as improvements in technology and recycling schemes are often not sufficient to counter growing waste production, obsolescence of existing waste management facilities, and shortage of space for the construction of new facilities.

Agricultural waste, biological waste, municipal sewage sludge (MSS), municipal solid waste (MSW), and shredder residue are amongst the types of waste being produced today. Agricultural waste, which includes waste from the food processing industry and agricultural industry, typically contain large amounts of water and are perishable, generating malodorous fumes in the process. When this type of waste is usually discarded, the deposit of these substances as landfill results in their decay, producing large amounts of nitrate/nitrite and methane gas which can then contaminate groundwater. Alternatively, such materials are sometimes incorporated into animal feed, thus potentially passing on pathogens and maintaining other undesirable characteristics in the food chain.

Proper management, handling, and disposal of biological waste are also imperative in the face of increasing population density. Nationally, hospitals are the major generators of medical waste, producing in excess of 500,000 tons each year in the United States. Many states concerned with the growing threat of Acquired Immune Deficiency Syndrome (AIDS) have caused more and more articles and materials to come under the definition of medical waste, which is expected to more than double the amount of medical waste being generated. The health and environmental dangers posed by biological waste mandate that special collection, transportation and disposal techniques be developed.

Municipal sewage sludge ("MSS"), by virtue of its origin, contains a large percentage of human waste and thus a high concentration of phosphates and nitrates, which are desirable components of fertilizer. However, the industrial wastes present in the sewage leaves highly toxic materials such as industrial solvents, heavy metals, behind in a sludge. When applied to the fields, the sludge releases both nutrients and high concentrations of toxic chemicals to the environment. Live pathogens also remain in the sludge and, when propagated, contaminate the soil and leach into groundwater. Disposal of the sludge is expensive and normally constitutes up to 50% of the total annual costs of wastewater treatment. The major sludge disposal options currently used include agricultural utilization, landfill, and incineration.

Wastewater treatment plants currently are designed to minimize sludge production and all efforts are taken to stabilize and reduce its volume prior to disposal or utilization. Furthermore, increasing sludge disposal costs and diminishing landfill capacities are continually driving interest in sludge drying. Although drying reduces the bulk and weight of sludge, thereby lowering the transport and disposal costs, it is a very energy intensive and expensive process. While numerous sludge processing options have been proposed and have the potential to convert a fraction of organic material into usable energy, only a few have been demonstrated to have a net energy yield at full scale.

Generally, municipal solid waste materials are landfilled and/or incinerated. Environmental restrictions on both landfills and incinerators demand that an alternative solid waste solution be implemented. The public outcry concerning pollution caused by incinerators has also halted construction of many new incinerator projects.

Treatment of industrial waste, namely shredder residue, likewise presents another challenge. Shredder residue generally consists of the nonmetallic content of the automobile and other materials (and their constituents), such as air conditioners, refrigerators, dryers, and dishwashers, the latter products being commonly known as white goods. The shredder industry recovers about 10-12 million tons/yr. of ferrous scrap, most of which is from shredded automobiles. However, for each ton of steel recovered, about 500 lbs. of shredder residue is produced. While many components of end-of-life automobiles, household and commercial appliances can be recycled, reused, or recovered, a significant portion is left over from the shredding process and finds its way into landfills. Disposal of shredder residue is made all the more difficult by the toxic materials found therein, e.g. cadmium, lead, mercury, and other heavy metals. Due to the limited amount of space available for landfill use and the increasing costs of hazardous waste disposal, an alternative solution is needed. The automotive and recycling industries are currently under pressure to devise ways of using shredder residue in a cost-effective and energy-efficient manner.

Although a number of waste management methods are currently employed, they are either impractical, generate further pollution, or are too costly in terms of energy and economics. Some of these methods include composting, incineration, disposal as landfill, agricultural application, and dumping at sea. As indicated in Table 1 below, each method is beset by various drawbacks.

TABLE 1

Prior Art Drawbacks

| Composting | Warehousing | Landfill Disposal | Agricultural Use | Marine Dumping |
|---|---|---|---|---|
| Pathogen Contamination | Limited Space Available Haulage/Transport Cost | Limited Space Available Leaching into Groundwater Greenhouse Emissions Haulage/Transport Cost | Heavy Metal Buildup Disease Transmission Haulage/ Transport Cost | Marine Life Poisoning |

Other recycling approaches to waste management, including incineration, biotreatment, pyrolyzers, and gasification have their own attendant problems. As case in point, biotreatment in the form of aerobic and anaerobic digestion requires long holding times, strict monitoring and control of operating conditions, e.g. oxygenation, pH, temperature, etc. for the selected microbes, specialized equipment, and generally results in non-uniform treatment and final products filled with pathogens. Additionally, bacteria that may have been developed to consume specific compounds will, when exposed to the waste substrate, activate alternative enzyme systems to consume other more easily processed compounds.

Incineration/combustion involves the use of equipment and parts to comply with toughened emission regulations. Large volumes of gas are produced and must be disposed of using large specialized equipment. Most conventional systems cannot process a variety of waste substrates, such as solid waste, which would oxidize too high up in the furnace, or high-moisture feedstocks, for which a tremendous amount of energy must be expended to remove the water content. As such, there is a great heat/energy loss to the system.

Pyrolyzers have been used to break down organic matter to gas, oils and tar, and carbonaceous materials. A pyrolyzer typically heats organic materials at high temperatures, about 400-500° C., with poor energy efficiency and little, if any, control over the product composition. Most waste materials, especially agricultural waste, are high in moisture. As with incineration, pyrolysis aims to boil off the water using a very energy intensive process. The typically large holding vessels used in pyrolysis results in significant interior temperature gradients, non-uniform waste treatment, and yields contaminated end products.

Gasification achieves a partial combustion of waste materials but, like pyrolysis, does not operate efficiently with wet waste as energy is expended to remove water from the feedstock. There is little control over the type or composition of products due to non-uniform treatment of the feedstock and the principal usable energy-containing products are gases that are not as useful as other products. Traditional thermal oxidation treatments also produce noxious gases and dioxins.

Both the products of pyrolysis and gasification methods, respectively, can contain unacceptably high levels of impurities, e.g. tar, asphalt, and have low calorie content. For instance, sulfur- and chlorine-containing waste yields sulfur-containing compounds, e.g., mercaptans, and organic chlorides in the end products. Typically, chlorinated hydrocarbons at levels of 1-2 ppm can be tolerated in hydrocarbons, but neither gasification nor pyrolysis methods can achieve such low levels with any reliability. Poor heat transfer, nonuniform treatment, and an energy intensive water removal process have generally limited pyrolysis methods and gasification approaches to only about 30% energy efficiency.

In recent years, methods as disclosed in U.S. Pat. Nos. 5,269,947, 5,360,553, and 5,543,061, have been developed to attempt to produce higher quality and more useful oils. However, such processes can have drawbacks. For example the disclosed processes may not adequately handle sulfur- and chlorine-containing compounds, or efficiently process wet waste substrates due to significant energy requirements and thus have not been widely commercialized. As illustrated by the foregoing, there remains a need for sustainable recycling processes that are sound from a technical, economic, and environmental perspective.

SUMMARY OF THE INVENTION

Methods and apparatus for generating sustainable energy, fuel, feed, fertilizer, specialty chemicals, and other useful products, from low value or waste feed streams are provided by the present invention. In some embodiments, a method involves preparing a slurry from a feedstock; heating the slurry at least to a first temperature under a first pressure to form a composition comprising an inorganic material, a liquid organic material, and water; separating the inorganic material, the liquid organic material, and water; and heating the liquid organic material to a second temperature higher than the first temperature under a second pressure higher than the first pressure to yield at least one product selected from the following: a fuel, a feed, a fertilizer, or a specialty chemical. In further embodiments, the method may comprise depolymerizing the slurry followed by hydrolyzing certain products of the depolymerization.

Methods and apparatus for treatment of waste materials are also provided by the invention. In some embodiments, the feedstock includes agricultural waste. In other embodiments, the feedstock includes municipal solid waste. In still other embodiments, the feedstock includes municipal sewage sludge. In yet other embodiments, the feedstock includes shredder residue.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

More particular descriptions of the invention are made by reference to certain exemplary embodiments thereof which are illustrated in the appended Figures. These Figures form a part of the specification. It is to be noted, however, that the appended Figures illustrate exemplary embodiments of the invention and therefore are not to be considered limiting in their scope.

DETAILED DESCRIPTION OF THE INVENTION

Figure 1:
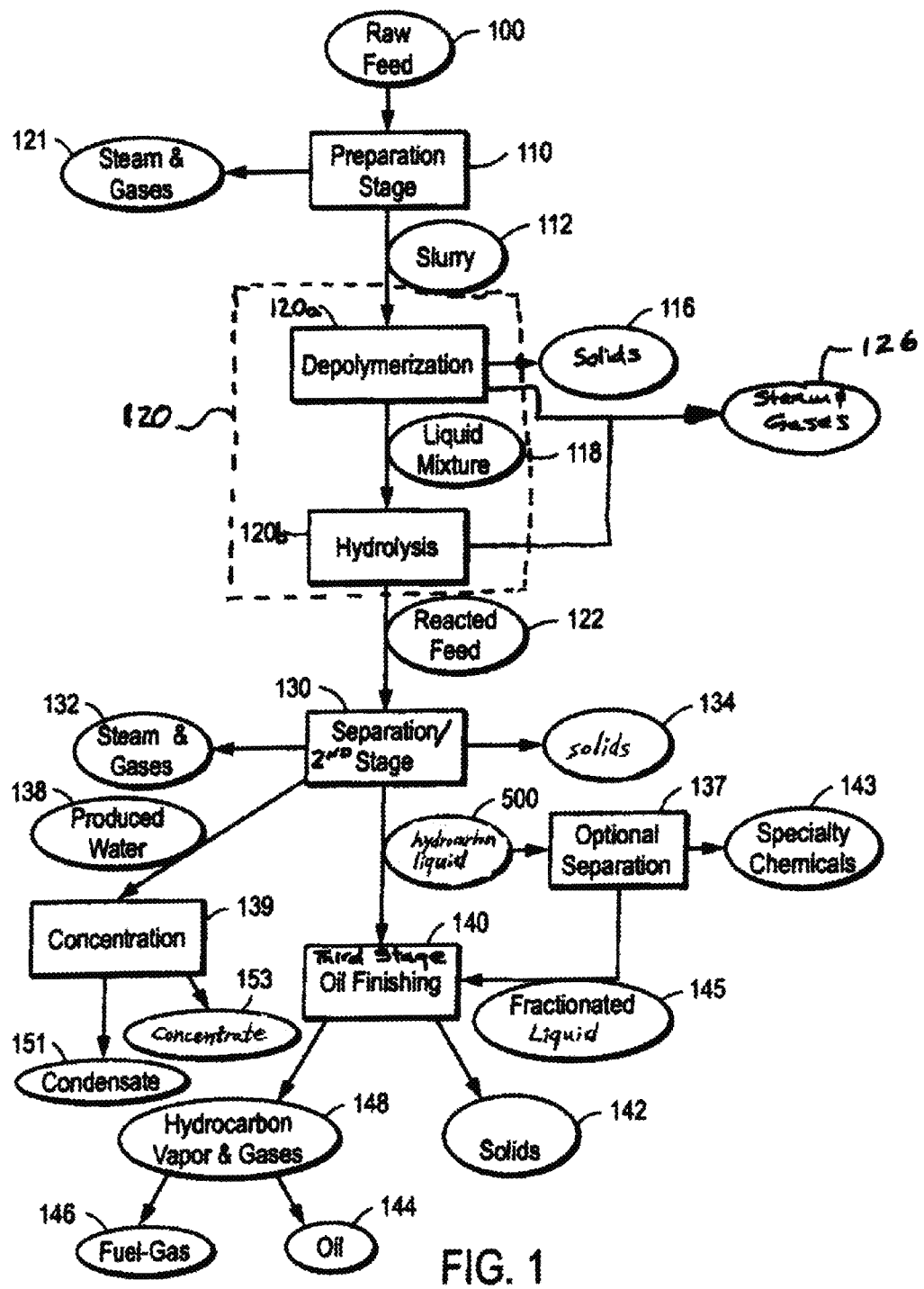
FIG. 1 is a flowchart illustrating an exemplary process according to the present invention.

Embodiments of the present invention provide new energy solutions that are sustainable both environmentally and economically. The processes described herein generate a panoply of products with a net energy value (NEV) superior to conventional processes such as traditional incineration/combustion, pyrolysis, gasification and present a waste management solution. Embodiments of the present invention have the ability to process foul and contaminated materials, such as agricultural waste, MSS, MSW, and shredder residue, which can be expensive and energy-intensive to dispose of, and convert these materials into useful products. Exemplary products from the inventive processes include hydrocarbon liquid suitable as a fuel, carbon solids, fuel oil, fuel gas, concentrate, and other useful intermediates optionally removed at various stages, which can be used directly or further processed into usable forms of energy, i.e. as a feed or as a fuel, and various specialty chemicals.

Another potential advantage of the instant invention is its ability to effectively process mixed and/or unsorted streams of a broad range of organic or carbon containing materials of heterogeneous size and convert these into useful products. The processes described herein are capable of processing various food processing and agricultural residues, even forest residues, in addition to byproducts of biochemical conversion process streams like distiller's grains from ethanol processing. These feedstocks exhibit significant differences in their handling characteristics, recalcitrance to conversion, and energy content, all factors that must be accommodated within a biorefinery context. The broad application of the present invention in light of the above difficulties further adds to its marvel and superiority over conventional technologies.

Unlike conventional methods, embodiments of the present invention can handle sulfur- and halogen-containing waste substrate yet still delivers products having very low levels of impurities, thus permitting direct use of the products without furthering processing. The assessment of a process's environmental benefit relies not only on the type of feedstock used but also on the energy efficiency of the process, which in turn dictates the NEV of the products produced therefrom. As such, the superior efficiency with which the methods and apparatus described herein handle wet feedstock, utilize the moisture content to help drive the process, and effectively sterilize the feedstock, should be noted.

DEFINITIONS

"Sustainable energy," as used herein, refers broadly to energy other than fossil fuels. Exemplary sources of sustainable energy include, but are not limited to, solar energy, water power, wind power, geothermal energy, wave energy, and energy produced from other sources, such as wastes and renewables.

The term "biomass," as used herein, refers to organic material derived from plants and animals.

The term "lignocellulosic" refers to a composition comprising both lignin and cellulose. Lignocellulosic material may also comprise hemicellulose.

The term "cellulosic" refers to a composition comprising cellulose.

As used herein, the term "organic feedstock" broadly refers to carbon compounds and any feedstock in which carbon compounds are found.

"Agricultural waste," as used herein, includes waste from the agricultural industries and food processing industries. Examples of items that can be found in waste from the agricultural industry are, without limitation, leftover crops, crop residuals, spoiled crops, weeds, pesticides, herbicides, animal manure, animal carcasses, animal milk, animal washings, farmyard scrapings, bedding material, mixed grasses, switchgrass, indiangrass, big bluestem, little bluestem, canada wildrye, virginia wildrye, and goldenrod wildflowers, distillers grains, rice straws, manure, and animal feed. Examples of items that can be found in waste from the food processing industry are, without limitation, waste from meat processing, e.g. from poultry, fish, cattle, swine, sheep, etc., such as fats, bones, feathers, DAF greases, etc., distillatory effluents and waste from seafood processing, particularly fish broth and fish viscera from seafood processing, which are separated and removed from fish and conventionally discarded during the processed seafood production process, but is not restricted to these portions. Such wastes often contain whole animals or large parts thereof.

As used herein, "biological waste" broadly includes medical and infectious wastes as well as any refuse, garbage, waste, etc. perceived to be capable of transmitting disease, or posing a biological hazard to humans or to selected living things. Biological waste may be encompassed within other types of wastes defined herein.

"Municipal sewage sludge" (MSS), as used herein, refers to the slurry left behind in a sewage treatment plant after its load of human and industrial chemical wastes have been bio-chemically treated and the wastewater discharged. Sewage sludge often comprise organic materials composed mainly of crude proteins, lipids and carbohydrates, and inorganic materials, comprising significant quantities of silt, grit, clay and lower levels of heavy metals.

As used herein, "municipal solid waste" (MSW) refers generally to solid waste typically collected as part of a municipal garbage collection system and typically includes, in combination, household wastes, food wastes, lawn wastes, office generated waste and may further include amounts of industrial generated wastes and scrap material. The term municipal solid waste also includes mixed wastes, such as typical unseparated household waste and source separated wastes such as organics generated by sewage treatment plants and food wastes generated by restaurants and some food processing facilities. Thus, depending on the source, MSW may have components similar to Agricultural Waste. Typically higher valve materials received in the garbage collection process, such as metals, are removed.

Figure 13:
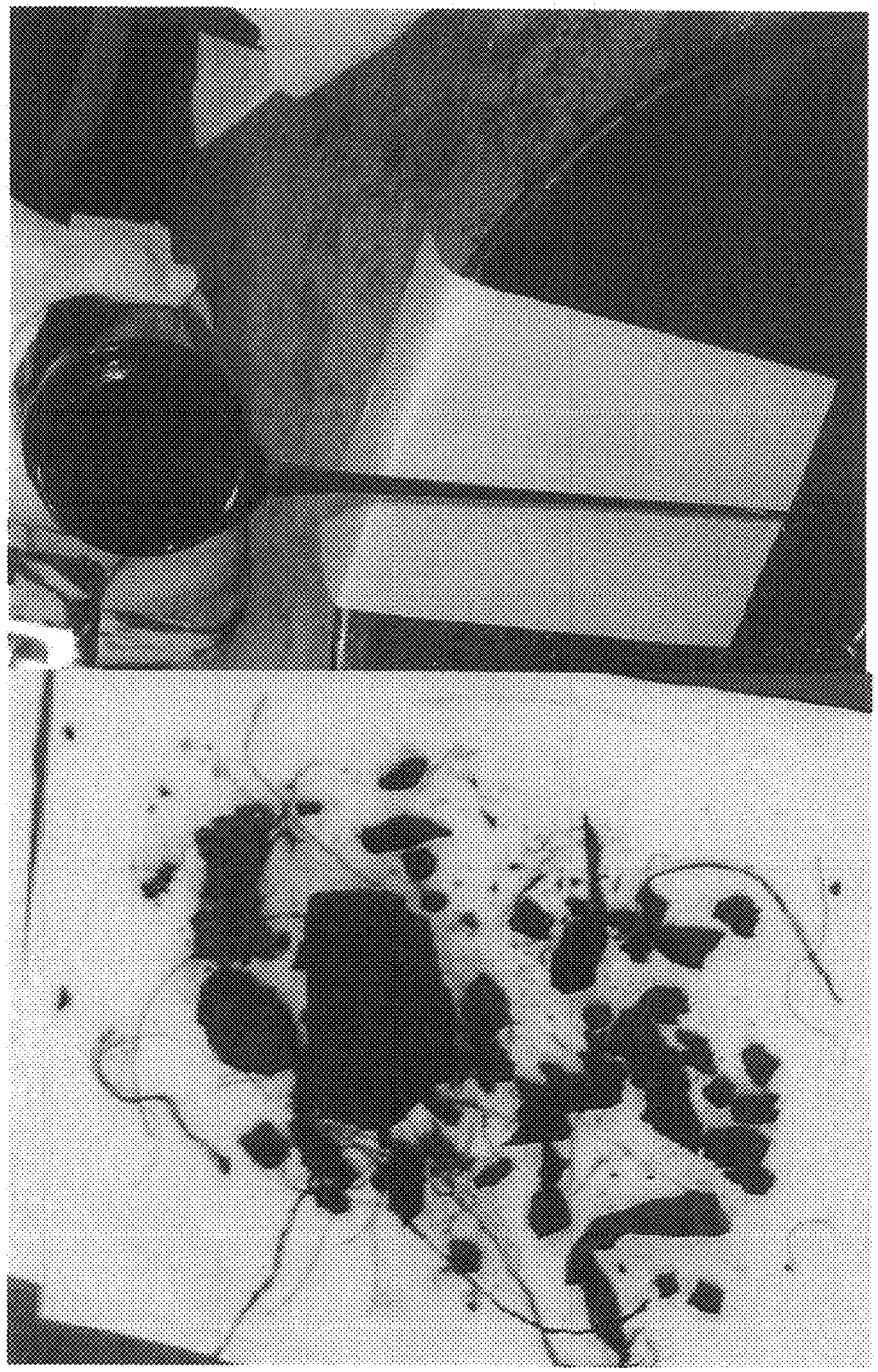
FIG. 13 depicts exemplary depolymerization products of a process according to an embodiment of the present invention as applied to shredder residue.
Figure 14:
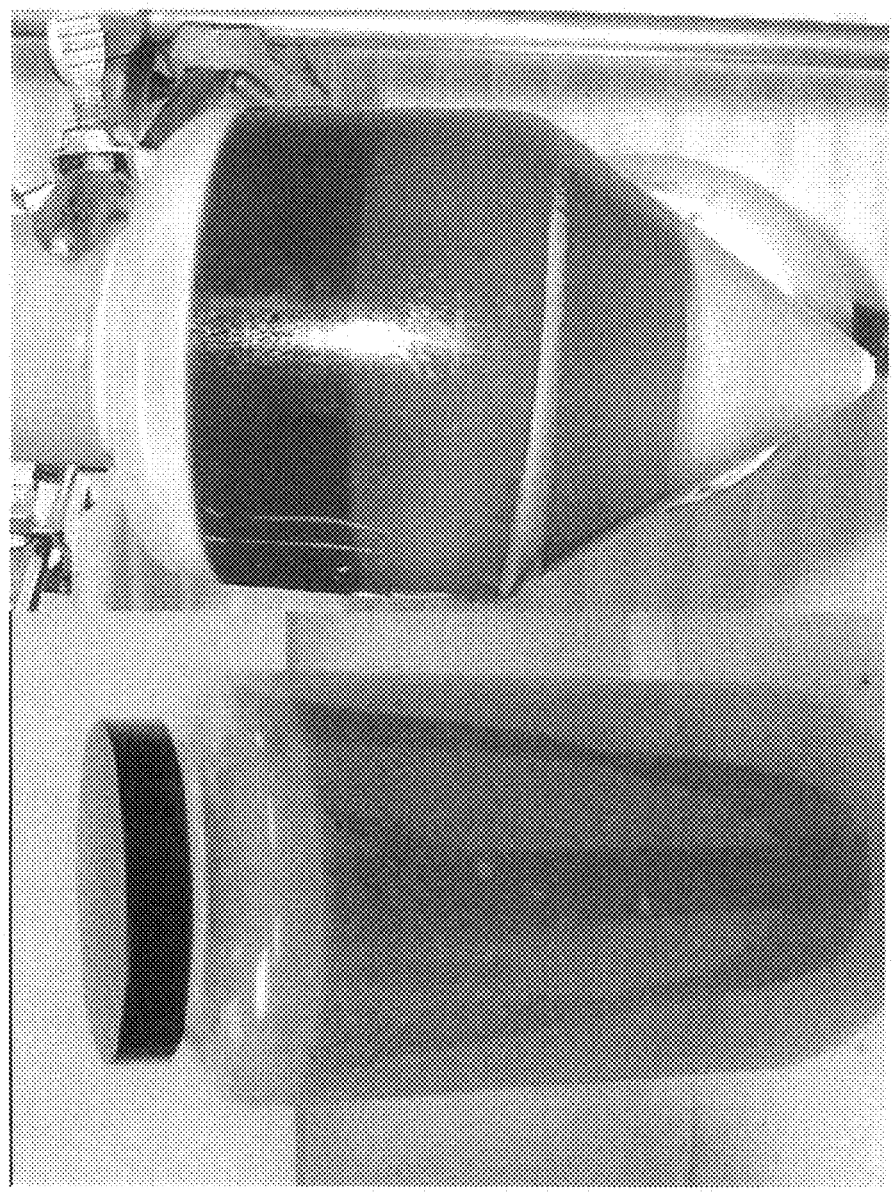
FIG. 14 depicts exemplary intermediate products of a process according to an embodiment of the present invention as applied to agricultural (animal based) waste.

"Shredder residue," abbreviated as "SR" and also known as shredder fluff, is the material remaining after metals and glass have been recovered from shredded or dismantled vehicles, white goods, consumer goods, etc. Without the benefit of the present invention, such materials typically go to landfill. Examples of "white goods" include washers, dryers, refrigerators, dishwashers, stoves, air conditioners, water heaters; the term as used herein also encompasses any appliances that can be salvaged for its metal content. Like other types of waste, shredder residue can be a relatively heterogeneous material and its composition varies from sample to sample. Shredder residue may contain, for example, fragments of plastics (thermoplastics, thermosets, and polyurethane foam (PUF)), rubber, wood, paper, elastomers, fabrics, glass, fines, residual ferrous and nonferrous metal pieces, paints, tar of different sizes. FIGS. 13 and 14 are photographs of SR samples. SR of old television sets and refrigerators, for instance, is likely to contain heavy metals or polychlorinated biphenyls (PCBs), a hazardous mixture of chlorinated compounds. Other toxic components potentially found in SR include polybrominated diphenyl ethers (PBDEs), which are commonly used as flame retardants and chemically similar to PCBs, and phthalates, which are found in polyvinyl chloride (PVC), an important component in automobile manufacturing.

It is to be understood that the terms react, reacting and reaction, when used in conjunction with embodiments of the present invention, can encompass many different types of chemical or physical changes. In particular, the term reaction can encompass a chemical change arising from the combination or association of two or more species that give rise to one or more products, and can encompass other types of decompositions or conversions that involve the breakdown or transformation of a single species, as induced by conditions of temperature, pressure, or impact of electromagnetic radiation, and can further encompass transformations involving a solvent.

OVERVIEW OF THE PROCESS

Embodiments of the present invention convert organic waste into fuel, feed, fertilizer, and other valuable products using water, heat, and pressure in various stages. Generally, the organic feedstock is prepared into slurry, then pumped and heated under pressure to separate the organic and inorganic materials contained in the slurry. Additionally, the organic liquid materials and solid particles may be subjected to higher temperature and pressure, wherein large complex organic molecules are split into smaller simpler molecules and hydrolyzed to yield a mixture of fuel, produced water, and smaller mineral particles. A mixture of hydrocarbon liquids, produced water, and mineral particles are separated based on feedstock and application specific considerations and optionally directed to further processing. A high level block diagram of exemplary embodiments of the invention is provided in FIG. 1 and more specific illustrations of exemplary embodiments of processes and apparatus are presented in subsequent figures and described in detail below.

Feed Preparation

Embodiments of the present invention can handle and process a mixed stream of waste materials without the need for presorting into pure streams. In some embodiments of the invention, as illustrated by the figures, raw feed 100, used synonymously herein with the term "feedstock," is subjected to a feed preparation step 110 before entering the first stage 120. See FIG. 1 and FIG. 3, inter alia. An objective of the feed preparation step is to increase flowability of the feed stock for improved handling, heat transfer and mixing, etc. in subsequent process steps. In some feedstocks this may be accomplished by reducing semi-solids in the feedstock to a size that can be consistently pumped (or metered) into the first stage 120. Other feedstocks may be already adequately sized and require only addition of an appropriate liquid agent.

Feed preparation is achieved through pulping, slurrying, mixing, and other grinding mechanisms, singly or in combination with preheating. Specific examples of slurrying devices include, without limitation, pulpers, in-line grinder, and maserators. A mixture of steam and gases 121 may be given off from feed preparation step 110 depending on process parameters. Feed preparation may involve adding water or other fluids and/or solvents to raw feed 100, depending on the moisture content or other chemical properties of the incoming waste substrate. Feed preparation generally may take place at ambient pressures and temperatures. However, in some alternative embodiments slightly elevated pressures or temperatures may be desired. For example, the prepared feed may be accumulated in a holding tank at temperatures in excess of about 120° F. but not so high as to prematurely initiate reactions. Elevated temperatures and pressures can help limit unwanted biological activity and introduction of contaminants at this stage.

The mixing or slurrying in feed preparation step 110 is not restricted to any particular grinding or feed rate as the system can employ buffer storage to minimize perturbations resulting from variations in feedstock quantity and initial product size. The slurry can either be transferred through a piping system into on-site storage tanks for later processing or immediately introduced into the process. This ability to prepare and store incoming waste prior to processing provides flexibility to accommodate high degrees of variability in the delivery times and composition of wastes.

As will be apparent from the following disclosure, embodiments of the present invention may utilize wet grinding to move material through pipes, tanks, and various equipment of the invention. Larger particles are conveyed through the process as mentioned above. Slurrying or wet grinding, as in the feed preparation step 110, reduces friction and energy consumption. In general, a minimal slurry moisture content of about 40% can be useful for optimal processing in embodiments described herein due to pump viscosity limitations. Those of ordinary skill will recognize that this minimum moisture content threshold can be shifted lower with the use of alternative pumping or conveying technology and depending on particular feedstock parameters. The energy efficiency of the processes described herein is fairly high since most of the water that enters the system leaves as a liquid rather than as vapor or gas. Addition of solvents may or may not be called for at this stage depending on feedstock and process parameters.

According to embodiments of the present invention, these incoming streams can be processed as is, while conventional methods, which function poorly with wet feedstock, typically aim to first remove the water as well as other contaminants. Embodiments of the present invention, however, use the water already in the feedstock to further enhance efficiency and to help remove contaminants and toxic chemicals from organic streams.

Apparatus

Figure 2:
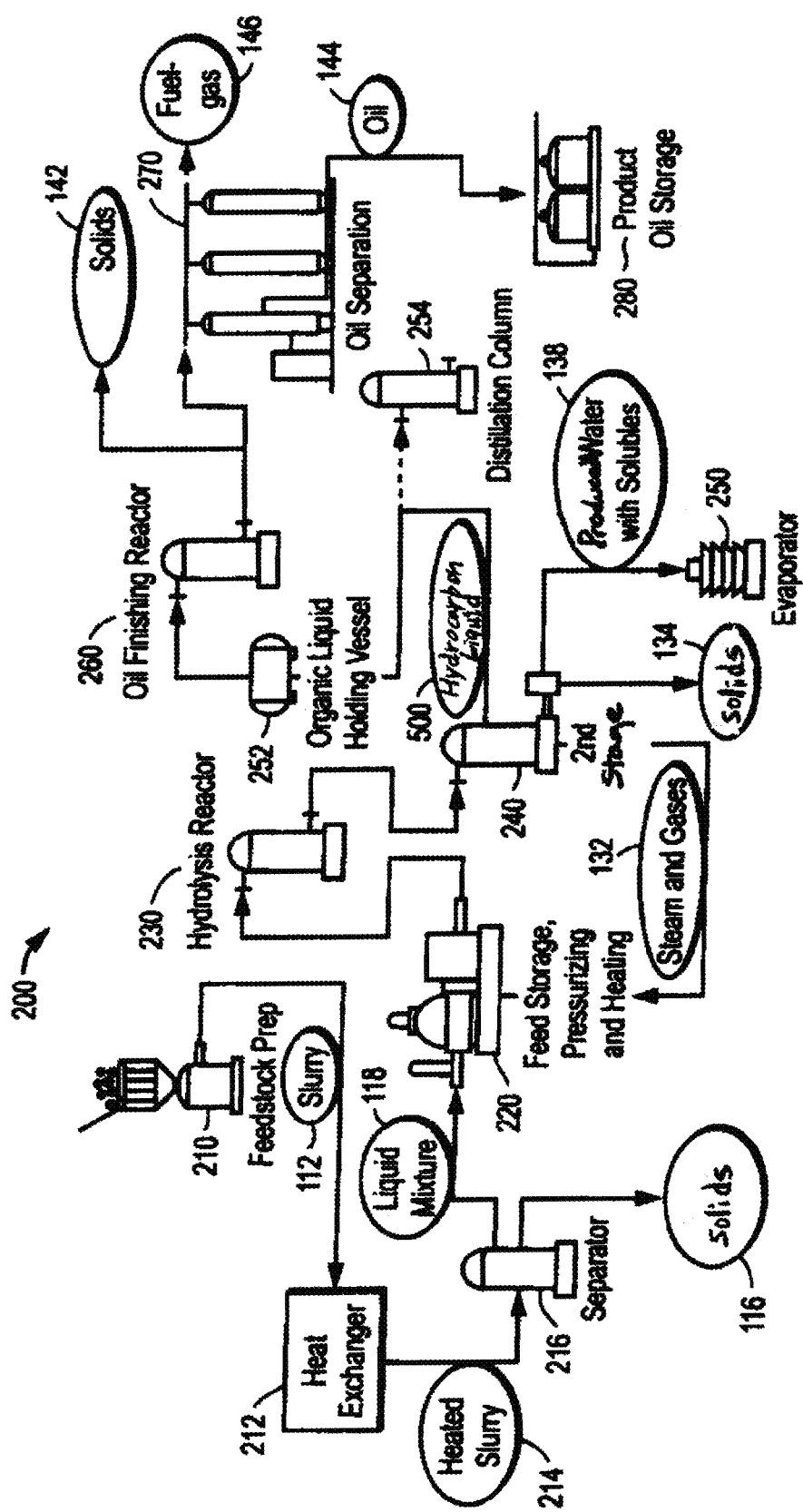
FIG. 2 is a schematic diagram depicting exemplary apparatuses used to perform an exemplary process of the present invention.

Feedstock preparation and slurrying can be carried out in a feedstock preparation apparatus 210, as diagramed in FIG. 2. Devices such as airlock devices in concert with screw conveyors can be employed to feed larger particles to the first stage reactors without the need for fine grinding. Initial raw material handling can be done using live bottom bins, conventional augured conveyors, and/or bucket elevators under ambient conditions. Vibratory screens may be used for fines scalping to remove loose dirt and debris if desired. The size to which the substances in the feedstock should be reduced will vary with the composition of the feedstock. For instance, with agricultural waste, a useful particle size is in the range of about ¼ inch to about 1 inch. In another example, with feedstock comprising primarily mixed plastics and rubber, the particle size can be dependent on the size reduction capabilities of the contracted shredder company. As another example, an embodiment of the apparatus provided herein is capable of handling larger size material such as whole tires. However, for practical considerations, a material size of about ¼ inch to about 6 inches is typical. In general, initial material size is largely dependent on the capacity and capability of the equipment. Upon exiting the feedstock preparation stage, particle size should be such that subsequent treatments are optimized as explained herein. In other embodiments of the invention, the feed preparation step may further comprise adding materials to, or driving materials off from the raw feed. Those of ordinary skill in the art will also readily appreciate that certain types of more fluid feedstock can be fed directly to the first stage decomposition 120a without detracting from the objects and advantages of the present invention.

First Stage Separation of Organic and Inorganic Waste: Decomposition

Referring to FIG. 1, the slurry 112 from the feed preparation step 110 is delivered to the first stage 120, and more specifically, first stage decomposition 120a, where it is heated and pressurized. The combined effect of temperature, pressure and time causes molecular breakdown of the feedstock. The first stage decomposition 120a thus effectively depolymerizes the feedstock by breaking down organic matter into simpler compounds and separating the bulk of organic and inorganic materials contained in the slurry. Decomposition 120a can therefore also be characterized as a depolymerization step. Various solids 116, including, for example, heavy-ash solids, minerals (e.g., calcium, phosphorous), fixed carbon and other carbonaceous materials in the slurry that are not hydrogen rich are removed at this stage and may be optionally directed to the finished product separation step 130 as will be described below. The removal of solids 116 at this stage allows for improved contact of the organic with water in the subsequent hydrolysis reaction 120b. Examples of organics remaining in liquid mixture 118 at this point include, but are not limited to, fats, protein, fiber, and various other hydrocarbons. Those of skill in the art will recognize that the composition of inorganic and organic matter will differ from batch to batch, depending on the nature of the feedstocks used.

In some embodiments of the invention, bulk/mineral separation is accomplished at this point in the process through a combination of hydrocyclonic separation and gravity decanting. The inorganic material or other solids thus separated out can optionally be committed to storage. Generally, first stage decomposition 120a can occur at a temperature range of from about 125° C. (~260° F.) to about 400° C. (~750° F.) depending on feedstock. However, temperature is preferably controlled for specific feedstock compositions to minimize or at least substantially eliminate formation of char, ash or unwanted reactions to the extent possible. Preferably no char or ash is formed. In exemplary embodiments, again depending on feedstock, the pressure ranges between about 20 psig to about 800 psig. The run time of this step will typically range from about 15 minutes to about 180 minutes. In certain embodiments, the average pH of the materials in this stage is about 6.5. On average, in exemplary embodiments of the invention, the temperature, pressure, and time are at or greater than about 150° C. (~300° F.), 100 psig and 30 minutes, respectively. As those of ordinary skill in the art will appreciate, run time will depend on the conditions employed, with as little as 15 minutes required at higher temperatures, and more than an hour at lower temperatures in the range.

Heating to such temperatures decreases the overall viscosity of the slurry and breaks down various components for further processing. For example, proteins are broken down into their shorter chain amino acid sequences or single amino acids. In SR type feedstocks, plastic and rubber compounds are melted, long chain molecules broken and solids such as fixed carbon and metals released. Such a reduction in viscosity also permits separation of attached insoluble solids 116 such as minerals, including, e.g. bone material, silica, etc. thereby yielding a liquid mixture 118 that subsequently enters first stage hydrolysis 120b. In exemplary embodiments, a large portion, if not the majority, of solid materials may be removed at this stage. First stage decomposition 120a also serves essentially as a pretreatment step for fiber where the hemicellulose hydrolyzes to sugars, halogens are solubilized in the water phase, and the minerals potentially are removed. Cellulose and lignin (the other fiber components) are assumed to be unconverted in the depolymerization reactions of the first stage.

Apparatus

In an exemplary implementation of first stage decomposition, as shown in FIG. 2, slurry 112 is passed through a heat exchanger 212 and into a reactor and/or separator vessel 216, which may serve as a decomposition/depolymerization reactor. Alternatively, decomposition or depolymerization may occur primarily in and just after heat exchanger 212, with vessel 216 then serving primarily as only a separator. The feed may be subjected to heating in and/or prior to reaching vessel 216 to produce a heated slurry that is pressurized. Such heating and pressurizing can be done using the vessel to retain the slurry, a pump for increasing the pressure of the slurry, and a heat exchanger to heat the slurry. Alternatively, rather than using separate components, heating, pressurizing, reacting and separating can occur in a single vessel.

Decomposition reactor designs can be implemented using simple existing technologies, e.g. batch or flow through jacketed reactors, as relatively low pressures are being utilized in the current process. Readily accessible devices such as vibratory screens, single and double screw presses, and off-the-shelf centrifugal machines can also be used to effectuate separation of the bulk/minerals. Those of ordinary skill in the art will appreciate that such separation can be achieved by gravity separation or can be achieved with other separation apparatus currently known or unknown in the art, e.g. a liquid/solid centrifuge, a screen, or a filter. One exemplary decomposition reactor 1014A is described below in connection with FIG. 7; another alternative is described below in connection with FIG. 19.

Figure 3:
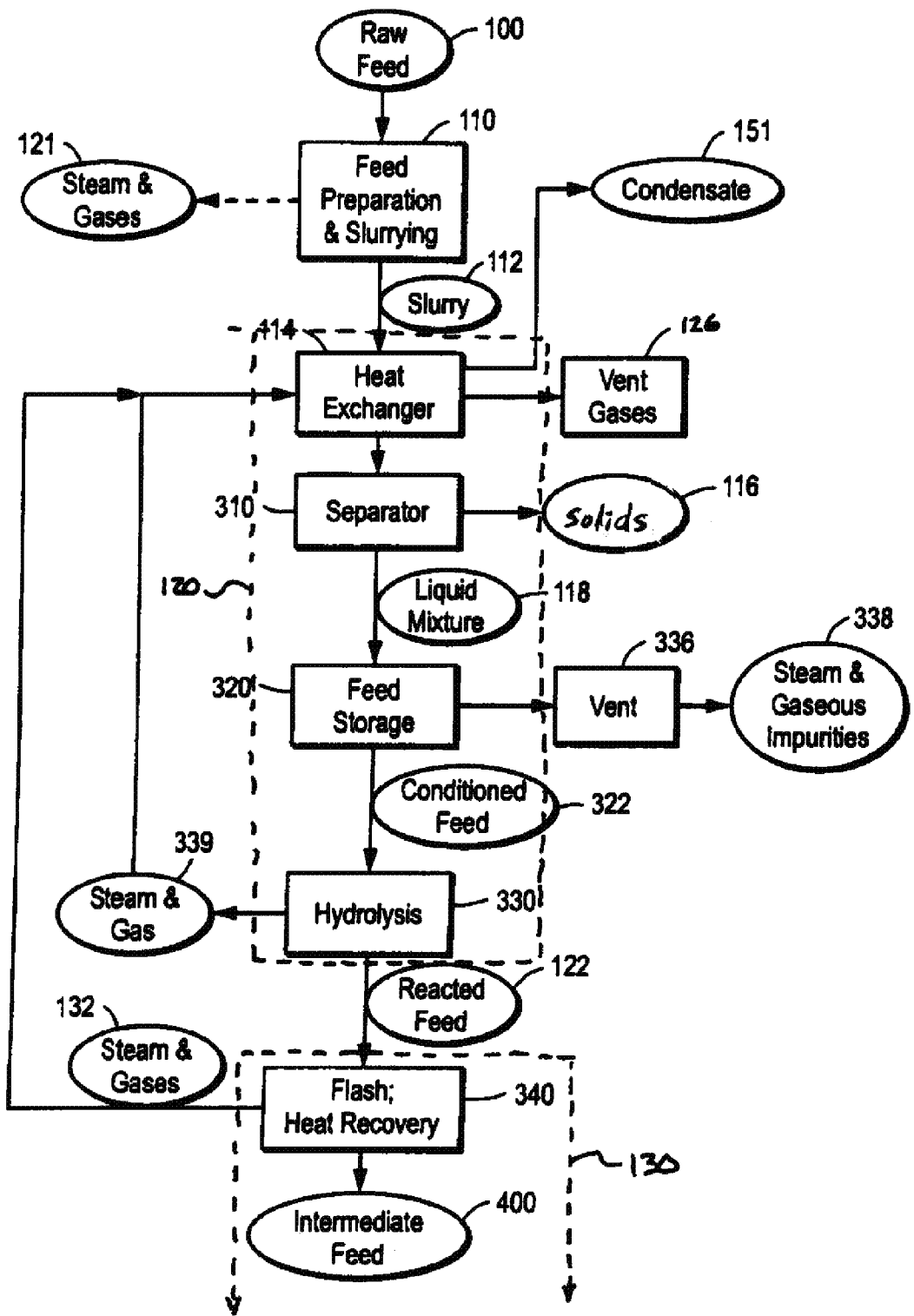
FIG. 3 is a flowchart illustrating a feed preparation stage through second stage of an embodiment of the present invention.

A further alternative embodiment of the apparatus is diagramed in FIG. 3 as applied to agricultural waste feedstock. However, such an apparatus may be utilized with other feedstocks with appropriate adjustment to process parameters as described herein. During first stage decomposition, slurry 112 may be transferred to feed storage 320 in a feed storage tank ("FST" or homogenizer) via a heat exchanger 114 where it is heated to break down proteinaceous material, including material attached to bones and other hard body parts in the mixture when feedstocks are animal by-products. Separator 310 separates the solids comprising minerals and bone material 116 from the liquid mixture 118. The liquid mixture, comprising a mixture of water and water-insoluble organic components and some trace minerals, is cooled and directed to the feed storage tank 320 ("FST" or homogenizer). The contents are heated to about 275-280° F. (~135° C.-140° C.) and subjected to pressure of about 50 PSI in order to produce conditioned feed 322, a relatively homogeneous feed suitable for passing to the hydrolysis reactor. Steam and gaseous impurities 338 may be vented 336.

An advantage of this embodiment is that degassing can occur in FST 320 to remove unwanted gaseous impurities early in the general process. Slurry 112 may remain in feed storage 320 for any convenient time until it is due to be further processed by the methods of the present invention. Preferably, FST 320 supplies a constant feed stream to a high-pressure slurry pump that pressurizes the feed and transports it to hydrolysis stage reactor 330.

Figure 4:
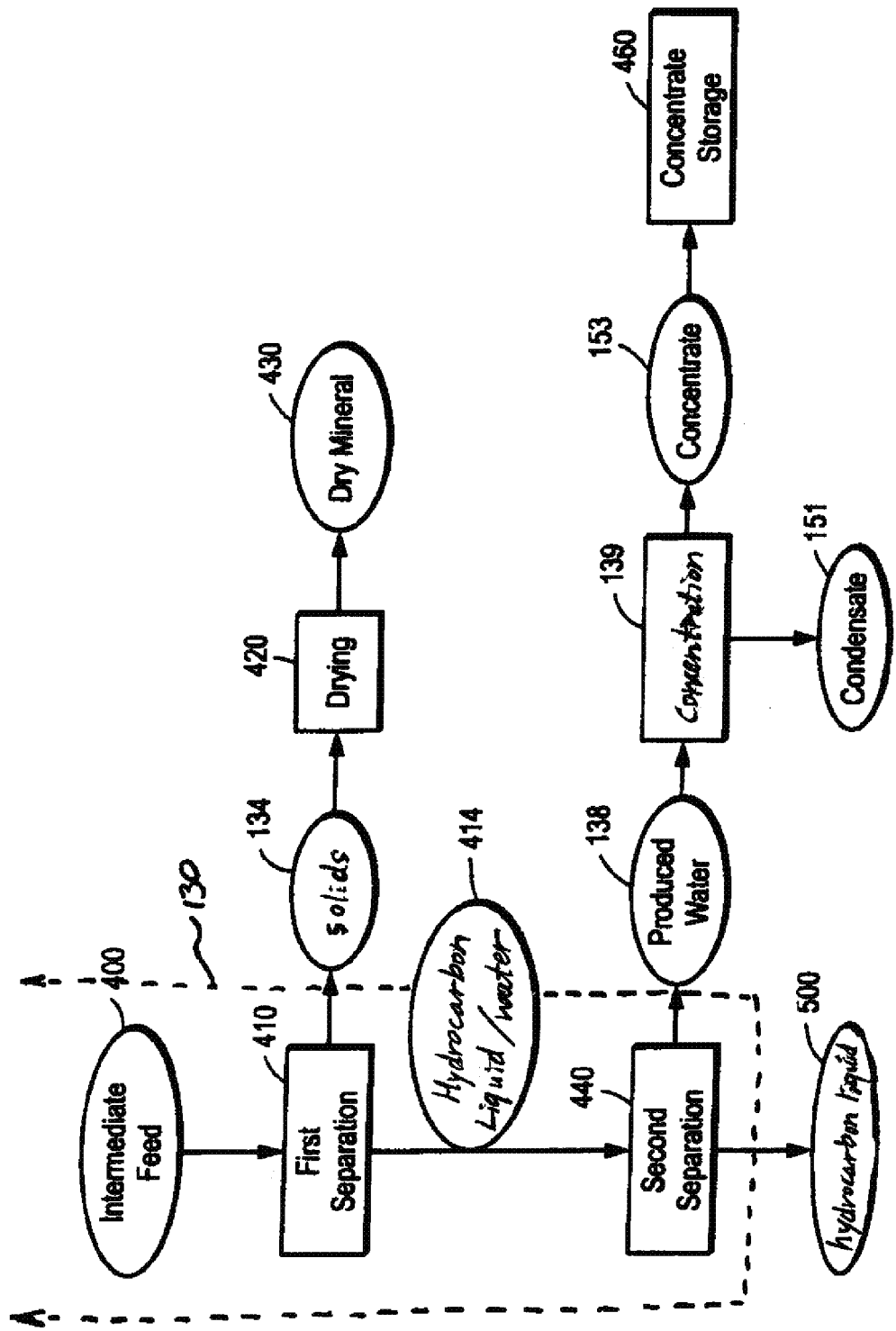
FIG. 4 is a flowchart illustrating a separation stage of an embodiment of the present invention.

In the heat exchanger 114, steam and gases also can be separated. The steam can be condensed and combined with condensate 151 (FIGS. 1 & 4). Preferably this condensate is redirected to combine with "produced water" that results from later stages of the process of the present invention, further described hereinbelow. Residual noncondensable vented gases may be combined with other gases that are produced by later stages of the process of the present invention to give fuel gas.

First Stage Conversion to Oil: Hydrolysis

As generally illustrated in FIG. 1, the organic liquid mixture 118, still potentially including some small mineral or other entrained solid particles, is delivered to first stage hydrolysis 120*b* and again subjected to high temperature and pressure to complete the breaking down of longer chain molecules in to shorter chains. The result is a reacted feed 122, i.e. a mixture of renewable fuel/oil, produced water, and fine entrained solids, the composition of which will be discussed in detail below in connection with the second or separation stage. Generally, first stage hydrolysis 120*b* is carried out at temperatures in the range from about 200° C. (~392° F.) to about 350° C. (~660° F.) so that at least one of a number of transformations or reactions may occur. For example, depending on feedstock composition, such transformations may include breaking of peptide linkages in proteins to yield individual amino acid residues (at about 150-220° C.), fat degradation into triglycerides, fatty acids, and glycerol (at about 200-290° C.), deamination and decarboxylation of amino acids, breaking of halogen and metal salt bonds and breaking of sulfur bonds. Those of ordinary skill in the art will readily appreciate that certain homogeneous feedstocks with little to no inorganic content, e.g. liquid raw feed, blood, etc., not requiring depolymerization can be fed directly to the first stage hydrolysis 120*b* without detracting from the objects and advantages of the present invention.

The carboxylic acid groups, if allowed to proceed to a further processing step, still attached to their respective amino acid moieties, are converted to hydrocarbons at relatively mild operating conditions. Typically, amino acid deamination occurs in the range of about 210-320° C. (~410-610° F.). Thus, substantially all of the proteins present in the slurry are converted to amino acids at hydrolysis operating temperatures. Partial degradation of lignin occurs even at lower temperatures, e.g. 250° C. (~480° F.), in the range provided above. Cellulose typically degrades at temperatures around 275° C. (~530° F.) and hemicellulose starts to degrade around 150° C. (~300° F.). As will be appreciated by those of ordinary skill in the art, the degree of amino acid deamination can be controlled by a judicious choice of operating temperature. The actual conditions under which the first stage hydrolysis reactor is run can be modified according to the feedstock employed. Run time of this step may take anywhere between about 30 min to about 60 min, depending on the conditions employed.

The pressure in the first stage hydrolysis reactor is preferably selected to be close to the saturation pressure of the entrained water in the liquid mixture at the operating temperature in question. The saturation pressure is the pressure that needs to be applied at a given temperature to keep the water from boiling, and also depends on the presence and quantity of other gases in the purified feed slurry. The total pressure in the reactor is greater than the vapor pressure of the water in the slurry mixture, so that the water does not boil off. Typically, the pressure is adjusted by amounts up to, and in the range of, about 0-100 psi above saturation so that unwanted gases may be vented. Generally, the pressure may range between about 75 psig to about 800 psig.

As illustrated in FIG. 1, a mixture of steam and gaseous products 126 is also typically liberated from the slurry in first stage hydrolysis 120*b*. The reacted feed 122 resulting from this stage typically consists of a mixture of reacted solid products and a mixture of reacted liquid products. These various products may be characterized as an oil phase, a water phase, and a wet solid mineral phase. The water phase and the oil phase typically contain various dissolved organic materials. In some embodiments of the invention, the mixture of steam and gases 126 produced in the first stage 120 is separated by a condenser, and the steam is routed to pre-heat incoming slurry to enhance the energy efficiency of the system.

As previously stated, complex organic molecules are broken down into smaller simpler molecules and hydrolyzed during the first stage hydrolysis reaction. It is in this step that fats are fully or partially split into fatty acids and glycerol groups, some of the amino acids decarboxylated or deaminated, and lignin partially or fully degraded. Carbohydrates are largely broken down into simpler, water soluble, sugars.

Whatever proteins remained intact from the first stage decomposition will be generally broken down into constituent polypeptides, peptides, and amino acid subunits. Metals, metal salts and halogen ions also are freed under these conditions and reacted with water to facilitate their removal.

During first stage hydrolysis 120b, some degasification takes place in which, inter alia, partial removal of nitrogen and sulfur compounds occur. Also deamination and decarboxylation reactions can take place in which significant quantities of protein dissociate into products such as ammonia and carbon dioxide. Decarboxylation reactions can be disfavored in some circumstances as the amines produced tend to be water-soluble and volatile. As such, deamination reactions may be preferred to decarboxylation reactions under appropriate conditions, and the reacted liquid products obtained from the end of the first stage 120 typically include carboxylic acids where the feedstock comprises proteins and fats. Accordingly, since decarboxylation reactions typically occur at higher temperatures than deamination reactions, first stage hydrolysis 120b may be run at the lowest temperature possible at which fat molecules are split. Generally, hydrolysis can occur at a pH range from about 4 to about 8. Alternatively, the pH in the hydrolysis reaction can be adjusted to discourage decarboxylation reactions.

First stage hydrolysis 120b provides an environment for the removal of such gaseous impurities as ammonia, carbon dioxide, and sulfur-containing gases and venting of sulfur-containing gases from the breakdown of sulfur-containing moieties in the feedstock. Sources of sulfur may include various rubbers and protein molecules (which include cysteine and methionine residues). The combinatory effect of heat, pressure and time employed in this step also assures that any pathogens contained in the waste are destroyed. As such, embodiments of the present invention can be applied for the sterilization and treatment of biological waste.

Removal of halogen, metal salts, nitrogen and sulfur compounds at this stage, and the optional preheating step in feed preparation, prevents significant formation of organic nitrogen compounds, ammonia, and various sulfur compounds that might become undesirable components of the resulting hydrocarbons if allowed to proceed further along the system described herein.

Apparatus

In an exemplary embodiment of the present invention, first stage hydrolysis 120b may be performed in a hydrolysis reactor 230 shown in FIG. 2, which may comprise a multi-chamber vessel so that there is a narrow distribution of residence times of the constituent materials of the slurry. In alternative embodiments, the hydrolysis reactor can also be an augured reactor. In some embodiments, the heating and/or pressurizing of the slurry takes place in several stages ahead of the reactor vessel, for example in separate storage, pressurizing and heating unit 220. The reactor vessel may be equipped with baffles, and a multi-blade motorized stirrer that can simultaneously stir the slurry in each of the chambers. In one exemplary embodiment, the vessel has four chambers. The vessel should have sufficient strength to withstand pressure generated by the gas phase when the feed stream is subjected to operating conditions.

Second Stage: Separation

Referring to FIG. 1, reacted feed 122, which typically comprises at least one reacted liquid product and at least on reacted solid product and water, is fed to a second separation stage 130 to separate the components therein into steam and gases 132, produced water 13, hydrocarbon liquid or unfinished oil 500, and solids/minerals 134. The various components of reacted feed 122 can be separated, for example, by techniques described herein. Steam and gases 132 can be driven off and redirected to preheat incoming slurry.

Separation stage 130 may comprise one or more steps performed in series or simultaneously. In exemplary embodiments, the reacted feed first undergoes a solid/liquid separation then a liquid/liquid separation. The order of solid/liquid separation and liquid/liquid separation can be rearranged but, as recognized by those of ordinary skill in the art, the overall efficiency of the separation process may be affected. Mineral and other solid particles that were not removed during first stage 120 can be separated from the liquids by decanting, and the renewable oil and produced water separated using a centrifuge or by gravity separation. Once substantially isolated, the hydrocarbon liquid or unfinished oil can be piped into storage tanks and held for storage or further refined or processed into higher-value products.

In some embodiments of separation stage 130, as illustrated in FIG. 3, the reacted feed 122 is flashed to a lower pressure 340, and permitted to release excess heat back to the earlier heating stages. Typically, flashing is achieved through multiple pressure reductions, for example in two to three stages. The effect of flashing is to vent off remaining steam and gases 132 associated with the reacted feed. Dehydration via depressurization is efficient because water is driven off without using heat. The effective use of the excess heat is known as heat recovery, and represents a further advance of the process of the present invention.

After the reacted feed has been flashed 340, and heat has been recovered, the intermediate feed 400 still typically comprises at least one reacted liquid product, at least one reacted solid product, and water. The at least one reacted liquid product is typically a constituent of hydrocarbon liquid; the at least one reacted solid product typically comprises minerals. The intermediate feed preferably is substantially free of gaseous products.

FIG. 4 shows a sequence of separations that may be applied to the intermediate feed. It is another advantage of embodiments of the present invention that the intermediate feed resulting from first stage 120 may be subjected to one or more separation stages that remove minerals and water before processing in third stage or oil finishing step 140.

Intermediate feed 400, typically comprising hydrocarbon liquid, water, and some minerals or other contaminated solids is preferably subjected to a first separation 410 that removes most minerals and solids 412 and produces a mixture of hydrocarbon liquid and water 414. Such a separation may be characterized as a solid/liquid separation and may be achieved with a first centrifuge or via other known solid/liquid separation devices. Minerals and other solids 412 that are separated out are typically wet and thus may be subjected to a drying stage 420 before passing to a dry mineral storage 430. Drying typically takes place under normal atmospheric conditions. The resulting dry minerals may find considerable commercial application as a soil amendment or other industrial precursor.

The hydrocarbon liquid/water mixture 414 is subject to a second separation 440 to drive off the water and leave the hydrocarbon liquid 500. Such a second separation may be achieved using a second liquid/liquid centrifuge, gravity separation column or other separation device. Differences in the specific gravity allow centrifugal separation of the produced water and hydrocarbon liquid. The produced water 138 that is driven off typically contains significant amounts of dissolved small organic molecules such as glycerol and some water soluble amino acids that derive from the breakdown of proteins. The produced water also typically includes ash, chloride, and other impurities. Separating out such impurities prior to the oil finishing reactions when thermal-chemical platforms are used as described below represents an additional benefit of the present invention because later products are thereby not contaminated, which enhances the combustibility of the fuels produced.

The produced water 138 may be subject to concentration 139, such as by evaporation, producing a water condensate 151 that may be recycled within the process of the present invention, and a concentrate 153 that is dispatched to a concentrate storage 460. Evaporation is typically achieved by application of a slight vacuum. With feedstocks that yield a concentrate 153 largely comprising a slurry of amino acids, glycerol and, potentially ammonium salts such as ammonium sulfate or phosphate, the produced water will typically have commercial value as, for example, fertilizers known as "fish solubles" that are sold in domestic garden stores.

It is to be understood that the present invention is not limited to a separating stage comprising two steps. Nor is the present invention limited by the order in which any separation steps are carried out. Thus, it is consistent with the present invention if the separation of the intermediate feed 400 into products such as hydrocarbon liquid, minerals, and water occurs in a single step or in more than two steps.

Apparatus

Referring to the exemplary apparatus of FIG. 2, the flashing of the reacted feed second stage can be achieved in one or more flash vessels 240 with vents. Preferably the pressure in the flash vessel 240 is considerably lower than that in the hydrolysis reactor 230. In one embodiment, the pressure in the flash vessel is about 300 psig, where the pressure in the hydrolysis reactor is around 600 psig.

Various equipment can be used to achieve separation of the materials that come out of the first stage hydrolysis reactor 230. Such separations provide a mixture of steam and gases 132, hydrocarbon liquid 500, minerals 134, and produced water with solubles 138. Steam and gases 132 are preferably diverted back to the preparation stage to assist with feed heating.

Separation of the solids or particulate from the hydrocarbon liquid and water can be achieved with centrifuges, hydrocyclones or with a static tank. Drying of the minerals 134 can be achieved with, for example, a drying kiln or other mineral drier such as a "ring" dryer. In alternate embodiments, separation can be facilitated by adding agents to break up the emulsions or other unwanted combinations.

Produced water 138 with solubles resulting from the separation of the hydrocarbon liquid from the water, can be concentrated in a conventional evaporator 250. The hydrocarbon liquid 500 that has been separated from the minerals and the water may be contained in a hydrocarbon liquid holding vessel 252 prior to transfer to the an optional third stage or oil finishing reactor 260. Such a holding vessel may be an ordinary storage vessel as is typically used in the industry.

Based on the teachings contained herein, a person of ordinary skill in the art may optionally include in the second stage separation centrifuges, hydrocyclones, distillation columns, filtration devices, and screens. It will also be understood that distillation can be employed to remove very fine carbon solids from an intermediate feed 400. In general, further pressure reduction recovers more steam, and facilitates solid/liquid separation to recover minerals and other solids.

Useful Products and Third Stage: Oil Finishing

Products and intermediates of the invention described above can optionally be used as is or subjected to further processing, as can be discerned by those of ordinary skill in the art directed by the present disclosure. For example, hydrocarbon oil bearing similar constituency to a #4 diesel oil can be produced with minimal oil finishing 140, essentially consisting of on-site processing to further separate oil and residual water and particulate fractions from the hydrocarbon liquid 500. Such minimal processing may be characterized as oil polishing and may comprise gravity decanting and/or dehydrating with heat to achieve minimal moisture content. Additional fine filtering, such as bag filters, may be used to achieve further particulate removal as necessary.

In some embodiments, as indicated in FIG. 1, some or the entire portion of hydrocarbon liquid 500 can optionally be directed for processing ahead of the oil finishing stage 140 to yield one or more specialty chemicals 143. For example, a portion of hydrocarbon liquid 500 may be diverted to an optional separation step 137 to form specialty organic chemicals 143 such as fatty acids or amino acids, e.g. via fractional distillation. The hydrocarbon liquid that is subjected to fractional distillation is typically distilled in a distillation column 254 (FIG. 2). The hydrocarbon liquid may be subjected to an acid wash to separate out trace amino acids before passing it to the distillation column. More volatile materials from the hydrocarbon liquid, such as fatty acids, are distilled off and collected. In some embodiments, any residual fractions, fractionated liquor 145, often called "heavy liquor," that comprises fractions not useful as specialty chemicals, can be redirected to third stage 140. Such residual fractions may contain non-volatilized fats and fat derivatives that are found in the bottom of the distillation column and can be passed on to an oil finishing stage reactor 260.

Optionally, the solids/minerals 134 isolated from separation 130 can be directed to a calciner to burn off any residual organic therefrom and be calcined. Other materials generated at various points of the process described herein, e.g. concentrated noncondensable gas, solid inorganic 116, and aqueous concentrate fuel, can likewise be routed to a calciner for further processing. In some embodiments, the calciner serves a dual function in producing calcined solids and producing hot oil and/or steam for use in a variety of applications. For example, the hot steam can be used to drive a steam turbine in electric power plants or other industrial and manufacturing contexts.

While the produced water 138 from separation stage 130 can be used as-is, it also may be diverted for concentration 139 to yield a condensate 151 and concentrate 153. Depending on the composition of feedstock used, e.g. PVC, switchgrass, or proteins, the produced water 138 may contain sulfur- and/or chlorine-containing materials. Condensate 151 is typically of a purity above that of municipal-strength waste water. Where nitrogenous waste, for instance, is received as the feedstock to the process, the composition of concentrate 153 can be used as an organic fuel or liquid fertilizer, having a chemical constituency similar to fish solubles. Alternatively, the produced water 138 can be piped directly into storage tanks for characterization before choosing a manner of disposal.

Alternatively, in some embodiments, third stage 140 may involve further in a thermal-chemical platform. For example, the hydrocarbon liquid 500 may be coked either on-site or at a refinery according to methods known in the art to produce fuel-gas 146, carbon solids 142, and finished oil 144. Other thermal-chemical treatments include vis-breaking, hydrotreating, gasifying and pyrolyzing. While techniques such as gasifying and pyrolyzing raw waste streams have proven less than successful, due to the homogeneity of the output from second stage separation 130 in embodiments of the present invention, such treatments can be more successfully employed.

In exemplary oil finishing 140 involving a thermal chemical platform, hydrocarbon liquid 500 is subjected to conditions wherein it undergoes a reaction that may involve one or more processes known in the art, such as distillation for fatty acids, thermal cracking, catalytic cracking, etc. It is also possible that the hydrocarbon liquid contains some quantity of reacted solid product that is also passed to oil finishing 140. Together, the hydrocarbon liquid and reacted solid product may be referred to as a solid matrix. In this instance, the hydrocarbon liquid is converted to a mixture of useful materials that usually includes carbon solids 142, and a mixture of hydrocarbons that is typically released as hydrocarbon vapor and gases 148. Such a conversion may involve a decomposition of one or more materials in the hydrocarbon liquid. Suitable conditions in the oil finishing 140 typically use temperatures that are elevated with respect to the first stage, and pressures that are reduced with respect to the first stage hydrolysis 120b. The oil finishing typically does not involve the use of added water. A number of different apparatuses may be employed to effect the oil finishing in third stage 140.

In one exemplary embodiment of the third stage 140, the water content of the hydrocarbon liquid 500 is almost zero, so that the conditions of the third stage are such that the remaining organic molecules are broken down largely by application of a high temperature, rather than by hydrolysis by excess, or added, water or steam. Temperature conditions for carrying out such third stage reactions may be around 400° C.-600° C. (~750-1110° F.). Such a third stage reaction typically takes from about 5 minutes to about 120 minutes. In practice, the various phases of the liquor spend varying amounts of time in the third stage reactor. For example, the vapors pass through relatively quickly, and the liquids take longer. The output from the third stage comprises, separately, a mixture of hydrocarbon vapor and gases 148 such as carbon dioxide, CO, and nitrogen and sulfur containing compounds, and carbon solids 142. The carbon solids 142 preferably resemble high quality coke. The mixture of hydrocarbon vapor and gases 148 typically contains oil vapor. The conditions of the third stage are preferably selected to optimize the purity of the carbon solids 142, and the mixture of hydrocarbon vapor and gases 148. Rapid quench of hot vapors, such as the mixture of hydrocarbon vapor and gases 148, stops reactions and minimizes carbon char formation after the third stage. In an exemplary embodiment, rapid quenching of vapors may be achieved by directing the vapors into a drum full of water or by multiple quenching steps using thermal fluids and cooling mediums. Where such multiple quenching steps are employed, it is advantageous to take multiple cuts (diesel, gasoline, etc.) from the oil so that the various fractions can be diverted to separate commercial applications. Alternatively, in another embodiment, the oil vapor may be quenched in the presence of the incoming hydrocarbon liquid, thereby also facilitating energy recovery.

Where a thermal chemical platform is employed in the third stage, typically it will be carried out at temperatures in the range of about 400° C. (~750° F.) to about 600° C. (~1110° F.), so that at least one of the following two transformations can occur. First, carboxylic acids are broken down to hydrocarbons. This can be achieved by removing the carboxyl group from each fatty acid molecule at temperatures in the range approximately 315-400° C. (~600-750° F.). Second, hydrocarbon molecules themselves are "cracked" to form a distribution of molecules of lower molecular weights, a process that can occur in the range approximately 450-510° C. (~840-950° F.). Typically, however, hydrocarbon cracking occurs at temperatures above 480° C. (~895° F.). The third stage may be carried out at a higher temperature than that for the first stage.

In at least one embodiment, the third stage reactor is pressurized to a pressure between about 15 psig and about 70 psig. In some embodiments, the pressure in the third stage reactor may be lower than that in the first stage.

Figure 5:
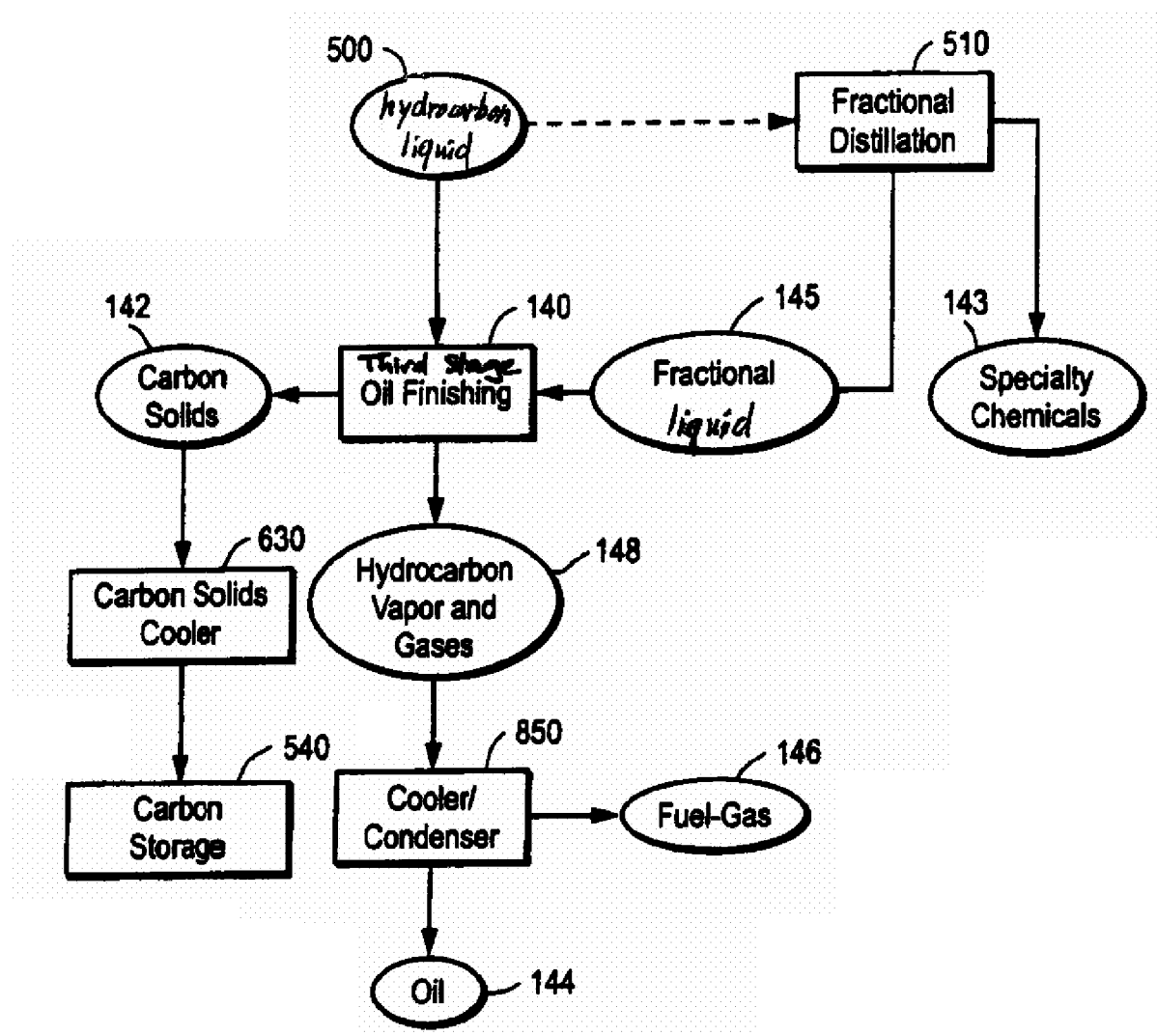
FIG. 5 is a flowchart illustrating an oil finishing storage of an embodiment of the present invention.

An example of third step stage oil finishing is illustrated in FIG. 5. Carbon solids 142 generated from a third stage reactor as described above are typically first passed to a carbon solids cooler 630 wherein the carbon is permitted to lose its residual heat. After cooling, the carbon sol ids 142 are passed to carbon storage 540 and subsequent use. The mixture of hydrocarbon vapor and gases 148 produced by the third stage reactor can be directed to a cooler/condenser 850 which separates the mixture into fuel-gas 146 and a hydrocarbon oil 144.

Other optional third stage and oil finishing apparatuses and methods are described in detail in U.S. patent application Ser. No. 11/529,825, filed Sep. 29, 2006, now published as U.S. publication no. 20070098625, the contents of which is incorporated herein by reference in its entirety for all purposes.

Types of Feedstock

While the process of the invention can be performed across a range of parameters as set forth above, certain refinements of the operating conditions such as temperature and pressure can be made to enhance the yield and efficiency of the process, as exemplified below for selected types of feedstock. It is to be understood that the operating parameters in the present invention may be adjusted in one or more instances in order to accommodate different types of raw feed materials or other process considerations without departing from the invention. For example, in the context of raw feed such as turkey offal or other animal products, the major components are fats, proteins, carbohydrates, and minerals. Thus, the balance of the major components may determine some aspects of the operating conditions of the present invention. Furthermore, the temperature ranges of the first stage reactions and further processing steps can be controlled to favor the production of certain products over other pathways, thereby maximizing the economic value of products obtainable therefrom. Table 2 sets forth approximate experimentally determined process parameters for four major categories of feedstocks.

TABLE 2

| | | Approximate Feedstock Process Parameters | | | | | | | | | | |
|---|---|---|---|---|---|---|---|---|---|---|---|---|
| | | 1st Stage Decomposition | | | | 1st Stage Hydrolysis | | | | 3rd Stage[1] | | | |
| Feedstock | Preparation Particle Size | Temp (C.) | PSIG | Time (min) | pH | Temp (C.) | PSIG | Time (min) | pH | Temp (C.) | PSIG | Time (min) | pH |
| Agricultural Animal Byproducts Processing (fats, bones, | ½"-1" | 125-190 | 20-600 | 15-120 | 6.5 | 200-260 | 210-800 | 30-60 | 6.5 | 400-600 | 15-70 | 5-120 | 4-8 |

TABLE 2-continued

Approximate Feedstock Process Parameters

| Feedstock | Preparation Particle Size | 1st Stage Decomposition | | | | 1st Stage Hydrolysis | | | | 3rd Stage[1] | | | |
|---|---|---|---|---|---|---|---|---|---|---|---|---|---|
| | | Temp (C.) | PSIG | Time (min) | pH | Temp (C.) | PSIG | Time (min) | pH | Temp (C.) | PSIG | Time (min) | pH |
| feathers, DAF greases) | | | | | | | | | | | | | |
| Carbohydrates - (switch-grass, distillers, grains, manures) | as cut (received from mill) | 125-200 | 20-600 | 15-120 | 6.5 | 200-270 | 210-800 | 30-60 | 6.5 | 400-600 | 15-70 | 5-120 | 4-8 |
| Municipal Sewage Sludge (MSS) | solid cake (as received from sewage plant) | 170-200 | 100-600 | 15-120 | 6.5 | 200-270 | 210-800 | 30-60 | 4-8 | 400-600 | 15-75 | 5-120 | 4.5 |
| Municipal Solid Waste (MSW)[2] | ¼" to 6" | 150-350 | 55-250 | 60-180 | N/A | 200-350 | 210-800 | 30-60 | 6.5 | 400-600 | 15-75 | 5-120 | 6.5 |
| Shredder Residue (SR)[2] (mixed plastics, used motor oil, rubber, used automotive fluids, foam) | ¼" to 6" | 250-400 | 55-250 | 60-180 | N/A | 200-350 | 210-800 | 30-60 | 6.5 | 400-600 | 15-75 | 5-120 | 6.5 |
| OVERALL CONDITIONS | ¼" to 6" | 125-400 | 20-600 | 15-180 | 6.5 | 200-350 | 210-800 | 30-60 | 4-8 | 400-600 | 15-75 | 5-120 | 4-8 |

[1]Possible 3rd-stage coker (either on-site or at refinery)
[2]As received from recycler or shredder.

Embodiments of the present invention have been tested with many types of wastes and representative data compiled, exemplified by Table 3, to determine beforehand the respective composition and breakdown of products for different waste streams.

TABLE 3

Exemplary Raw Feed Composition

| Waste Stream | Moisture % | Fat % | Protein % | Ash % | Carbs % |
|---|---|---|---|---|---|
| Beef Mortality | 57.9 | 25.5 | 11.6 | 1.1 | 3.9 |
| Bone Meal | 7.5 | 10.5 | 50.0 | 29.0 | 3.0 |
| DAF Skimmings | 80.0 | 17.4 | 1.6 | 1.0 | 0.1 |
| Turkey Offal | 65.0 | 13.6 | 16.4 | 4.3 | 0.8 |
| Poultry Litter | 50.0 | 0.0 | 25.3 | 10.1 | 14.6 |
| Fish (salmon) | 68.2 | 10.9 | 19.9 | 1.1 | 0.0 |
| Switchgrass | 10-50 | 0.0 | 4 | 8 | 64 |
| Municipal Sewage Sludge #1 | 70.1 | 3.8 | 11.7 | 6.0 | 8.4 |
| Municipal Sewage Sludge #2 | 86.3 | 0.7 | 4.6 | 3.8 | 4.6 |
| Corn sludge | 90.3 | 0.2 | 6.2 | 1.1 | 2.2 |
| Mushroom Substrate | 58.0 | 0.0 | 4.3 | 25.1 | 12.7 |
| Italian Chicken Farm Mix | 47.4 | 35.9 | 11.5 | 4.1 | 1.1 |
| Pig Manure | 74.1 | 0.0 | 5.4 | 7.0 | 13.6 |
| Pig Offal, Manure & Hay | 72.5 | 0.0 | 5.7 | 4.3 | 17.5 |

Animal Feedstock

For feedstocks having significant amounts of ammonia, such as those containing animal offal, waste, carcass, etc., it can be advantageous to remove the free ammonia, either during feed preparation 110, in which case it is one component of steam and gases 121, or during downstream storage (FST) 320, where it is vented along with steam and gaseous impurities 338. See FIG. 3. One source of ammonia is the breakdown of uric acid found in residual quantities of urine that are often present in aggregates of animal body parts. Methods of removing ammonia are well known to those of one of ordinary skill in the art and include, but are not limited to, separation of the urine content prior to slurrying, use of enzymatic degradation, and application of heat. Additionally, ammonia can be converted by acidification to a salt such as ammonium sulfate, or ammonium phosphate. FST 320 may comprise two vessels maintained at different conditions. The first such vessel performs the role of storage; the second vessel handles the breakdown of proteins, which process releases ammonia.

Shredder Residue, MSW and Tires/Mixed Plastics

Shredder residue typically includes about 50% combustible material and 50% noncombustible (inert) material. Shredder residue may also contain brake fluid, gasoline, engine oil, windshield washing fluids, antifreeze (ethylene glycol), FREON™ refrigerants, and in some cases polychlorinated biphenyls (PCBs). PCB contamination can result from the shredding of old white goods that may have intact capacitors. In addition, shredder residue may contain heavy metals, such as lead, mercury, and cadmium. Shredder residue also contains varying amounts of moisture, depending on the type of shredding operation (i.e., wet or dry) and whether it is exposed to rain while in inventory. Note that SR residue, though generally considered to be "dry," may still have upwards of 15% moisture content by weight. The components and elemental composition of two exemplary SR samples, as determined by sample analysis, are shown below.

TABLE 4

Shredder Residue (SR) Content - Sample 1

| Component | Percentage by weight | Component | mg/kg |
|---|---|---|---|
| Moisture | 4.4 | Arsenic (total) | 32 |
| Plastics | 22.8 | Barium | 550 |

TABLE 4-continued

Shredder Residue (SR) Content - Sample 1

| Component | Percentage by weight | Component | mg/kg |
|---|---|---|---|
| Foams | 11.2 | Cadmium (total) | 17 |
| Rubber & Elastomers | 23.3 | Chromium | 110 |
| Clothes & Fabrics | 5.8 | Copper | 6000 |
| Wood | 2.9 | Lead | 920 |
| Fines | 22.0 | Mercury | 1.4 |
| Miscellaneous | 3.9 | Selenium | ND |
| Rocks | 1.5 | Silver | ND |
| Metals & Wires | 6.9 | Zinc | 5600 |

TABLE 5

Shredder Residue Content - Sample 2

| Component | Percentage by weight | Component | mg/kg |
|---|---|---|---|
| Moisture | 10 | Arsenic (total) | 1.87 mg |
| Plastics | 28.4 | Barium | 99 |
| Foams | 6.9 | Cadmium (total) | 11.67 mg |
| Rubber & Elastomers | 32.3 | Chromium | 40 |
| Clothes & Fabrics | 10.6 | Copper | 1140 |
| Wires | 7.6 | Lead | 556.67 |
| Fines | 3.8 | Mercury | 10.40 |
| Miscellaneous | 10.4 | Selenium | ND |
| Rocks | 0 | Silver | 0.85 |
| Metals | 0 | Zinc | 3400 |

The above data is provided solely to illustrate the types of materials that may be found in a given SR sample and not to be construed as limiting the applications for the present invention. Depending on its origin, the composition of shredder residue material can vary from sample to sample. Additionally, MSW, tires and mixed plastics as feedstock may share many attributes in common with SR. However, MSW can present additional considerations depending on specific content of specific batches because it may include wastes such as animal by-products such that certain reactions may occur prematurely during decomposition, such as hydrolysis of fats and proteins, if temperature is not closely controlled to not exceed the decomposition temperature limits for those materials if the moisture content is sufficiently high. Premature hydrolysis of such compounds can, for example, result in the formation of stable emulsions that can be difficult to break down in later process stages. In some instances, a two step decomposition reaction may be employed to address specific feedstock content in this regard.

Shredder residue, municipal solid waste (MSW), and tires/mixed plastics have demonstrated on the bench-scale and pilot-scale levels to follow the following conversion patterns on average:

TABLE 6

Exemplary Feed Conversions

| | Oil % | Gas % | Carbon % | Waste Solids % | Water % | Totals % |
|---|---|---|---|---|---|---|
| Shredder Residue | 21.0 | 14.0 | 12.0 | 45.0 | 8.0 | 100.0 |
| MSW | 22.0 | 11.0 | 21.0 | 26.0 | 20.0 | 100.0 |
| Tires | 38.0 | 11.0 | 44.0 | 5.0 | 2.0 | 100.0 |

Switchgrass and Mixed Grass Feedstock

In some embodiments, the use of switchgrass and/or mixed grasses as feedstock in the processes described herein can generate combustible gases and carbon solids. Switchgrass has an average dry mass composition of about 64% cellulose, about 24% lignin, about 8% ash, and about 4% protein. Major components of ash include sodium, potassium, and chloride. Although the composition will vary from batch to batch, the cellulosic component of switchgrass can, in some batches, comprise about 54% cellulose and 46% hemicellulose. A mixed grass feedstock may comprise $C_4$ or $C_3$ grasses, e.g. Switchgrass, Indiangrass, Big Bluestem, Little Bluestem, Canada Wildrye, Virginia Wildrye, and Goldenrod wildflowers, etc, amongst other species known in the art. Generally, when subjected to the processes of the present invention, cellulose starts to degrade at about 275° C., hemicellulose at about 150° C., and lignin, at about 250° C. Although mixed grasses are relatively cheap and easy to cultivate, efforts to utilize them for biofuel production have been hampered by their high ash, silica, and chloride content, which present significant problems in combustion since they do not volatilize at pyrolysis conditions. As long as there is sufficient potassium or other alkali to combine with the chloride, the chloride would not go with the oil or gas.

$C_3$ grasses have presented special challenges in this regard as they generally have even higher silica levels than $C_4$ grasses. Conventional methods to lower the high ash content are directed to controlled cultivation of the grasses, such as through overwintering, specialized fertilizing, and/or planting sandy soil, etc. which undercuts the very case of obtaining such feedstock which had made it a good candidate for renewable energy production.

Unlike conventional processes, the present invention is able to deal with the high ash content of mixed grass feedstock to produce combustible gases and carbon solids. At the first stage decomposition, the chlorine is solubilized in water phase, and some of the minerals drop out. The cellulosic component, lignin, and protein component of the mixed grass feedstock hydrolyze and either partially or fully degrade under the first stage hydrolysis conditions. A substantial amount of the ash content, e.g. silica, potassium, and chloride, may end up in the carbon solids and a percentage will also find its way into the produced water in accordance with the foregoing disclosure. As those of skill would appreciate, the mineral composition of the carbon solids makes it valuable for use as a fertilizer, among other applications.

Solvents and Modifications

Based on raw feed composition, feedstock specific modifications may be desirable to facilitate processing. An example of a feedstock-specific modification includes the addition of an organic solvent to hydrocarbon heavy feedstocks, e.g. plastics, rubber, tires, foam, to maximize the organic fraction of the feedstock and thereby enhance the yield of utilizable liquid mixture. Other examples include addition of acid, for example, to control pH.

When the raw feedstock includes tires and/or mixed plastics alone or as contained in SR or MSW, it has been found that a hydrocarbon oil produced by the process itself is a superior solvent as compared to other solvents presently known in the art. As such, at least some of the hydrocarbons produced by the process can be redirected to the input raw feed or earlier stage reactions. In exemplary embodiments, the hydrocarbons produced therefrom are characterized by a boiling range of about 100-350° C. (~212-660° F.). The hydrocarbon solvent may be heated prior to application to the tire feedstock. In other embodiments, the hydrocarbons are applied to the feedstock and the mixture heated to a temperature between about 200-350° C. (~390-660° F.). The use of the final stage oil product eliminates the recurring costs of other solvents, and make-up quantities thereof.

In some embodiments of the present invention, the entire spectrum of constituents of the oil, or only a portion of these constituents, are used to dissolve tires and/or mixed plastics. For example, all of the oil 144 produced in a first batch can be redirected to the input tire feedstock. In other embodiments, only the final stage heavy oil product is redirected in this manner. If a portion of constituents is used, the separation of the solvent into parts can take place during either oil finishing 140 or first stage 120. The use of the oil produced as a solvent can make the process of the present invention more economical than other conventional approaches. Because this oil will ordinarily not be available for the first batch of tires to be processed, another solvent may additionally be employed to assist with initial breakdown of the tires. Exemplary solvents useful for this purpose include toluene; other suitable solvents would be familiar to those of ordinary skill in the art.

First stage hydrolysis for tire and/or mixed plastics processing may also involve further addition of water to facilitate removal of chlorine or other halogen-containing materials. The organic liquid materials and small mineral particles from depolymerization, solvent, and water can be mixed together for hydrolysis, or the feed may be contacted by the solvent and the water sequentially.

When the raw feed comprises municipal sewage sludge, for practical considerations, it is preferred to separate the organic from the inorganic materials. The suspended material in MSS may consist of cellular material and cellular debris from bacteria. Suspended solids in MSS are typically small, deformable, and have an effective density within 10% of that of the suspending water medium. Accordingly, in one embodiment, some of the produced oil is redirected to the raw feed or subsequent reactor, in order to assist with floating the material. In other embodiments, materials such as trap grease, as are obtained from fast food outlets for example, can be used. The principle behind floating the material is that a material that is lighter than water is introduced to the raw feed or downstream thereof, to assist with floating the heavier than water organic materials, thereby facilitating the separation of organic from inorganic materials. The result is a sludge that is easier to separate than may otherwise be the case.

Exemplary Intermediates and Products of the Invention

The design of the present invention permits separation of compounds into their different constituents on the basis of molecular density. For example, as a result of first stage decomposition 120a, a number of separations occur, effectively removing compounds or elements that have a higher specific weight than water. Gases with low molecular weights that are formed during decomposition or depolymerization are separated by molecular weight difference with heavier gases such as air and carbon dioxide. In exemplary embodiments of the invention, solids, ash and/or a combination of metals/minerals that have a higher specific weight than oil or water are separated by gravity and are directed to storage for waste disposal or to a dryer for product preparation as soil amendments (fertilizer).

In alternative embodiments, flashed liquids (fatty oil and water) from first stage decomposition can be separated by density in a liquid separator similar to that used in the petroleum industry. The liquid separator is effective at segmenting the fatty acid oil, along with some lipid-soluble amino acids, from the water/moisture that was already originally in the waste feedstock. Remaining water-soluble amino acids form an aqueous solution that can be used as a nitrogen fertilizer.

Referring again to FIG. 1, minerals included as solids 116 that separate out at the first stage decomposition 120a in processes which involve MSW or agricultural waste as raw feed 100, may comprise powdered and particulate bone material as well as some amount of minerals from sand, soil or other contaminants that have entered the feedstock. Separation of the mineral matter from the remaining material can be achieved by gravity separation or can utilize other separation apparatus familiar to one of ordinary skill in the art, such as a liquid/solid centrifuge, a screen, or a filter. The mineral matter so separated may be used as a mineral fertilizer. The separated mineral matter is typically free of organic material, although, in practice, trace amounts may be found.

The liquid mixture 118 resulting from the first stage decomposition typically comprises an oil phase having fats and carbohydrates, and an aqueous phase having dissolved amino acids and short amino acid sequences. The liquid mixture may additionally comprise some insolubles that include minerals and peptides that have not been broken down.

Specialty chemicals 143 produced by the present invention can comprise organic compounds such as fatty acids, fatty acid esters, fatty acid amides, or a range of amino acids. In preferred embodiments, the specialty chemicals 143 are fatty acids. Typically, specialty chemicals 143 will comprise fatty acids in the range $C_{12-20}$. More often, the specialty chemicals 143 will comprise fatty acids in the range $C_{16-20}$. When the specialty chemicals 143 are fatty acid amides and fatty acid esters, they are typically formed by reaction with fatty acids. The specialty chemicals 143 resulting from a feedstock, such as turkey offal for example, may find application as lubricants and coatings and paints.

In some embodiments, some or the entire portion of hydrocarbon liquid 500 can be diverted from the process to give a carboxylic oil. The carboxylic oil may be used directly as an adaptable fuel source, i.e. in a boiler, heater, or engine. Alternatively, the carboxylic oil is subjected to further processing, e.g. as in an oil refinery. In further alternatives, the carboxylic oil may be further processed or purified via filtration and/or centrifugation prior to use. For example, the carboxylic oil can undergo hydrotreatment, a process commonly used in oil refineries to remove nitrogen and sulfur from crude petroleum oils, to yield a cleaner-burning fuel as the presence of nitrogen and sulfur can lead to NOx and SOx formation during combustion. As illustrated below in the Examples, the carboxylic oil provided by the present invention is low in sulfur content, typically <0.2%, and therefore requires a relatively small amount of hydrogen for hydrotreatment purposes. The ease of upgrading the carboxylic oil also may be attributable to the low nitrogen content, most of which exists in amine form rather than heterocyclic ring.

Various feedstocks can be employed to generate usable carboxylic oil at the point of the hydrocarbon liquid 500 in the process. Feedstocks comprising fat/grease, e.g. animal fats, oil seeds-soybean, canola, trap grease, and a protein source are preferred to maximize the yield of usable carboxylic oil. Materials suitable for this purpose include, non-exclusively, animal waste, plant waste, waste, and low value streams (DDG) from ethanol production facilities.

In some embodiments, the carbon solids 142 yielded from third stage oil finishing 140 may be similar to coke, i.e., usually hard carbonaceous materials with a high calorific value suitable for use as a fuel. Carbon solids 142 typically will contain little, if any, non-combustible minerals that otherwise usually result from the incineration of carbon-containing materials in an oxygen-deficient atmosphere. Where carbon solids 142 contain minerals, they may also be described as a carbon-mineral matrix. The carbon solids 142 produced by the present invention have a vast array of applications. They may be sold as a "soil amendment" for use in domestic horticulture. In particular, the carbon that is produced is of a quality similar to many forms of "activated carbon" and can be used in filters, e.g. material for absorbing vapor emissions in automobiles, or for use in domestic water filters. Additionally the carbon, because of its level of purity, may find application as a solid fuel, like coal, but without the disadvantage of producing noxious emissions arising from combustion of the contaminants typically found in coal products. Also, many environmental toxicants can be neutralized in a soil matrix by the use of a carbon additive like the carbon solids that results from the process of the present invention.

In some embodiments, hydrocarbon vapor and gases 148 yielded from third stage 140, comprise hydrocarbon gases, with possibly some trace impurities of non-hydrocarbon gases. The hydrocarbon gases include gases such as fuel-gas 146; the hydrocarbon vapors may be readily condensed to liquids or oils 144. The fuel-gas 146 has calorific value and may itself be redistributed internally within the process of the present invention for the purposes of providing energy for heating at various stages or can be used to produce electrical or other forms of energy for external or internal use. The oil 144 typically comprises hydrocarbons with carbon chains have 20 or fewer carbon atoms. In this respect, the mixture resembles the lighter components of a fuel-oil such as a #2 grade diesel oil. Such a product is also commercially saleable. It is to be understood, however, that the precise composition of the oil 144 depends upon the feedstock, and also upon the reaction conditions used in the oil finishing step. Thus, the oil may comprise paraffins, α-olefins, and aromatics, as well as saturated aliphatic hydrocarbons. For example, the composition of the oil obtained when the feedstock is composed of tires is different from the composition obtained when the feedstock is turkey offal. It has been found that the oil resulting from feedstocks that have a high fat content is rich in olefins, and di-olefins. If not desired, such olefins may be removed from the oil by resaturation or by various separation methods familiar to one of ordinary skill in the art.

Equipment

Various apparatus for carrying out processes according to embodiments of the present invention are described herein. Based on the teachings set forth herein, the assembly of the various components for the described apparatus would be within the capability of one of ordinary skill in the art of process engineering or chemical engineering. Accordingly, such technical details as would be familiar to an artisan of ordinary skill are omitted from the present description. In general, suitable equipment can be constructed using any heat- and water-resistant material known in the art. In exemplary embodiments, the apparatus of the invention is constructed primarily of carbon steel, with minimal use of 316L stainless steel for low pH environments. While more exotic metals can be used, they are not absolutely necessary to achieve the objects and advantages of the invention. Examples of exotic metals that can be used include Hastelloy, tantulum, and various hardened steels for acid service, for control valve trim and for grinding equipment.

Figure 7:
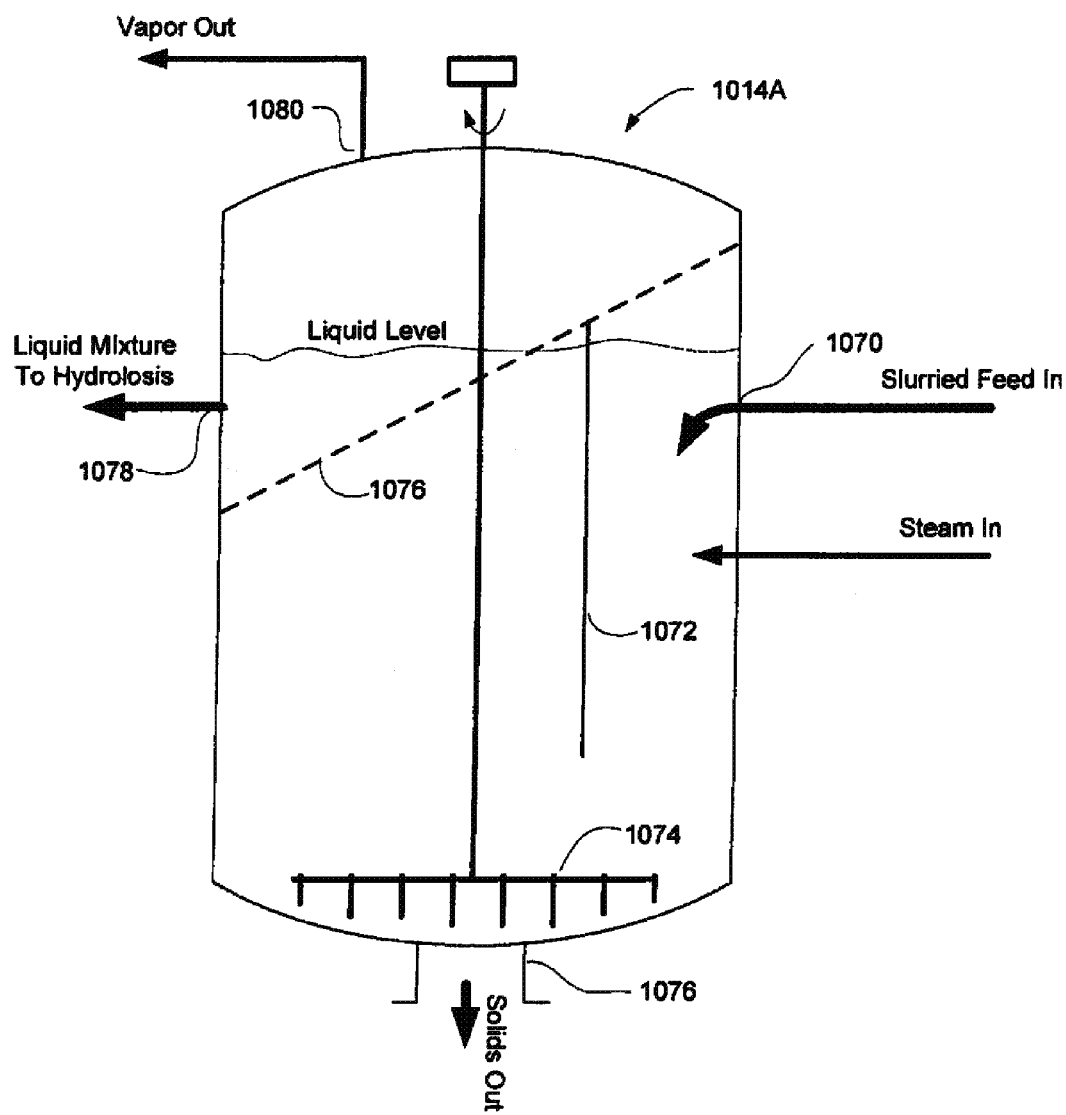
FIG. 7 is a schematic diagram of an exemplary depolymerization reactor.
Figure 19:
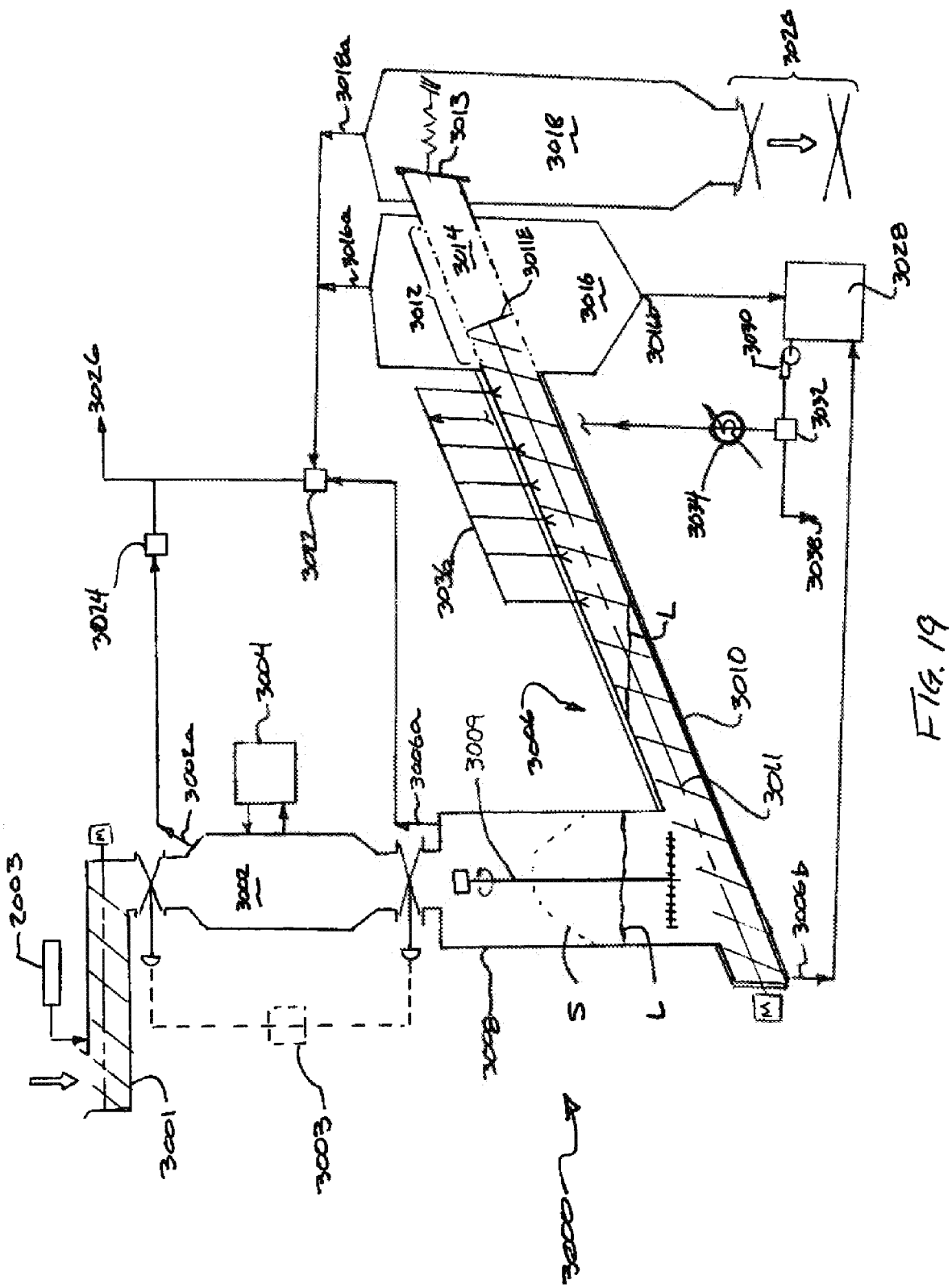
FIG. 19 is a schematic diagram of an alternative reactor according to a further embodiment of the present invention.

Specialized devices, such as the reactors shown in FIGS. 7 and 19, or the separation device described in detail in U.S. Pat. No. 7,179,379, issued Feb. 20, 2007, which is incorporated herein by reference in its entirety, may be used in embodiments of the present invention. However, those of skill in the art will recognize that many different forms of reactors, tanks, separators, conveyors, etc. can be employed for the purposes of the present invention. For example, with respect to separation, filters of many different configurations with openings smaller than the suspended solid particles can be used for solid material that does not deform significantly under strain. Clarifiers, settling chambers, and simple cyclones can be used effectively when there is a significant density difference between the solid particles and the fluid. As the size or density difference become smaller, active devices using centrifugal forces can be effective.

Reactor apparatus 3000, as shown in FIG. 19, is an example of one embodiment of a decomposition reactor according to the present invention. As reactor apparatus 3000 is well suited for use with SR and similar feedstocks, reference is at times also made to reference numerals of FIG. 8, which is later described in Example 2 below.

As shown in FIG. 19, reactor apparatus 3000 may include mixing and transporting means 3001, such as a screw conveyor or screw press, to receive the raw feed and mix it with a liquid input 2003 (FIG. 8) as appropriate. From mixing and transporting means 3001, feedstock is delivered to airlock chamber 3002. Airlock valves 3003 before and after chamber 3002 can be used to control entry and exit of material therefrom. Airlock chamber 3002 is used to accumulate feedstock for introduction into reactor 3006 under controlled pressure conditions due to the elevated pressure and temperature in the reactor 3006. Also, purge system 3004 uses nitrogen or another inert gas to purge oxygen from airlock chamber 3002 before it is opened into the high temperature environment of reactor 3006.

Alternatively, a hopper (not shown) may be disposed between mixing and transporting means 3001 and the inlet to airlock chamber 3002 to accumulate feedstock so that the mixing and transporting means can run continuously while the airlock chamber is cycled into reactor 3006. Fill times for chamber 3002 will depend on overall system size. Exemplary fill times may range between about 15-60 minutes.

Reactor 3006 includes a number of different sections. Receiving section 3008 is formed essentially as an open-bottomed chamber to receive material from airlock chamber 3002. A mixing or stirring element 3009 provides agitation at the bottom of receiving chamber 3008 to help ensure uniform contact of solids and liquids. While not shown in the figure, suitable structure for supporting mixing or stirring element 3009 may be devised by a person of ordinary skill in the art.

Formed at the bottom of receiving section 3008 is a conveyor section 3010. In the illustrated exemplary embodiment, conveyor section 3010 is a screw conveyor with a heated screw 3011 and a jacketed housing. Other suitable conveyors may be employed. A screen section 3012 is disposed at least at part of an end of conveyor section 3010 opposite the receiving section 3008. Screen section 3012 permits separation of liquids from particulate matter (similar to screens 2012); the particulate matter being delivered out the far end of conveyor section 3010 through a biased (closed) door 3013. Screw 3011 ends at 3011E, short of door 3013 to provide a plug flow zone in the screen section 3012.

In an exemplary embodiment, conveyor section 3010 is dimensioned and operated at a speed that provides for a residence time of about one-half to one hour for shredder residue feedstocks. Conditions within reactor 3006 when used for shredder residue are otherwise substantially described herein below with respect to the first stage decomposition in Example 2.

Figure 8:
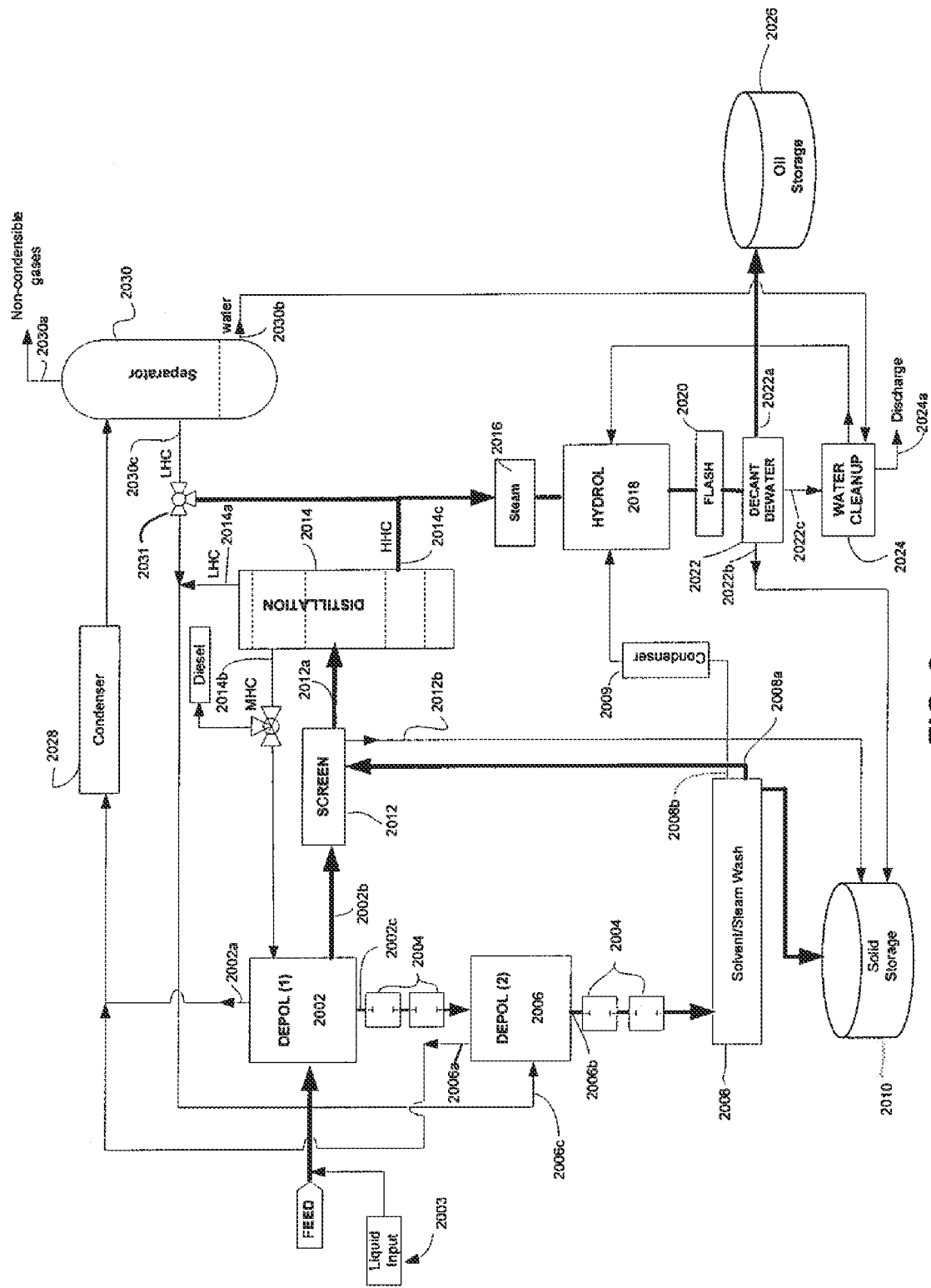
FIG. 8 is a block diagram illustrating another exemplary process of the present invention adapted for pilot-scale processing of SR and MSW feedstocks.

It will be appreciated by person of ordinary skill that two reactors 3006 may be utilized in series to provide an arrangement similar to that illustrated in FIG. 8, or that a single reactor may be used under conditions also described herein. Dotted line (S) within receiving chamber 3008 represents an approximate solids level at a steady state operation. Line (L)

represents an approximate liquid level, also during steady state operation. The liquid component will generally be made up of liquid input 2003, solvent and melted material from the feedstock.

As the feedstock is transmitted through conveyor section 3010, it is subjected to a solvent/steam wash 3036. Upon reaching screen 3012, the liquid fraction is separated through the screen and received in vessel 3016. Solid matter is moved along conveyor section 3010, through door 3013, and deposited into solids retention vessel 3018. Vessel 3018 is provided with an airlock 3020 at its exit. However, because the conveying means, e.g. screw 3011, ends at 3011E before the end of the conveyor housing, a plug of material is formed due to the biased closed door 3013. The plug formation, forced against door 3013 by the conveying means pushing behind it, serves to further press liquid out of the solid material and through screen section 3012. Solids received in vessel 3018 can be handled as described herein for other produced solids.

The nature of the liquid received in vessel 3016 will depend on a number of factors such as feedstock makeup, process parameters and desired outputs. Typically, the liquid from vessel 3016 may be directed at outlet 3016b to tank 3028 where it is combined with liquid recovered from the sump 3006b of reactor 3006. From tank 3028, the liquid product is pressurized by pump 3030 and directed either through heat exchanger 3034 and a recycle loop to nozzles 3036 or outlet 3038 via valve 3032. The recycle loop with nozzles 3036 inside reactor 3006 provides liquid product back into the reactor to serve as a solvent and heat transfer medium. Excess liquid may be removed at outlet 3038 and directed for further processing such as a hydrolysis reactor 2018 as described below (FIG. 8).

Similar to other embodiments, outlets 3006a, 3016a and 3018a permit removal of vapors from vessels 3006, 3016 and 3018 respectively. Outlet 3002a permits removal of vapors from airlock chamber 3002. Because the pressure in airlock chamber 3002 will vary significantly from the other vessels, control values 3022 and 3024 can be used to equalize pressure before it is directed to outlet 3026. Vapors from outlet 3026 may be directed to a condenser, such as condenser 2028, and other processing as described herein.

As illustrated in FIG. 19, conveyer section 3010 is inclined at an upward angle from inlet to outlet. Such an angle is not required for proper function of the reactor apparatus, but may be desirable from a practical standpoint in terms of installation and space optimization given the heights and sizes of associated equipment. Angle will also effect the liquid level in the reactor, and should be considered for that reason too. Thus, conveyer section 3010 may be arranged in generally any orientation with respect to receiving chamber 3008, so long as it can freely convey material, provide appropriate liquid levels, heating, washing and residence time, and screen separation as described. Other alternatives may be employed as conveying means. For example, moving belt conveyors or chain conveyors with slatted section may be suitable. Other variations in screw-type conveyers also may be employed, such as tapering housing or varied pitch to increase the pressing action on the solid material in the screen section.

With the foregoing reactor apparatus, it will be appreciated that the process can be run in an effectively continuous manner, even though the airlock chamber 3002 may be operated in a batchwise manner. That is, once a sufficient quantity of feedstock is received in receiving section 3008, conveyer 3010 and the rest of the process may run continuously while being fed periodically from reaction airlock chamber 3002 through airlock 3003.

Processes and apparatus of the invention also may be automated. An exemplary system that would be appropriate for use includes, without limitation, the DCS system manufactured by Siemens (model SIMATIC S7 417H). In some embodiments, Variable Frequency Drives (VFD) are included as part of the PLC lineup. Examples of suitable VFDs for the process are manufactured by Allen-Bradley VFDs (PowerFlex models 40, 100, and 400).

Handling of Problematic Waste

The processes of the invention can also effectively handle problematic waste. One advantage of the present invention is that venting during the feed preparation 110, downstream feed storage, and hydrolysis (see e.g., 320 and 330, FIG. 3) permits the removal of gaseous impurities such as ammonia, carbon dioxide, and sulfur-containing gases. Depending on the composition of feedstock used, hydrolysis may give rise to sulfur-containing gases from the breakdown of sulfur-containing moieties in the feedstock. A principal source of sulfur is protein molecules, many of which have sulfur-bridges between cysteine residues. The sulfur-containing gases are typically hydrogen sulfide ($H_2S$), and mercaptans (alkyl-sulfur compounds) such as methyl mercaptan. Additionally, some salts such as calcium sulfide (CaS) may be produced, and these are normally separated during later stages.

Hydrolysis of chlorinated and/or brominated organics in the mixture also breaks the carbon-halide and/or oxygen-halide bonds and transfers metals and halide to the water phase. The present invention is therefore well-suited to the task of PVC recycling and treatment of waste containing PCBs and PBDEs. As those familiar with waste management will appreciate, PVC contains about 55% by weight chlorine and thus has a propensity to give rise to toxic substances, e.g. dioxins, when degraded through incineration and other conventional technologies. One benefit of using water in the process of the present invention is that the hydrogen ions in water combine with chloride and halogen ions from the PVC to yield solubilized products such as hydrochloric acid, a relatively benign and industrially valuable chemical which is useful for cleaners and solvents and substantially free of contaminants and other debris.

Another benefit of the present invention is that the feedstock is effectively sterilized in the process, giving rise to products that are essentially pathogen-free, e.g. free of bacteria, viruses, or prions, etc. This is an important outcome as it permits use of the products of the present invention in agricultural applications where there is a danger such molecules could reenter the food-chain.

Efficiency

High energy efficiency can be achieved in embodiments of the present invention through countercurrent heat exchange, the use of moisture in the feedstock to facilitate grinding and convey materials along through the system. A large portion of the energy used in systems of the present invention is used to heat liquid water in feedstock. Flashing after hydrolysis generates steam, which is separated out and diverted to pre-heat incoming feed thus providing efficient recycling of system energy.

Given the varying composition of raw feed that can be used, energy efficiency will vary from run to run. However, using tests conducted with multiple runs, the energy efficiency of the process was determined to be about 91% as detailed in the following table 7. As an example, a temperature of about 483° C. (~900° F.) was selected for these runs since it is much more than adequate for the handling of most feedstock types and demonstrates that high energy efficiency can be achieved even when the mix is heated to such temperatures.

TABLE 7

Energy Efficiency of Process as Applied to Shredder Residue (SR)

| | |
|---|---|
| Organic heating value: | ~15,000 Btu/lb |
| 50:50 mix with water has Cp | ~0.75 Btu/lb |
| Heat to 900° F.: | 675 Btu/lb of mix (1,350 Btu/lb oil) |
| Efficiency = | 100% − (1,350/15,000) = 91% |

The fact that hydrolysis uses water, which may be vented as steam, along with other gases, lends itself to efficient energy recovery. Water and steam are effective in heat exchange and may be redirected to the heating stages before the hydrolysis using one or more condensers. Condensers are quite compact and promote efficiency. Thus, steam and gases vented from the reacted feed are also preferably used to assist in heating the influent feed and in maintaining the temperature of the hydrolysis reactor, thereby reducing the energy loss of the process of the present invention. Steam and gases may also be passed to one or more heat exchangers placed prior to, or after, feed storage. Steam may also be directly injected back into the incoming feed in some cases.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.), but some experimental errors and deviations should be accounted for.

Example 1

Operating Plant—Agricultural Waste

Figure 6:
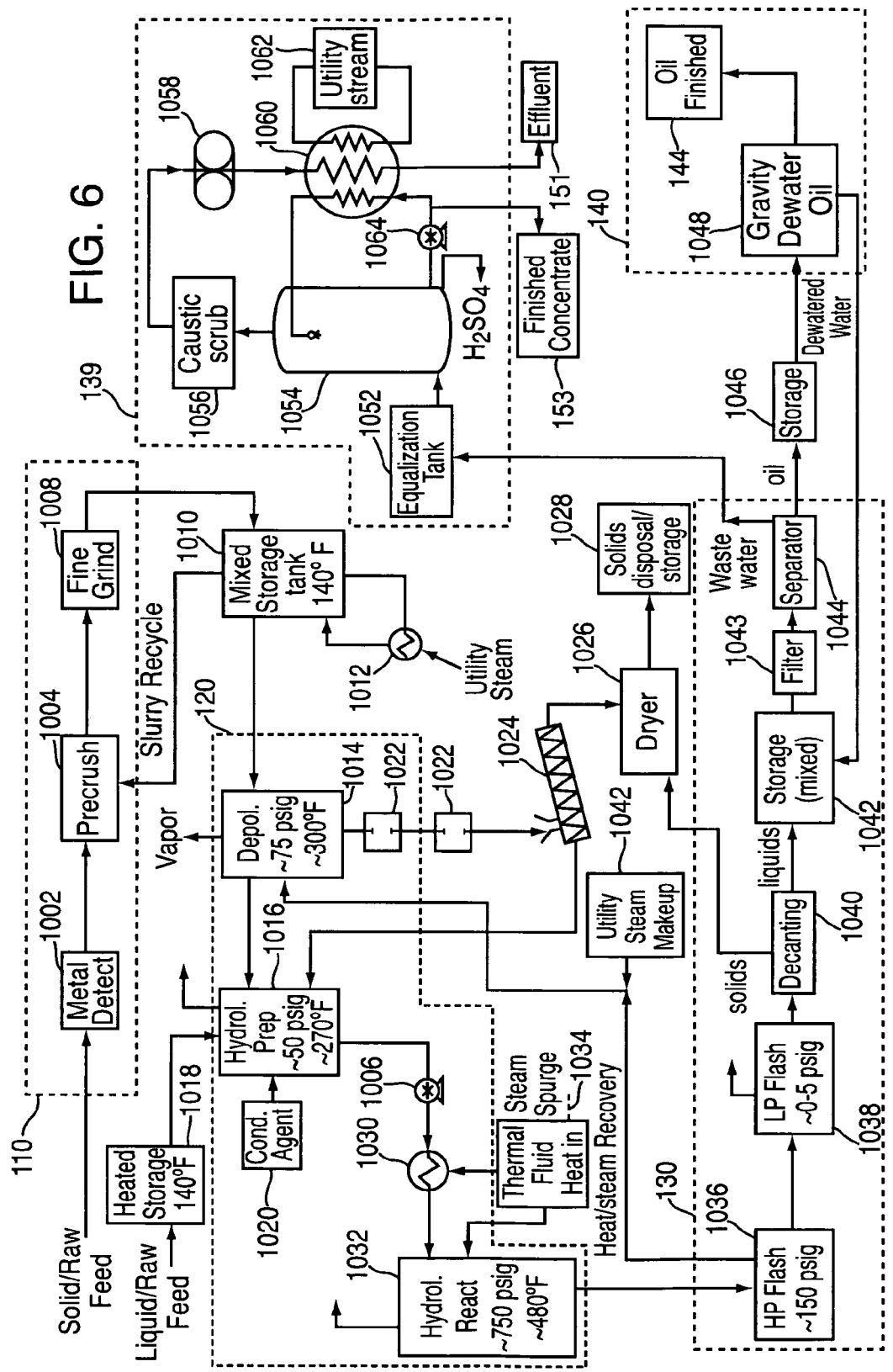
FIG. 6 is a block diagram, illustrating an exemplary process of the present invention adapted for full scale processing of animal based agricultural wastes.

A full-sized, commercial-scale installation has been constructed with a system as illustrated in FIGS. 6 and 7 for processing of turkey offal and other animal-based agricultural waste. At peak capacity, the plant is designed to yield over 500 barrels of oil per day, based on an average raw feed input of approximately 250 tons. Approximately 40 to 50 barrels of oil per day may be returned to the system to generate heat for powering the system. The oil produced is a high-quality oil of a similar environmental grade as a #2 heating oil. The plant produces about 28,000 gallons of water per day from the feedstock itself. The plant also discharges cooling tower blowdown, boiler blowdown, domestic wastewater, scrubber blowdown and other non-contact cooling water, which is clean enough to discharge into a municipal sewage system and which is free of pathological vectors. The plant also produces about 20 tons of minerals and about 30 tons of concentrate per day.

FIG. 6 further illustrates a commercial-scale embodiment of the present invention as described above that may be employed as a process for treating agricultural waste and, in particular, animal-based agricultural-waste feedstocks. Solid raw feed is received and may be stored temporarily as appropriate. Initially, in feed preparation step 110, solid raw feed may be directed through a metal detector or series of metal detectors 1002 in order to identify and remove metal particles that could have negative effects on downstream processing equipment. Solid raw feed is then directed to a raw material grinder 1004. In one exemplary embodiment, the raw material grinder 1004 may be a counter-rotating drum crusher which sizes particles to a maximum of approximately ¾ of an inch. Because animal-based agricultural wastes are generally high in moisture content, it is typically not necessary to add water to the sizing process. However, a portion of the prepared slurry from down stream processing can be recycled into raw material grinder 1004 to facilitate flowability through the grinder and subsequent unit processes if necessary.

After initial particle sizing, the feedstock has sufficient flowability for pumping; prior to that point it may be necessary to employ conveyors for transport. Throughout the process various pumps are utilized to transport and pressurize the feedstock in accordance with the process parameters as described. In general, suitable pumps may be selected from commercially available processing equipment by persons of ordinary skill in the art based on the teachings herein.

After initial particle sizing, the feedstock is delivered to fine grinder 1008. In the fine-grinder, particle size is reduced to an average of approximately ¼ inch and a substantially homogenous feed slurry is created. An example of such a slurry is shown in the left side of FIG. 14. Apparatus suitable for use in fine grinding include commercially available food-processing grinders. From fine grinder 1008, the feed slurry is delivered to a mixed-storage tank 1010. The mixed-storage tank is slowly circulated by a mixer to maintain homogeneity and avoid settling of high density particulates. Temperature in mixed-storage tank 1010 is preferably maintained between about 140° F.-160° F. (~60° C.-70° C.) to avoid unwanted biological activity or phase separation. The temperature may be maintained by cycling a portion of the contents of tank 1010 through a heat exchanger 1012 supplied with utility steam or alternatively by immersion heaters located within the confines of the tank itself.

From mixed storage tank 1010, the feed slurry is subjected to the first stage 120 reactions wherein depolymerization, separation and hydrolysis steps are performed. The slurry is first directed to decomposition reactor 1014. Conditions in decomposition reactor 1014 are generally a temperature within a range of about 125° C. (~260° F.) to about 190° C. (~375° F.), more specifically about 140° C. (~285 F) to about 165° C. (~325° F.) and most typically about 300° F. (~150° C.). Pressure may be in the range of about 20 to about 180 psig, most typically about 55 to about 75 psig. However, with a suitable reactor structure pressure could be as high as about 600 psg although most commonly it would not be higher than about 300 psig.

In order to maintain the temperature, waste steam, which can be typically taken from the later high-pressure flash 1036, can be delivered directly into the decomposition reactor 1014 or can be indirectly exchanged via an external heat exchanger. The decomposition reactor may include a low-agitation mixing device such as a rotating plow. The low agitation and configuration of the decomposition reactor is such that the residence times can vary for different types and densities of materials. Solids and liquids from animal agriculture waste require longer or shorter times for appropriate decomposition or depolymerization reactions. For example, solids such as bone material can be taken off the bottom of the tank at a different rate, typically slower, than the fat and protenatious slurry that flows through the reactor. As another example, material such as feathers that require more time for depolymerization can float in the liquid fraction of the tank and can be maintained in the reactor for a longer residence time by appropriate screenings or baffles. An exemplary embodiment of a suitable decomposition reactor is shown FIG. 7 and described below in more detail. Vapors including noncondensable gas such as carbon dioxide, some water vapor and other gases are exhausted from the top of the reactor and can be condensed. Subsequently, the condensed liquids and non-condensable gases further can be processed or discarded.

The main liquid feed stream from decomposition reactor 1014 is directed into hydrolysis preparation tank 1016. The hydrolysis preparation tank 1016 preferably includes a relatively high-agitation mixer to insure homogeneity. Temperature and pressure in the hydrolysis preparation tank 1016 is generally maintained at within a range of about 240° F. (~115° C.) to about 360° F. (~180° C.), and about 15 psig to about 175 psig respectively, most typically about 275° F. (~1135° C.) and about 35 psig to about 50 psig. Vapors including non-condensable gas such as carbon dioxide, some water vapor and other gases are also exhausted from the top of tank 1016 and can be directed to a condenser. The condensed liquids and noncondensable gases are subsequently processed or discarded. These vapors can also be combined with similar vapors from the decomposition reactor.

Functions of the hydrolysis preparation tank include accumulation of material for maintaining appropriate downstream flow and a checkpoint for monitoring and modifying feedstock specific parameters by addition of appropriate agents. In one exemplary embodiment, pH in the hydrolysis reaction is maintained in a range from about 4.0 to about 5.0 and more specifically from about 4.2 to about 4.3 by addition of suitable agent such as sulfuric acid ($H_2SO_4$) in preparation tank 1016. An acid-metering pump may be used for this purpose.

From hydrolysis preparation tank 1016, the liquid mixture is pressurized by high-pressure pump 1006, up to a pressure in the range of about 800 psig to about 1000 psig. A flow meter downstream of the high-pressure pump can be used to control downstream process flow rate. Alternatively, positive displacement pump speed can be used as a sole method of downstream flow control. From a high-pressure pump the liquid mixture is directed into a heat-exchanger 1030 to raise the temperature up to a temperature in excess of about 220° C. (~430° F.), typically about 250° C. (~480° F.). Temperature may be higher, e.g. 350° C., but again must be controlled to prevent unwanted reactions or formation of emulsions or scaling that can be difficult to breakdown in subsequent steps. This can also be influenced by factors other than temperature, such as pH, which may permit higher operating temperatures.

High temperature thermal fluid, high pressure steam or a combination of waste steam and one of the prior heat sources can be used to accomplish feed heat-up. In one exemplary embodiment, three counter-current, shell and tube, hot-oil heat exchangers are used in series. Additionally, the heat exchangers may be arranged to provide a constant upflow against gravity in order to eliminate gas pockets.

From heat-exchanger 1030, the liquid mixture is directed into hydrolysis reactor 1032 which operates typically at about 700 psig to about 750 psig, which is dependant on the desired operating temperature in the reactor. Temperature in hydrolysis reactor 1032 is maintained from the heat exchangers as described above. It may be between about 240° C. (~460° F.) and about 260° C. (~500° F.), but is typically at least about 250° C. (~480° F.). The hydrolysis reactor may be a stirred tank reactor with or without hydraulic stages or baffles. Vapors including non-condensable gas such as carbon dioxide, some water vapor and other gases are exhausted from the top of the hydrolysis reactor and can be partially condensed and subsequently the condensed liquids and noncondensable gases can be processed or discarded. These vapors also can be combined with similar vapors as described above.

The reacted feed stream typically flows from the top to the bottom of the hydrolysis reactor in a plug flow fashion. The hydrolysis reactor may be jacketed with high pressure steam, high temperature thermal fluid or, other terminal input to maintain hydrolysis temperature. An example of such a reacted feed is shown in the right side of FIG. 14.

Reacted feed from the hydrolysis reactor is directed to second stage separation 130. High-pressure flash vessel 1036 receives the reacted feed from hydrolysis reactor 1032 via a commercially available control valve. Usable waste steam is typically recovered from high-pressure flash tank as previously mentioned for use in decomposition reactor 1014 or for other thermal energy recovery purposes throughout the plant. In one embodiment, pressure in the high-pressure flash tank is flashed down through the previously mentioned control valve from approximately 750 psig in the hydrolysis reaction to about 125-150 psig. Mixing may be employed in the high-pressure flash tank but is not necessarily required. Other pressure set points may be selected in the high pressure flash vessel to create thermal energy at desired pressure and temperature if the waste heat is to be used elsewhere in the plant. Additional flash vessels (e.g. medium pressure flash vessel) can be added to the pressure reduction train in order to produce waste steam at more than one pressure and temperature also.

From high-pressure flash tank 1036, the reacted feed stream is directed to low-pressure flash tank 1038 (or alternatively to a medium pressure flash tank and then to a low pressure flash tank in series). Pressure is further reduced to between 0 psig to about 5 psig. Again, waste steam and non-condensable gases are removed from the top of the vessel and are condensed and treated as appropriate. From low-pressure flash vessel 1038, the reacted feed stream is directed to a decanting and dewatering apparatus 1040. In this step, solid particles are removed using standard commercial equipment such as a centrifugal decanter, a centrifugal basket centrifuge, a hydrocyclone, a settling tank, etc. Solids from step 1040 can be combined with solids from decomposition reactor 1014.

Solids from decomposition reactor 1014 are typically removed and dewatered. This can be accomplished, for example, with an outlet in the bottom of the reactor vessel connected to automated control vales 1022 that are operated in cyclic fashion to remove and decompress a measured volume of solids. Multiple decompression devices may be used to reduce pressure of the solids and liquids extracted in stages. Once solids and liquid are decompressed to ambient pressure, they are fed into a liquid/solid separation device, such as dewatering screw conveyor 1024. Alternatively, this device could be similar to dewatering apparatus 1040. In a further alternative, the solids can be depressurized directly to a low pressure flash vessel so that the solids are separated in dewatering apparatus itself. The solids from dewatering 1024 and 1040 can be combined and directed through a dryer 1026 or other further treatment devices to produce desired end product quality. From this point they may be diverted to appropriate use, disposal or storage 1028.

The liquid phase from decanting and dewatering 1040 can be maintained in a stirred or mixed storage tank 1042 as required. From this point, the liquid phase is subjected to separation step 1044 in which the light phase (oil) is separated from the heavy phase (water). By way of example, a disk-stack style separator may be used for separator 1044. Water from separator 144 is directed to water treatment and concentration step 139 in which it is sufficiently treated such that the effluent water can be directed to a municipal sewage system or other appropriate onsite treatment facilities. Alternatively, the wastewater can be ideal for land application for growing agricultural crops. The concentrate may be utilized as a further useful product such as nitrogen rich fertilizer or alternatively as a medium BTU fuel. An exemplary concentration and treatment processing is described below in more detail.

Oil from separator 1044 may be stored as appropriate in storage tank 1046 for further treatment or oil finishing 140. For example, oil output from storage 1046 may be further dewatered in the gravity dewatering device 1048. Finished oil 1050 may be utilized directly at this point or subjected to further oil finishing steps as described hereinabove. The water removed from the oil at step 1048 can be returned into storage at 1042 and subject to repeated separation in step 1044.

As mentioned above, waste water from separator 1044 is directed to treatment and concentration 139. Here it may be received in equalization tank 1052 in order to maintain proper flow conditions in the subsequent processing. Equalization tank 1052 may have a recirculation circuit or mixing associated therewith as will be appreciated by persons of skill in the art. Waste water is then delivered to a concentrator system which can be based upon several different commercially available evaporation technologies. In one exemplary embodiment, a vapor recompression unit is employed where wastewater is delivered into the primary recirculation loop which consists of a recirculation pump 1058, heat exchanger 1060 and a disengagement vessel 1054. In vessel 1054, the waste water is raised in temperature sufficient to boil and release vapor that is taken off the top of the vessel and directed to caustic scrubber 1056. The scrubbed vapor stream is pressurized in a high compression blower 1058 and condensed in heat exchanger 1060 to produce suitably clean effluent stream 151. Unvaporized liquid from vessel 1054 is circulated by pump 1064 through heat exchanger 1060 and back into the vessel. This process is continued until a suitable concentrate 153 is formed.

An exemplary decomposition reactor 1014A is shown in FIG. 7. While this is a design found suitable for use with animal based agricultural wastes, persons of ordinary skill in the art will appreciate that many specialized reactor designs are possible for use with specific feedstocks based on the teachings contained herein.

As shown in FIG. 7, slurried feed is directed in at inlet 1070 from the feed preparation and storage steps. To help ensure sufficient residence time, baffle 1072 is positioned relative to slurried feed inlet 1070 to direct the feed stream downward and prevent immediate travel to the exit. At the bottom of the reactor, low agitation plow 1074 rotates to ensure uniform mixing without excessive agitation. Solids separated out in the depolymerization reaction are removed through flange 1076 at the bottom of the reactor. Flange 1076 may, for example, mate with valve 1022 as previously described.

In order to prevent lighter solids from becoming entrained in the exiting liquid mixture, screen 1076 separates a lower portion of the reactor from an upper portion from which outlet 1078 takes the exiting reacted, liquid mixture. It will be appreciated by persons of ordinary skill in the art that screen 1076 should be sized to screen out particles whose size is either too large for downstream processing or indicates that insufficient depolymerization has occurred. In one exemplary embodiment where the feedstock is primarily turkey offal, a screen size of 1/16th inch has been found efficacious. In this exemplary embodiment, entrained solids primarily include feathers, which are comparatively light and required extended time for complete depolymerization. The design thus allows for three distinct liquids/solids residence times: hydraulic residence time, high density solids residence time (solids flux) and low density particle residence time. The reacted liquid mixture exits depolymerization reactor 1014A though outlet 1078 for downstream processing. Vapors created during the depolymerization reaction are taken off at tank upper 1080.

To further illustrate how exemplary components of the feedstock are transformed by the processes described above, yield evaluation studies were performed to trace components through the process. For example, such studies have shown that the fat in the raw feed ends up primarily as $C_{16}$-$C_{18}$ carbons in the oil product. Approximately 89% of the fat is transferred to the hydrocarbon liquid that can optionally be sent for further processing. This leaves about 6% of the fat being transferred to the produced water to be recovered and about 5% of the fat being transferred to the minerals. Also, the protein in the stored feed ends up primarily in the produced water. Approximately 50% of the amino acids are transferred directly to the water stream to be recovered as concentrated amino acid solubles while about 8% of the protein residuals are lost as either carbon dioxide or ammonia from the decarboxylation or deamination of amino acids, respectively. In more water-intensive environments, the AAs will tend to decarboxylate while in drier environments, the AAs will tend to deaminate. Ultimately, this leaves about 35% of the AAs being transferred to the hydrocarbon liquid that may be sent to the third stage with the remaining 7% of the AAs in the minerals. The fiber/carbohydrates in the stored feed end up equally in the produced water and minerals. Approximately 50% of the carbs are transferred directly to the water stream while 50% of the carbohydrates are left in the minerals.

Example 2

Pilot Plant—Shredder Residue Processing

A pilot plant also has been built employing apparatus and processes of the present invention. As shown in FIG. 8, raw feed (typically SR, but the illustrated process also generally applies to MSW, which can be similar in composition, and other mixed plastic/rubber feeds) is received from the source, such a recycler, already ground in suitable size particles for processing (generally about ½" to about 6" across). Therefore very little feedstock preparation is generally required. It may be desirable to mix the raw feed with a liquid input 2003 to facilitate flowability of the raw feed and assist in reactions and heat transfer during subsequent processing. Persons of ordinary skill in the art may select suitable liquid inputs 2003 based on specific composition of particular raw feeds. For example, for SR as described herein, suitable liquid inputs include high molecular weight waste or virgin liquids such as used automotive fluids, crude oil or bunker fuel, all of which readily decompose under subsequent reaction conditions along with the feedstock so as not to unnecessarily prolong or increase the energy requirements of the reactions. Other optional treatments may include specific solvents or catalysts to address a particular composition of a specific feedstock batch.

Raw feed with optional treatments is delivered to first decomposition reactor 2002. Conditions in the first decomposition reactor for treatment of SR are generally temperature in the range of about 250° C. (~480° F.) to about 400° C. (~750° F.), more specifically about 260° C. (~500° F.) to about 350° C. (~660° F.), and most typically about 315° C.-345° C. (~600-650° F.). With the equipment used in the pilot plant, pressure was in the range of about 55-150 psig and more specifically about 100-120 psig. Optionally, with a suitable pressure vessel, pressure may be increased up to a range of about 200-220 psig. Intermediate products of the first decomposition reaction include steam and light hydrocarbon vapors taken off at upper 2002a, mixed heavy and medium hydrocarbon oils and fine particulate matter in a gel-like form taken off at 2002b, and carbon solids and more robust solids that have not completely depolymerized, such rubber and hard plastics, removed at 2002c. Conditions during decomposition are controlled to at least substantially inhibit the formation of ash or char.

The carbon solids removed at 2002c are directed to a second decomposition reactor 2006. In the one exemplary embodiment, first reactor 2002 is disposed vertically above second reactor 2006 so that the solid material may be transferred from the first reactor to the second reactor primarily via gravity. In such an embodiment, decompression valves 2004 can be positioned between the two reactors to provide a gating effect for the transfer. The process as shown in FIG. 8 may be run continuously, or in batches. Depending on the processing mode, reactors 2002 and 2006 may be appropriately sized and controlled. For example, in a batch processing mode, since the volumetric reduction of the materials transferred from the first to the second reactor is approximately four to one, if the same sized reactors are used, four cycles of first reactor 2002 can be run for each cycle of the second reactor 2006.

In second reactor 2006, solids from the first decomposition/depolymerization reaction are mixed with an appropriate solvent and subjected to further reaction. In one embodiment, a solvent used is a light hydrocarbon oil introduced at 2006c, which is derived from liquid and vapor fractions from the depolymerization process as described in greater detail below. Conditions in second reactor 2006 are generally temperature at about 250° F. (~120° C.) to about 450° F. (~235° C.), and more specifically about 300-350° F. (~145° C.-180° C.), and pressure in the range of about 100-150 psig. Again, with an appropriate pressure vessel, the reaction temperature may be increased to a range of about 580-720° F. (~300° C.-380° C.), more specifically about 650° F., concomitantly increasing pressure to about 200-250 psig. The vapor phase from reactor 2006 is removed at upper outlet 2006a and mixed with the vapor phase from 2002a of the first reactor. Solids and any remaining heavy liquids are discharged at 2006b into solvent/steam wash 2008. Again, in one exemplary embodiment, wash 2008 is disposed vertically below reactor 2006 and gating valves 2004 are used to control movement of materials.

In a further alternative embodiment, the first and second reactors could be combined in a single vessel provided that the vessel was capable of subjecting the feedstock to temperatures in the range of about 330-360° C. (~625-675° F.) for about 1.5-2.5 hours and also capable of withstanding pressures generated at those temperatures, generally about 80-120 psig. In an exemplary embodiment, the approximate temperature, pressure, and time would be about 345° C. (~650° F.), 100 psig and 2 hours, respectively.

Solvent/steam wash 2008 is used to remove contaminants and hydrocarbon oils from the remaining solid products after decomposition. In solvent/steam wash 2008, an appropriate solvent, which may be internally produced (e.g. stream 2030c) or out-sourced, is first used to wash the depolymerized solids, followed by a steam wash. A trickle filter and/or screen conveyor may be employed as will be understood by persons of ordinary skill in the art. After washing, carbon and other remaining solids are directed to solids storage 2010 for accumulation and sale, further processing or disposal as appropriate. An example of such solids is shown in the left side of FIG. 13. Any medium or heavy hydrocarbon oil and possibly entrained water from the washed stage are directed at 2008a to screening and hydrolysis as discussed in detail below. Steam from wash step 2008 is exhausted at 2008b and directed to a condenser 2009 for delivery to hydrolysis reactor 2018, again, as discussed further below.

Figure 15:
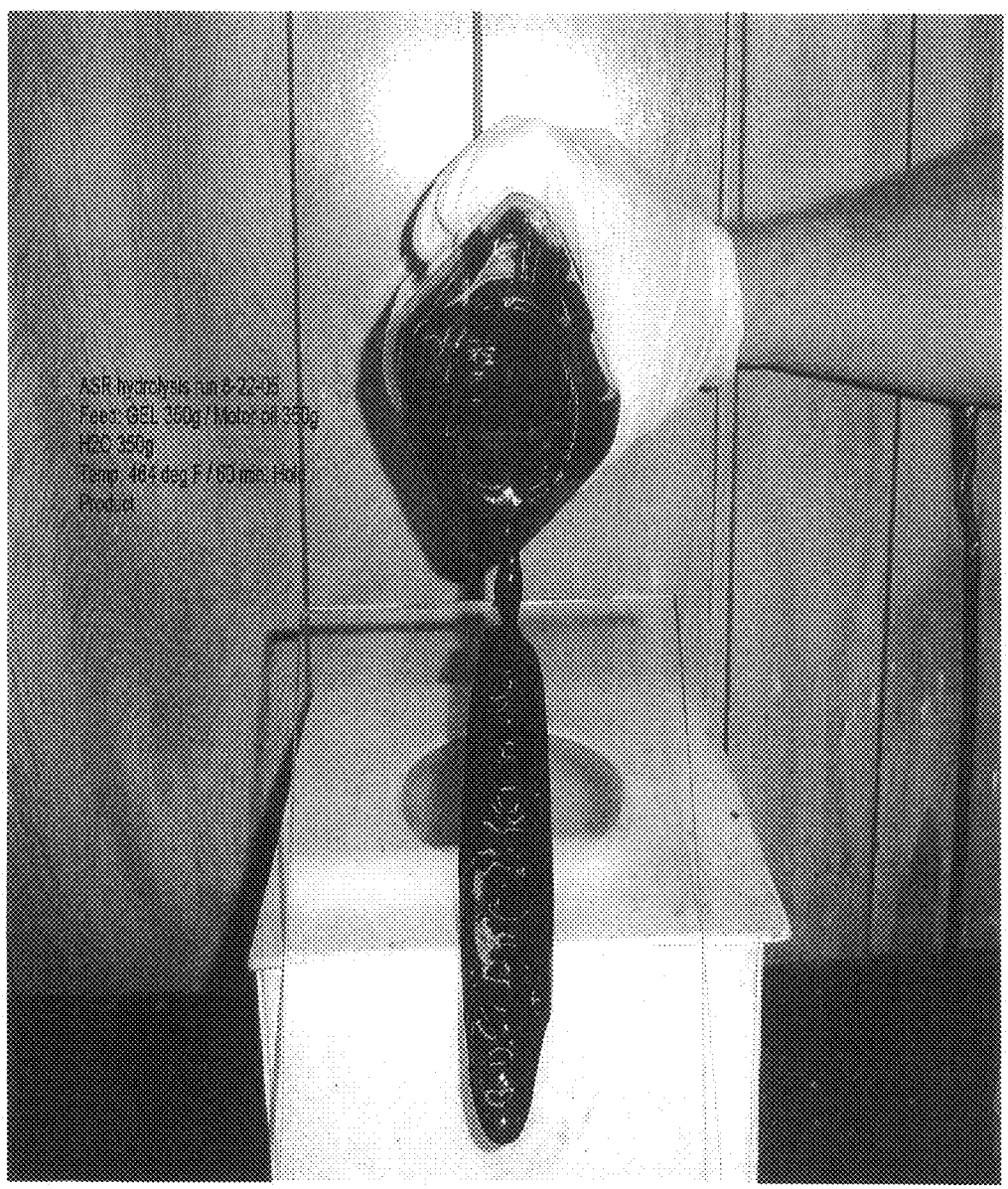
FIG. 15 depicts an exemplary hydrolyzed intermediate oil produced using shredder residue as raw feedstock.

Medium and heavy hydrocarbon oils with entrained fine particulate matter is removed from first reactor 2002 at outlet 2002b as discussed above and directed to screening process 2012. An example of the output at 2002b, taken from a bench top run, is shown in FIG. 15. Persons of ordinary skill in the art will appreciate that any combination of commercial screens and particle separators may be used at this stage. In one exemplary embodiment, screening 2012 comprises in sequence a 1/16-inch screen followed by a first-basket centrifuge with a 280 μm screen followed by the second-basket centrifuge with a 25 μm screen. Particulate fines removed in screening 2012 are directed at 2012b back to solids storage 2010. Output of the screening process at 2012a is a relatively particulate-free medium and heavy hydrocarbon oil in a gel-like state. An example is shown in the right side of FIG. 13. This mixed medium and heavy hydrocarbon oil is directed to a distillation column 2014 for a rough distillation or separation. The light hydrocarbons remaining in the feed stream 2012a are separated at 2014a and directed into the recycle loop 2006c for the second reactor 2006. The medium-weight hydrocarbon oils are extracted at 2014b and may be alternatively stored for subsequent use or processing, or directed back into first reactor 2002 after the depolymerization reaction is complete in order to increase fluidity of the solids to facilitate screening and plasticizing in subsequent reactions. This medium hydrocarbon oil can be similar in character to a diesel fuel. Heavy hydrocarbon oils are removed at 2014c and directed to hydrolysis reactor 2018.

Optionally, heavy hydrocarbon oils may be premixed with steam at 2016 to increase temperature and water content entering hydrolysis reactor 2018. Conditions in hydrolysis reactor 2018 generally may range in temperature from about 390° F. (~200° C.) to about 575° F. (~300° C.) and in pressure from about 600 psig to about 800 psig. In one exemplary embodiment, the temperature was approximately 250 to 270° C. (~480° F.-520° F.) and pressure at about 650 psig.

Products of hydrolysis reactor 2018 are directed to flash 2020. This may comprise high-pressure and low-pressure flash vessels, including heat and vapor recovery as previously described. Typical flash steps may be a high pressure flash down to about 300-375 psig and a low pressure flash down to about 50-120 psig. From flash 2020, the reacted feed is directed to decanting and dewatering 2022. Again, decanting and dewatering 2022 may comprise multiple steps and apparatus as described hereinabove. For example, an auger decanter and centrifuge may be used. Outputs from decanting and dewatering 2022 include hydrocarbon oils at 2022a directed to oil storage 2026 for storage, use or subsequent oil finishing steps, solids at 2022b directed to solids storage 2010, and water at 2022c directed to water cleanup 2024. In particular, in water cleanup 2024, chlorine is removed and the water recycled back into hydrolysis reactor 2018. Alternatively, excess water that has been sufficiently cleaned can be discharged for example to a municipal water treatment system 2024a. Conventional water cleanup techniques generally may be employed in water cleanup 2024.

Returning to the first reactor 2002, as mentioned above, vapors removed are taken off via tank upper 2002a and combined with similar vapors taken off from the tank uppers 2006a of the second reactor. These combined light-hydrocarbon-containing vapors are condensed in condenser 2028 to produce a liquid oil mixture with entrained noncondensable gases. This mixture is directed to separator 2030. Separator 2030 may be a gravity or centrifuge separator. Noncondensable gases, for example methane or propane, are taken off at 2030a and directed to disposal, storage or subsequent use. The water phase is taken off at 2030b and directed into water cleanup 2024 for recycle in hydrolysis reactor 2018. The light hydrocarbon oil phase is taken off at 2030c, combined with similar light hydrocarbon oils from distillation at 2014a and directed back into the second reactor at 2006c as previously described. It has been found that use of light hydrocarbon oil derived from the process itself provides excellent solvent characteristics for use in facilitating the decomposition or depolymerization reaction; in particular the second decomposition reaction when embodiments employing two separate reactors are employed.

Depending on the contaminant content of the light hydrocarbon oil and/or the medium hydrocarbon oil, either may be directed to hydrolysis for contaminant removal as previously explained. For example, the system as shown in FIG. 8 is designed such that if the contaminant level of the light hydrocarbon oil exceeds a predetermined threshold, it can be diverted to hydrolysis reactor 2018 via valve 2031. While not shown in the figure, a similar diversion of the medium hydrocarbon oil from outlet 2014b may be provided by a person of ordinary skill. One non-limiting example of such a contaminant threshold would be a chloride content exceeding 5 ppm. Specific thresholds will depend on factors such as government regulation and customer specifications, and the process may be adjusted accordingly. Note that as used herein, heavy, medium and light hydrocarbons refers to high molecular weight, moderate molecular weight and low molecular weight hydrocarbons, respectively, as those terms are understood in the art.

In an exemplary process run, of 3000 lbs. of SR material received, 1072 lbs of dirt/fines was removed with a 1/16″ vibrating screen and washed with hot water, 715.5 lbs of fines-free SR were processed through the decomposition/depolymerization unit, and 1212.5 lbs of fines-free SR were held back for future testing. The fines-free SR material was processed through the decomposition/depolymerization unit along with 79.5 lbs of shredded tires and about 1741 lbs of used motor oil.

Samples of the various products were sent out for analysis to determine the fate of heavy metals and of contaminants such as PCBs and chlorine. Based on results from comparative sample analyses, PCBs were found to be reduced by an order of magnitude, from 35-65 ppm down to less than 2 ppm.

Figure 9:
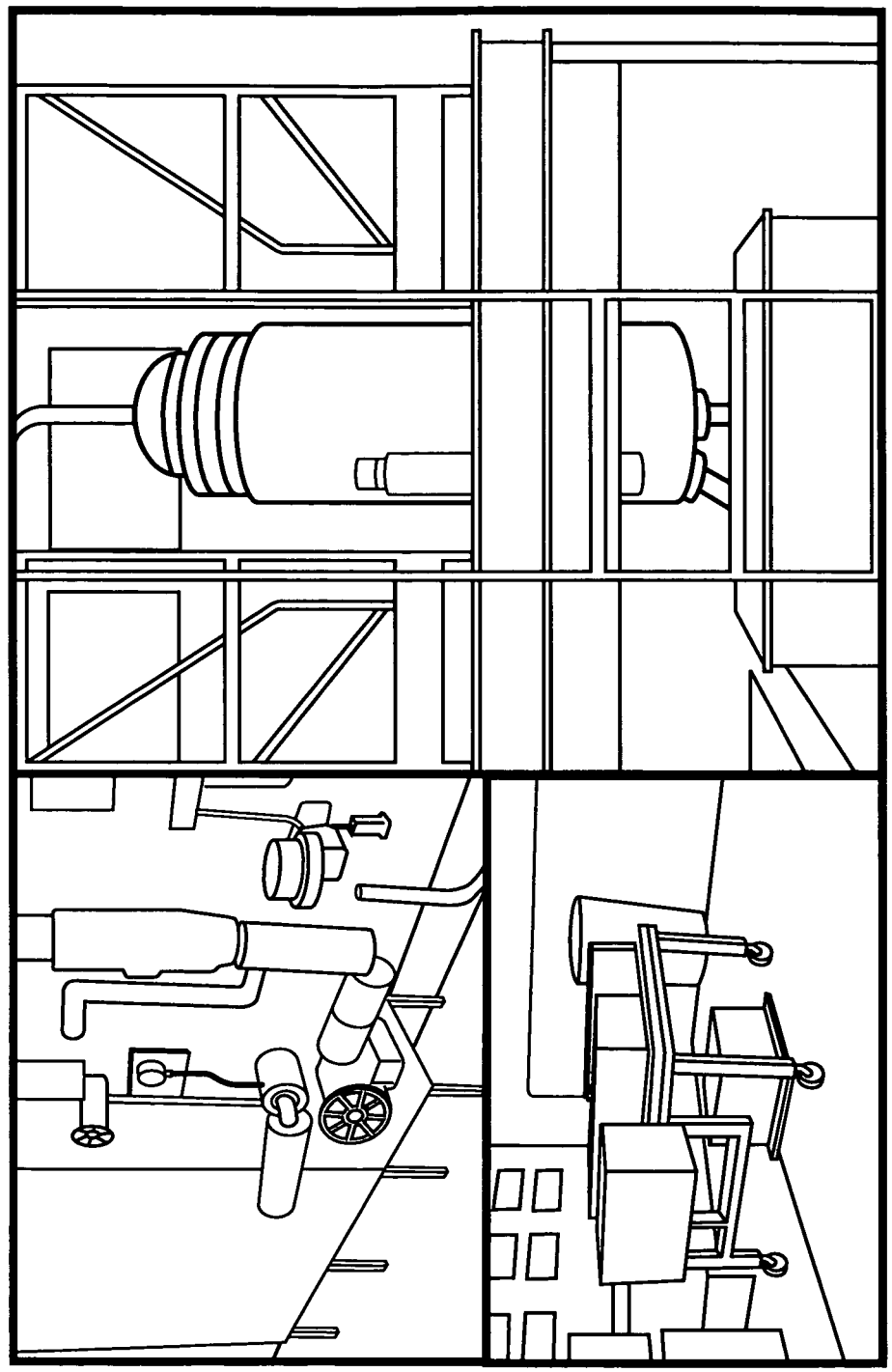
FIG. 9 depicts an embodiment of an exemplary pilot plant reactor and separation unit.

The feedstock as described above was processed into a gel and a heavy oil/solids matrix using a decomposition/depolymerization unit comprised of a 75-gallon vessel capable of operation at temperatures up to 340° C. (~650° F.) and pressures up to 100 psig. The equipment is illustrated in the right hand photo of FIG. 9. To offset the restriction on maximum operating temperature to 300° C. (~570° F.) from the particular equipment configuration employed in the pilot tests and hot oil system operating temperature, the residence time of the runs was increased to fit within an 8-hour day. At higher temperatures, the depolymerization process can take less than one hour.

The heavy oil/solids matrix was washed using diesel fuel as a convenient solvent yielding a 55:45 ratio of extractable gel to unconverted solid material. This extractable gel was combined with the easily removed gel from the depolymerization unit and used as the feedstock for the hydrolysis step. Of the 2,536 lbs of SR-tires-oil feedstock that were processed in the depolymerization unit, 1,925 lbs were converted to a low-ash gel. Those of ordinary skill in the art will appreciate that the amount of gel generated from the process described will vary due to a number of factors, e.g. test duration and the amount of inorganics in the raw feed, etc. There were approximately 113 lbs of overhead vapors and about 343 lbs of unconvertible solids.

At the end of depolymerization process, water and gas from the unit were flashed to atmospheric pressure. The unit was cooled to 195° F. (90° C.) before transferring the depolymerized SR to a storage tank. The solid metal and inorganic objects retained in the decomposition/depolymerization unit were removed after the liquid has been drained.

The hydrolysis runs processed a portion of the depolymerization product. About 800 lbs of depolymerized SR/tires/oil, along with 800 lbs of used motor oil to add fluidity to the cold depolymerization product, and 900 lbs of water were processed through the hydrolysis step at a rate of 3 lb/minute. The mixture was subjected to temperatures with the range from about 440° F. (225° C.) to about 500° F. (260° C.). After hydrolysis, reacted feed from the shredder residue was flashed and stored in a flash tank. Post-hydrolysis processing included solid/liquid separation to remove residual solids objects such as wood chips, and liquid/liquid separation to remove oil from water. Centrifuges were used for these separations.

The chemical and physical characteristics of the hydrolyzed hydrocarbon liquid are listed in Table 8 below:

TABLE 8

Hydrocarbon Liquid Characteristics From Shredder Residue

| Test | APS |
|---|---|
| Density @ 15 Deg. C. | 0.8818 |
| Flash point, ° F. | 230 |
| Sulfur wt % | 0.245 |
| Pour point | −16° F./−21° C. |
| Viscosity @ 40 C., cSt | 229.9 |
| Viscosity @ 100 C., cSt | 23.13 |
| Water & Sediment, Vol. % | 18 |
| Ash wt % | 0.076 |

The nearly complete removal of heavy metals, chloride, bromine, and PCBs from the SR/tire feedstock in hydrolysis is shown in the tables below. This shows that the oil produced, and any refined products from this oil, will be virtually free of undesirable PCBs, chlorides, or other halides.

TABLE 9

Contaminant Removal - Heavy Metals

| HEAVY METALS | SR Feed | Depolymerized Gel | Hydrolyzed Oil* |
|---|---|---|---|
| Arsenic (total) | 13 | ND | ND/ND |
| Barium | 370 | 58 | 13/4.7 |
| Cadmium (total) | 13 | 5.5 | 2.7/ND |
| Chromium | 94 | 4.5 | ND/6.1 |
| Copper | 4167 | 58 | 36/36 |
| Iron | — | 1000 | 560/1200 |
| Lead | 740 | 58 | 13/29 |
| Mercury | 1.23 | 0.21 | 0.16/ND |
| Nickel | — | ND | ND/ND |
| Selenium | ND | ND | ND/ND |
| Silver | ND | ND | ND/ND |
| Zinc | 5233 | 850 | 870/760 |

TABLE 10

| HALIDES & PCBs | SR Feed | Depolymerized Gel | Hydrolyzed Oil |
|---|---|---|---|
| Bromine | 94 | 133 | ND/ND |
| Chlorine | — | 3200 | 209/118 |
| PCBs | 22 | 31 | ND/ND |

Contaminant Removal - Halides & PCBs

Example 2A

Thermal Cracking And Distillation of SR Hydrolyzed Oil

Figure 10:
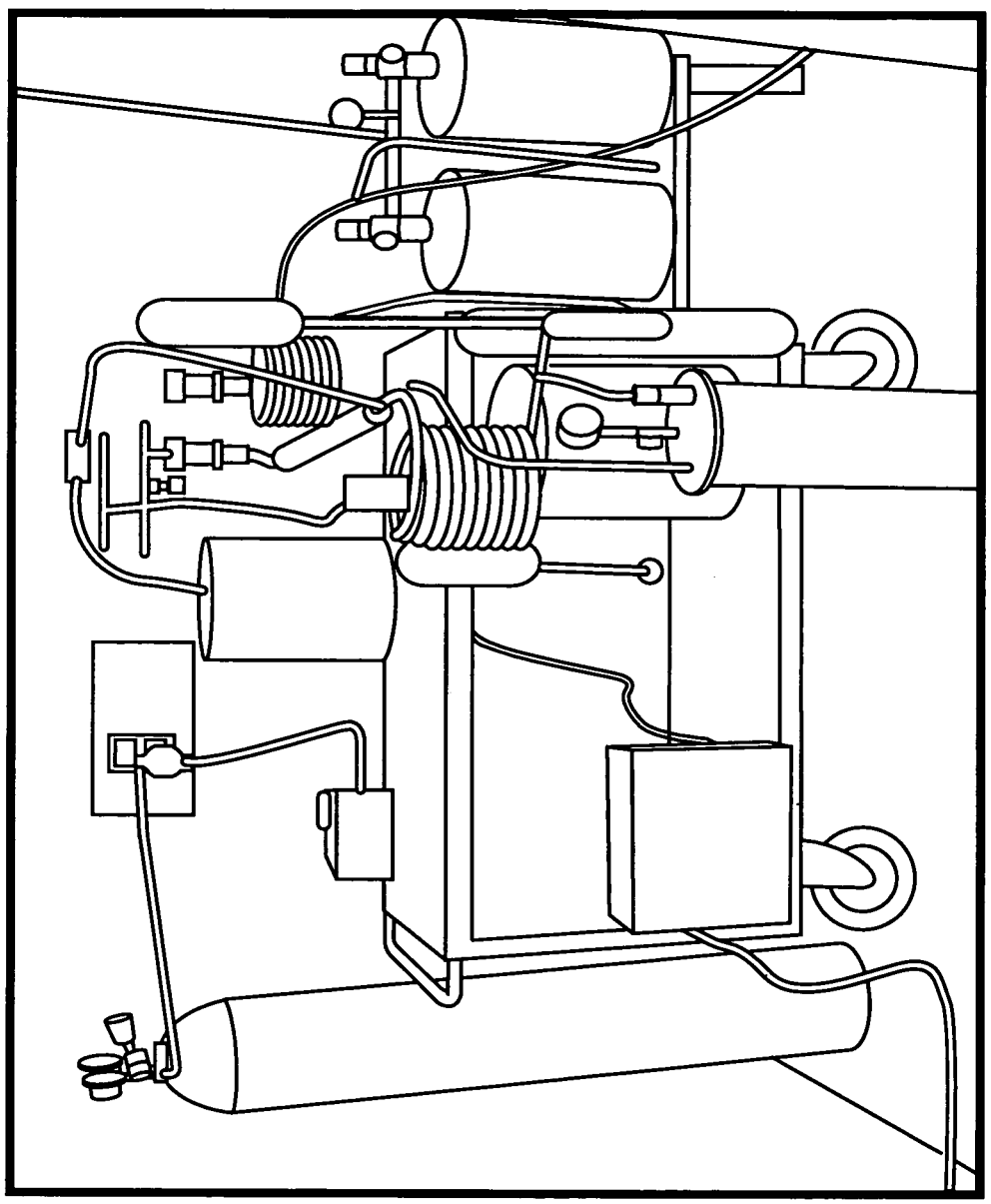
FIG. 10 depicts an exemplary bench-scale test apparatus useful for the present invention.
Figure 11:
FIG. 11 depicts an exemplary shredder residue sample.
Figure 12:
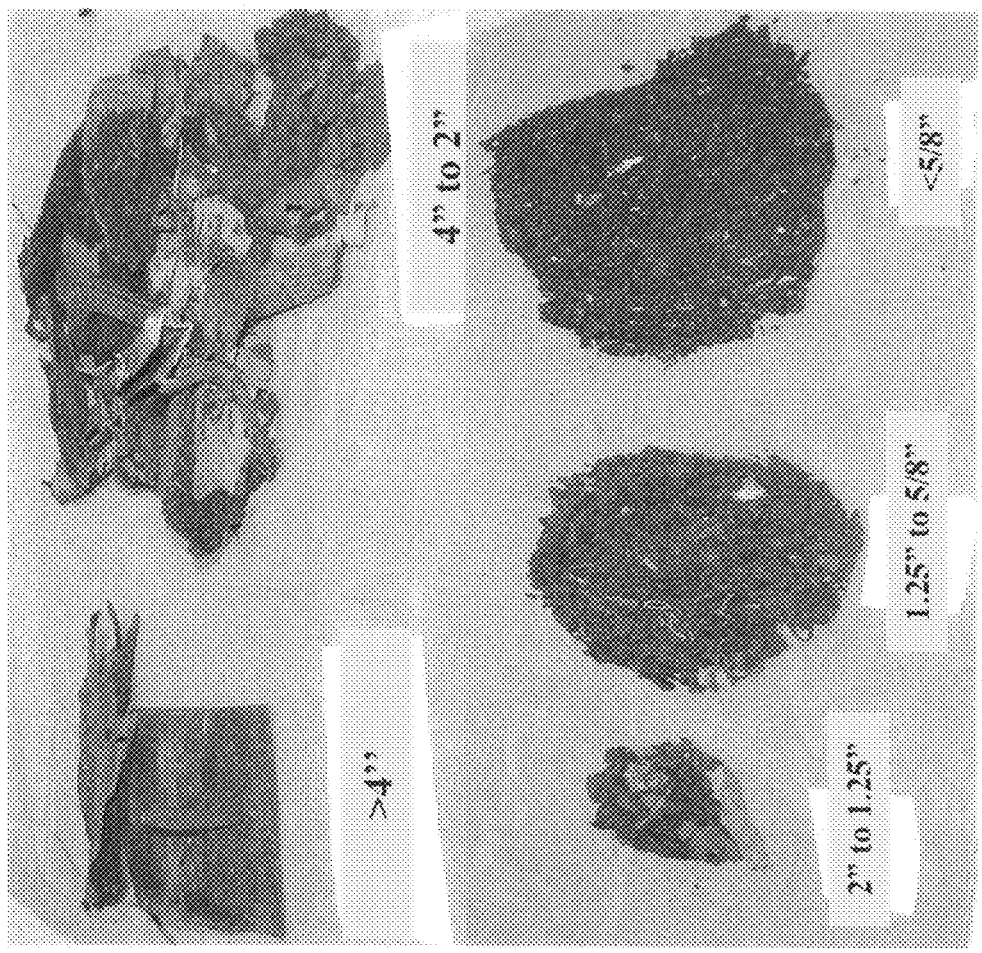
FIG. 12 depicts exemplary shredder residue fractions of various sizes.

Approximately 10 liters of hydrocarbon liquid from the SR Example above was thermally cracked in a bench-scale reactor at temperatures near approximately 500° C. (930° F.) in six runs to produce a refined hydrocarbon oil, a fuel-gas, and a solid carbon product. A photo-graph of the bench-scale thermal cracking unit is shown in FIG. 10. Gas and oil vapor were vented during the reaction in order to maintain a target pressure. The run was terminated when gas evolution stopped, as indicated by a constant gas pressure. The distribution of oils/gas/carbon fractions from the thermal cracker was about 84%, 10%, and 6%, respectively.

One cracked oil product is a renewable diesel similar to conventional diesel fuel. This cracked oil can be used for a variety of purposes, e.g. as a direct replacement for diesel fuel or as a blending component for diesel fuel. The chemical and physical characteristics of the cracked oil are listed below in Table 11.

TABLE 11

Cracked Oil Characteristics from SR

| | |
|---|---|
| API at 60° F. | 48.7 |
| Distillation, ° F. | |
| IBP | 96 |
| 10% | 206 |
| 50% | 396 |
| 90% | 643 |
| FBP | 652 |
| Density @ 15 Deg. C. | 0.785 |
| Flash point, ° F. | <72 |
| Sulfur wt % | 0.0625 |
| Cloud point, ° F. | Below −33° F. |
| Pour point | Below −33° F. |
| Viscosity @ 40 C., cSt | 1.00 |
| Viscosity @ 100 C., cSt | TBD |
| Water & Sediment, Vol. % | 0.2 |
| Ash Content wt % | <0.001 |
| Carbon Residue, Wt % | 0.35 |
| Cetane Index | 52.2 |

The cracked oil also can be further distilled into gasoline and other fractions. The distillation of the cracked oil by conventional means yielded 12% light distillate fuel, 38% middle distillate, 32% diesel, and 15% heavy fuel oil with 3% of the feed as noncondensable gases.

TABLE 12

Distilled Hydrocarbons

| Distillation Cut | Industrial Uses | Temp Range |
|---|---|---|
| Light Distillate | Gasoline; motor fuel | 122-302° F. |
| Middle Distillate | Kerosene; jet fuel | 302-482° F. |
| Diesel | Diesel fuel; heating oil | 482-644° F. |
| Heavy Fuel Oil | Industrial fuel | 644-676° F. |

Figure 17:
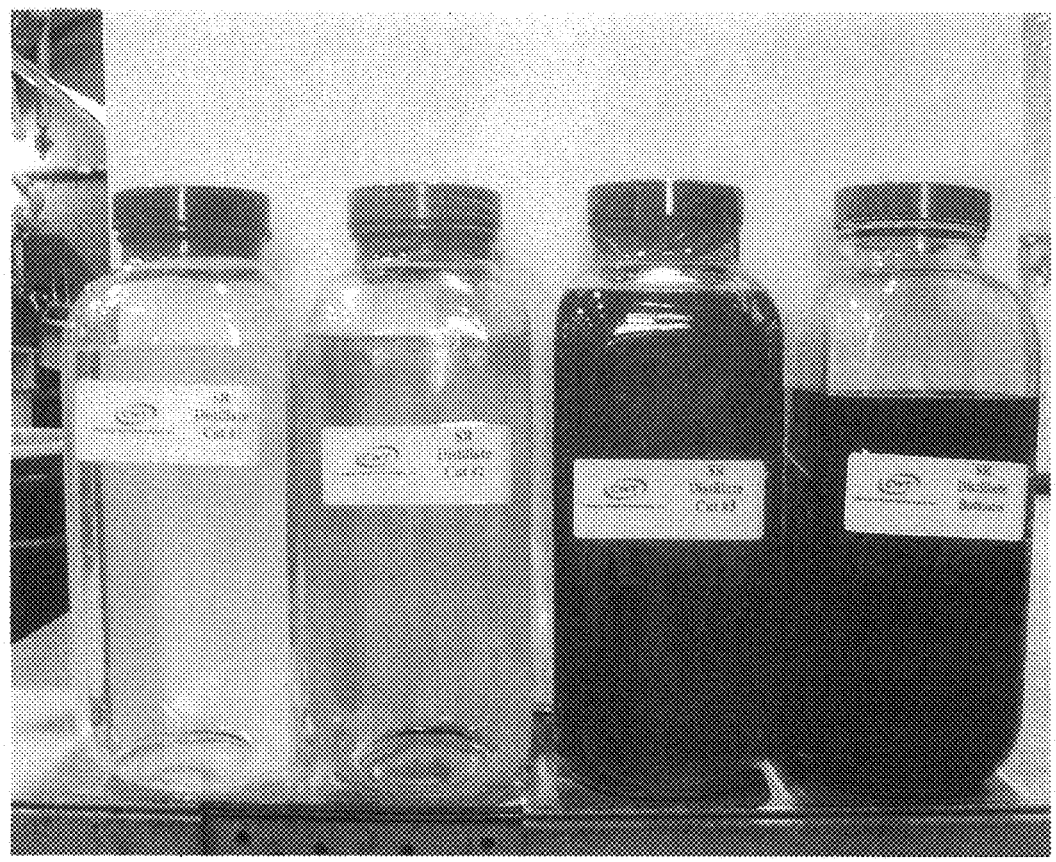
FIG. 17 depicts exemplary distilled cracked oil products produced using an embodiment of the present invention.
Figure 18:
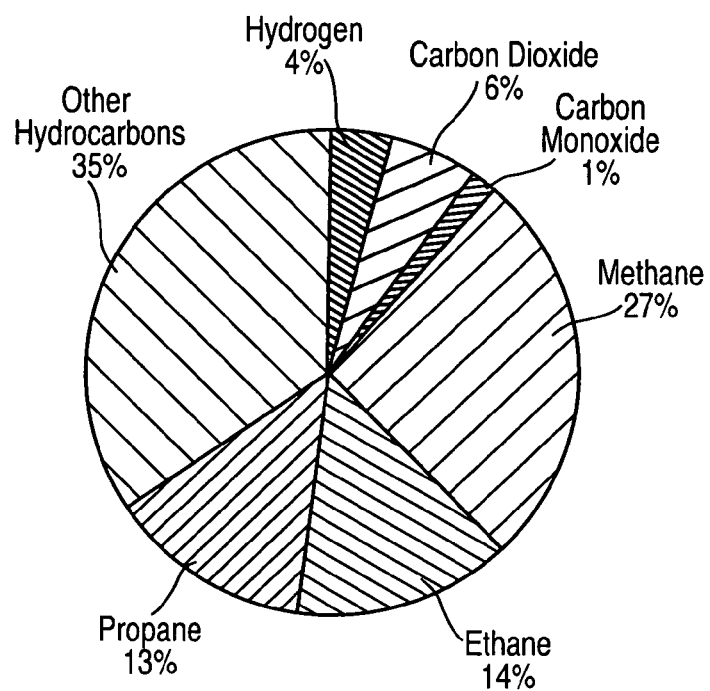
FIG. 18 shows an exemplary breakdown of various chemicals found in cracking fuel-gas from an embodiment of the present invention as applied to shredder residue.

These four fractions are shown in FIG. 17.

Example 3

Pilot Plant—Turkey Processing

A pilot plant was also built employing apparatus and processes of the present invention. The pilot plant handled approximately seven tons of waste per day. The pilot plant in this example was operated similarly to the process described in connection with in FIGS. 3-5.

According to one exemplary application of the pilot plant, the experimental feedstock was agricultural waste comprising turkey processing-plant waste: feathers, bones, skin, blood, fat, viscera. An amount of 10,044 pounds of this material was directed into a preparation stage comprising a 350-horsepower grinder, which converted the material into gray-brown slurry. From there, the material flowed into a series of tanks and pipes which heated and reformed the mixture.

Figure 16:
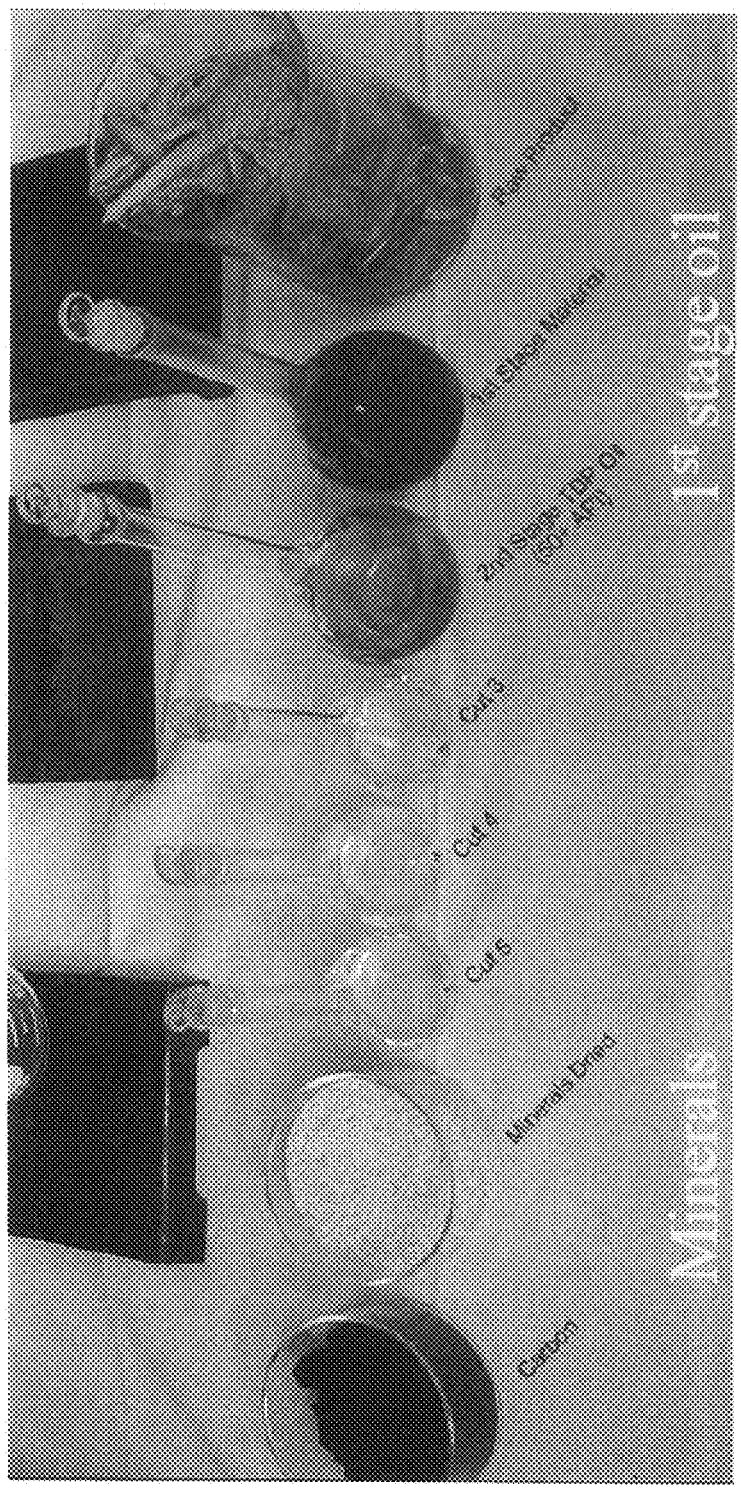
FIG. 16 depicts starting materials (turkey offal), intermediate, and final products according to an embodiment of the present invention.

Two hours later, a light-brown stream of steaming fine oil was produced. The oil produced by this process is very light. The longest carbon chains are $C_{20}$. The produced oil is similar to a mix of half fuel oil, half gasoline. Examples of the feedstock (raw product) and various products of the process are shown in FIG. 16.

The process of this exemplary embodiment proved to be about 85% energy efficient. This means that for every 100 B.t.u. (British thermal units) in the feedstock entering the plant, only 15 B.t.u. are used to run the process. The efficiency is even better for relatively dry materials, such as carbon-heavy or moisture-light raw materials such as mixed plastics as described in other examples.

Such testing has shown that the conversion of each of the agricultural feedstock solid components (fat, protein, ash, carbohydrates) follows the corresponding pattern on average:

TABLE 13

Agricultural Feedstock Conversion

| | Oil % | Gas % | Mineral % | Concentrate % | Totals % |
|---|---|---|---|---|---|
| Fat Conversion | 89.0 | 0.0 | 5.0 | 6.0 | 100.0 |
| Protein Conversion | 35.0 | 8.0 | 7.0 | 50.0 | 100.0 |
| Ash Conversion | 0.2 | 0.0 | 94.8 | 5.0 | 100.0 |
| Carbs Conversion | 0.0 | 0.0 | 50.0 | 50.0 | 100.0 |

As another example, below is the composition of each intermediate from the processing of turkey offal as the raw feed 100:

TABLE 14

Intermediates and Product Composition - Turkey Offal Feedstock

| ANALYSIS | RAW FEED | $1^{ST}$ STAGE | OIL | MINERALS | CONCEN-TRATE |
|---|---|---|---|---|---|
| MOISTURE, % | 60.0 | 77.0 | 3.9 | 42.0 | 37.0 |
| PROTEIN, % | 16.0 | 10.0 | 24.0 | 7.0 | 44.0 |
| FAT, % | 16.0 | 10.0 | 72.0 | 2.0 | 12.0 |
| ASH, % | 7.0 | 2.0 | 0.1 | 46.0 | 5.0 |
| CARBS, % | 1.0 | 1.0 | 0.0 | 3.0 | 2.0 |

The hydrolysis stage reactor comprised a tank approximately 20 feet tall, three feet wide, and heavily insulated and wrapped with electric-heating coils. In the hydrolysis stage reactor, feedstock is hydrolyzed by means of heat and pressure. Both temperatures and pressures are not very extreme or energy-intensive to produce because water assists in conveying heat into the feedstock. It usually takes only about 15 minutes for this process to occur in this pilot plant embodiment.

After the organic materials are heated and partially depolymerized in the reactor vessel, a second stage begins. In this phase, the slurry is dropped to a lower pressure. The rapid depressurization instantly releases about half of the slurry's free water. Dehydration via depressurization is far more efficient than heating and boiling off the water, particularly because no heat is wasted. Water that is 'flashed-off' is sent up a pipe that leads back to the beginning of the process to heat the incoming process stream.

In this second stage, the minerals settle out, and get shunted to storage tanks. In turkey waste, these minerals come mostly from bones. The minerals come out as a dried brown-colored powder that is rich in calcium and phosphorous. It can be used as a fertilizer because it is well-balanced in micro-nutrients. In particular it has a useful range of micro- and macro-nutrients. The minerals contain the correct amounts of elements such as calcium and phosphorous required for healthy plant growth and development.

In the pilot plant, the remaining concentrated organic materials flow into an oil finishing stage reactor and is subjected to oil finishing stage processing, as described hereinabove. Gases resulting from the processing were used on-site in the plant to heat the process of the present invention. The oil and carbon flow into storage as useful higher value products.

Depending on the feedstock and processing times, the process of the present invention can make other specialty chemicals, which are extracted at various sections of the process. Turkey offal, for example, can make fatty acids for use in soap, tires, paints and lubricants.

Example 4

Exemplary Conversions of Waste Materials

Table 15 shows end-products, and their proportions, for 100 lbs of each of the following feedstock, when converted to useful materials using a process of the present invention: Municipal Sewage Waste (comprising about 75% sewage sludge and about 25% grease-trap waste); Tires; Poultry Processing Waste (comprising organs, bones, blood, feathers and fat); mixed Plastics (comprising a mixture of Polyethylene Terephthalate (PET) used to make soda bottles, and High Density Polyethylene (HDPE) used to make milk jugs); Paper; Medical Waste (originates primarily from hospitals and comprises plastic syringes, transfusion bags, gauze, paper wrappers and wet wastes); and Heavy Oil (such as refinery-vacuum residues and tar sands). Output amounts in Table 16 are in pounds.

TABLE 15

Conversion Percentages for Exemplary Feedstocks

| Feedstock | Oil | Gas | Solids & Concentrate | Water |
|---|---|---|---|---|
| Municipal Sewage Sludge | 26 | 9 | 8 (carbon and mineral solids)[1] | 57 |
| Tires | 44 | 10 | 42 (carbon and metal solids) | 4 |
| Poultry Processing Waste[2] | 39 | 6 | 5 (carbon and mineral solids) | 50 |
| Mixed Plastics | 70 | 16 | 6 (carbon solids) | 8 |
| Paper[3] | 8 | 48 | 24 (carbon solids) | 20 |
| Medical Waste | 65 | 10 | 5 (carbon and metal solids) | 20 |
| Heavy Oil | 74 | 17 | 9 (carbon solids). | — |

[1]The solid output from municipal sewage sludge may also contain heavy metals.
[2]Yields from cattle and pork processing wastes are similar to those from poultry processing waste.
[3]For paper, the figures are based on pure cellulose; it is estimated that yields for specific paper feedstocks such as newspapers or office waste paper would be within 10% of these figures.

Example 5

Hydrolyzed Oil

Different compositions of oil can be produced from a wide range of organic materials using the process of the present invention. An exemplary fuel was produced using animal offal as feedstock and diverted from the process after separation and oil finishing involving water removal. Particulate emissions resulting from the use of this fuel is virtually negligible. This fuel provides refineries or blenders with sustainable fuel that can be used either as an alternative fuel, or a blending component for combustible fuels. Salient properties of this fuel are shown below in Table 17. Testing methods specified in the table are designated by an ASTM (American Society for Testing Materials) code.

TABLE 17

Hydrolyzed Oil Properties

| Property | Testing Method | Hydrolyzed Oil |
|---|---|---|
| Moisture (%) | D95 | <0.10 |
| API Gravity at 60° F. | D1298 | 22.6 |
| Specific gravity at 60° F. | | 0.9182 |
| Sulfur (%) | D4294 | 0.15% |
| BTU per pound | | 16,407 |
| BTU per gallon | D240 | 125,447 |
| Ash (%) | D482 | 0.030% |
| Carbon Residue (%) | D524/D189 | 6.16% |
| Pour Point (OF) | D97 | 65° F. |

TABLE 17-continued

Hydrolyzed Oil Properties

| Property | Testing Method | Hydrolyzed Oil |
|---|---|---|
| Carbon (%) | D5291 | 74.01% |
| Hydrogen (%) | D5291 | 11.57% |
| Nitrogen (%) | D3228 | 1.03% |
| Oxygen (%) | D5291 | 13.21% |
| Asphaltenes (%) | D3279/IPI43 | 0.96% |
| Viscosity @ 122° F.(~mm$^2$/s) | D445 | 50.6 mm$^2$/s |
| Inorganic Chlorides (%) | D512 | 0.006% |
| Organic Chlorine (%) | | <0.005% |
| Metals in Ash | | |
| Aluminum (ppm) | D482 | <1.0 ppm |
| Magnesium (ppm) | | 1.04 ppm |
| Calcium (ppm) | | 1.60 ppm |
| Silica (ppm) | | 36.5 ppm |
| Iron (ppm) | | 25.5 ppm |
| Sodium (ppm) | | 48.5 ppm |
| Vanadium (ppm) | | <1.0 ppm |

Example 6

Benchtop Conversion of Shredder Residue (SR)

Using a benchtop apparatus such as illustrated in FIG. 10, 1 with an approximately two (2) liter reactor chamber, SR was processed according to the present invention as described herein to obtain a cracked oil having the following characteristics:

| | |
|---|---|
| API at 60° F. | 40.7 |
| Distillation, ° F. | |
| IBP | 119 |
| 10% | 234 |
| 50% | 451 |
| 90% | 652 |
| FBP | 691 |
| Sulfur wt % | 0.124 |
| Ash wt % | 0.003 |
| Nitrogen % | <0.1 |
| BTU/lb | 18,622 |
| BTU/Gal | 127,409 |

Example 7

Benchtop Conversion of Mixed Grass Feedstock

In a pilot run, about 225 g of a mixed grass feedstock was size-reduced to 1' pieces for input into a Parr reactor fitted with a mechanical stirrer to implement the process described herein. Components of the mixed grass feedstock included Switchgrasss, Indiangrass, Big Bluestem, Little Bluestem, Canada Wildrye, Virginia Wildrye, and Goldenrod wildflowers. The mixed grass was processed as-is but the moisture content was optimized to yield the best conditions to generate a free liquid and recoverable solids. The raw feed first underwent first stage depolymerization at 150° C. (~300° F.), 29 psig for a duration of 0.5 h followed by first stage hydrolysis at 250° C. (~480° F.), 609 psig for a duration of 0.5 h. This run produced 182.1 g of first stage solids, 5.3 g of flashed water, and 37.6 g (by diff.) of gases. The Parr reactor residuals, e.g. produced water, organic liquid, and mineral matrix, was separated using a separation technique selected from hot centrifugation, washing and sieving, screw-drying, decanting, and belt-pressing amongst other techniques.

Products were photographed and physical characteristics, such as product texture, smell, color, viscosity, and friability, recorded. Produced water and organic liquid clarity differences, elevated temperature viscosities, phase separation differences, unreacted feed materials, and wet minerals' physical structure were also reported, together with the pH of the liquid phases. Samples were taken and stored for composition analysis.

Example 8

Benchtop Conversion of Switchgrass Composite

In a pilot run, about 250 g of a switchgrass composite was size-reduced to 1" pieces for input into Parr reactors fitted with a mechanical stirrer to implement the process described herein. The raw feed first underwent first stage depolymerization at 150° C. (~00° F.), 56 psig for a duration of 2.0 h followed by first stage hydrolysis at 260° C. (~500° F.), 701 psig for a duration of 0.5 h. This run yielded about 195.2 g of produced water, 774.4 g of first stage solids, and 31.6 g (by diff.) of gases. The Parr reactor residuals, e.g. produced water, organic liquid, and mineral matrix, was separated using a separation technique selected from hot centrifugation, washing and sieving, screw-drying, decanting, and belt-pressing amongst other techniques.

Products were photographed and physical characteristics, such as product texture, smell, color, viscosity, and friability, recorded. Produced water and organic liquid clarity differences, elevated temperature viscosities, phase separation differences, unreacted feed materials, and wet minerals' physical structure were also reported, together with the pH of the liquid phases. Samples were taken and stored for composition analysis.

Those of ordinary skill in the art will appreciate that the present invention is well adapted to handle feedstock of an origin other than those explicitly described herein, namely other waste streams. While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A process for converting a carbon containing feedstock into at least one useful material, comprising:
preparing a slurry from the feedstock, said feedstock being selected from a group consisting essentially of agricultural waste, animal processing waste, municipal sewage sludge, municipal solid waste, animal by-product and shredder residue;
reacting the slurry in a first reaction to produce a stream comprising at least one solid product, and at least one liquid product, and water, wherein said reacting comprises decomposing and hydrolyzing the slurry, said decomposing occurring at temperatures between about 125-400° C. and pressures between about 20-600 psig, and said hydrolyzing occurring at temperatures between about 200-350° C. and pressures between about 210-800 psig;

an initial separating between the decomposing and hydrolyzing to remove solids, including inorganic materials, and gases from the liquid product before said hydrolyzing;

after said hydrolyzing separating said at least one solid product, said water and said at least one liquid product from said stream; and converting said at least one liquid product into at least one useful material.

2. The process of claim 1, wherein said converting comprises further separating water from the liquid product.

3. The process of claim 2, wherein said converting further comprises a second reaction.

4. The process of claim 3, wherein the second reaction comprises coking at temperatures between about 400-600° C. and pressures between about 15-75 psig.

5. The process of claim 3, wherein the second reaction comprises subjecting the at least one liquid product to one or more processes selected from coking, vis-breaking, and hydrotreating.

6. The process of claim 2, wherein said separating water from said liquid product in the converting step produces a liquid hydrocarbon fuel.

7. The process of claim 6, wherein the feedstock comprises agricultural waste.

8. The process of claim 7, wherein the feedstock comprises animal processing waste.

9. The process of claim 8, wherein the slurry is subjected to temperatures between about 125-260° C. and pressures between about 20-600 psig during said reacting.

10. The process of claim 9, wherein the decomposing occurs at a temperature ranging from about 125-190° C. and a pressure ranging from about 20-600 psig and the hydrolyzing occurs at a temperature ranging from about 200-260° C. and a pressure ranging from about 210-600 psig.

11. The process of claim 10, wherein the decomposing occurs for a duration ranging from about 15-120 minutes and the hydrolyzing occurs for a duration ranging from about 30-60 minutes.

12. The process of claim 6, wherein the feedstock comprises municipal sewage sludge.

13. The process of claim 12, wherein the slurry is subjected to temperatures between about 170-270° C. and pressures between about 100-600 psig during said reacting.

14. The process of claim 13, wherein the decomposing occurs at a temperature ranging from about 170-200° C. and a pressure ranging from about 100-600 psig and the hydrolyzing occurs at a temperature ranging from about 200-270° C. and a pressure ranging from about 210-800 psig.

15. The process of claim 14, wherein the decomposing occurs for a duration ranging from about 15-120 minutes and the hydrolyzing occurs for a duration ranging from about 30-60 minutes.

16. The process of claim 6, wherein the feedstock comprises municipal solid waste.

17. The process of claim 16, wherein the slurry is subjected to temperatures between about 150-350° C. and pressures between about 55-800 psig during said reacting.

18. The process of claim 17, wherein the decomposing occurs at a temperature ranging from about 150-350° C. and a pressure ranging from about 55-250 psig and the hydrolyzing occurs at a temperature ranging from about 200-350° C. and a pressure ranging from about 210-800 psig.

19. The process of claim 18, wherein the decomposing occurs for a duration ranging from about 60-180 minutes and the hydrolyzing occurs for a duration ranging from about 30-60 minutes.

20. The process of claim 6, wherein the feedstock comprises shredder residue.

21. The process of claim 20, wherein the slurry is subjected to temperatures between about 250-400° C. and pressures between about 55-800 psig during said reacting.

22. The process of claim 21, wherein the decomposing occurs at a temperature ranging from about 250-400° C. and a pressure ranging from about 55-250 psig and the hydrolyzing occurs at a temperature ranging from about 200-350° C. and a pressure ranging from about 210-800 psig.

23. The process of claim 22, wherein the decomposing occurs for a duration ranging from about 60-180 minutes and the hydrolyzing occurs for a duration ranging from about 30-60 minutes.

24. The process of claim 7, wherein the agricultural waste comprises one or more selected from: cellulose, hemicellulose, lignin, starch, oligosaccharides and/or monosaccharides.

25. The process of claim 7, wherein the feedstock comprises a lignocellulosic material.

26. The process of claim 25, wherein said feedstock is a grass feedstock.

27. The process of claim 26, wherein the grass feedstock comprises $C_3$ grasses.

28. The process of claim 26, wherein the grass feedstock is a mixed grass feedstock.

29. The process of claim 26, wherein the feedstock comprises one or more selected from the group consisting of: switchgrass, indiangrass, big bluestem, little bluestem, canada wildrye, virginia wildrye, and goldenrod wildflowers.

30. The process of claim 26, wherein the slurry is subjected to temperatures between about 120-270° C. and pressures between about 20-800 psig during said reacting.

31. The process of claim 30, wherein the decomposing occurs at a temperature ranging from about 150-200° C. and a pressure ranging from about 20-600 psig and the hydrolyzing occurs at a temperature ranging from about 200-270° C. and a pressure ranging from about 210-800 psig.

32. The process of claim 31, wherein the decomposing occurs for a duration ranging from about 15-120 minutes and the hydrolyzing occurs for a duration ranging from about 30-60 minute.

33. A process for generating useful materials including a liquid hydrocarbon fuel from carbon containing feedstocks, said feedstock being selected from a group consisting essentially of agricultural waste, animal processing waste, municipal sewage sludge, municipal solid waste, animal by-product and shredder residue, comprising:

decomposing the feedstock to substantially separate organic and inorganic materials therein;

removing solid and gaseous fractions produced during the decomposing to form a liquid mixture;

hydrolyzing the liquid mixture;

separating solids, gases and vapors, and water from the hydrolyzed liquid mixture to form a hydrocarbon liquid; and conditioning the hydrocarbon liquid to form at least a hydrocarbon fuel.

34. The process of claim 33, further comprising slurrying the feedstock prior to said decomposing.

35. The process of claim 33, wherein said decomposing comprises heating the slurried feedstock to a temperature sufficient to reduce viscosity and break down feedstock components into constituent parts while at least substantially avoiding formation of char or ash.

36. The process of claim 35, wherein said decomposing comprises heating the feedstock to a temperature in the range of about 125° C. to about 400° C. for a time in the range of about 15 minutes to about 180 minutes.

37. The process of claim 35, wherein said decomposing occurs in at least two stages.

38. The process of claim 33, wherein said hydrolyzing comprises at least one of breaking peptide linkages in proteins to yield individual amino acid residues, fat degradation into triglycerides, fatty acids and glycerol, deamination and decarboxylation of amino acids, degradation of lignin and cellulose, breaking of halogen or metal salt bonds and breaking of sulfur bonds.

39. The process of claim 38, wherein the hydrolyzing step separates contaminants from the liquid mixture into a water phase.

40. The process of claim 39, wherein the contaminants comprise at least one of arsenic, barium, cadmium, chlorine, chromium, copper, lead, mercury, and zinc.

41. The process of claim 38, wherein said hydrolyzing comprises heating the liquid mixture to a temperature in the range of about 200° C. to about 350° C. at pressures in the range of about 210 psig to about 800 psig for a time in the range of about 30 minutes to about 60 minutes.

42. The process of claim 33, wherein said separating solids, gases and vapors, and water includes flashing the hydrolyzed liquid mixture to a lower temperature and pressure.

43. The process of claim 42, wherein said separating further includes centrifuging the liquid mixture to remove solids and water.

44. The process of claim 33, wherein said conditioning comprises oil polishing.

45. The process of claim 44, wherein said oil polishing comprises removing water from the hydrocarbon liquid.

46. The process of claim 45, wherein said removing water comprises gravity decanting.

47. The process of claim 45, wherein said oil polishing further comprises filtering particulate from the hydrocarbon liquid.

48. The process of claim 42, wherein said conditioning further comprises treatment of the hydorcarbon liquid with a thermal-chemical platform.

49. The process of claim 48, wherein the thermal-chemical platform is selected from the group consisting of vis-breaking, hydrotreating, coking, gasifying and pyrolyzing.

50. The process of claim 33, wherein:
the feedstock comprises animal by-products;
the decomposing occurs at a temperature ranging from about 125-190° C. and a pressure ranging from about 20-600 psig; and
the hydrolyzing occurs at a temperature ranging from about 200-260° C. and a pressure ranging from about 210-800 psig.

51. The process of claim 33, wherein:
the feedstock comprises municipal sewage sludge;
the decomposing occurs at a temperature ranging from about 170-200° C. and a pressure ranging from about 100-600 psig; and
the hydrolyzing occurs at a temperature ranging from about 200-270° C. and a pressure ranging from about 210-800 psig.

52. The process of claim 33, wherein:
the feedstock comprises municipal solid waste;
the decomposing occurs at a temperature ranging from about 150-350° C. and a pressure ranging from about 55-250 psig; and
the hydrolyzing occurs at a temperature ranging from about 200-350° C. and a pressure ranging from about 210-800 psig.

53. The process of claim 33, wherein:
the feedstock comprises shredder residue;
the decomposing occurs at a temperature ranging from about 250-400° C. and a pressure ranging from about 55-250 psig; and
the hydrolyzing occurs at a temperature ranging from about 200-350° C. and a pressure ranging from about 210-800 psig.

54. The process of claim 33, wherein:
the feed stock comprises lingnocellulosic material;
the decomposing occurs at a temperature ranging from about 125-200° C. and a pressure ranging from about 20-600 psig: and
the hydrolyzing occurs at a temperature ranging from about 200-270° C. and a pressure ranging from about 210-800 psig.

55. A process for conversion of shredder residue into at least carbons solids and a liquid hydrocarbon fuel, comprising:
decomposing the shredder residue by application of heat and pressure to produce solids including fixed carbon and a hydrocarbon containing liquid mixture;
separating said solids from the liquid mixture;
fractioning the liquid mixture based on weight to produce at least higher and lower molecular weight fractions;
hydrolyzing at least the higher molecular weight fractions of the liquid mixture by further application of heat and pressure to produce a hydrolyzed hydrocarbon liquid and water mixture;
separating entrained solids particles from the hydrolyzed hydrocarbon liquid and water mixture; and
separating water from the hydrolyzed hydrocarbon liquid to form a liquid hydrocarbon fuel.

56. The process of claim 55, wherein said decomposing comprises reacting the shredder residue at a temperature in the range of about 250-400° C., under a pressure of about 55-250 psig for a time sufficient to decompose non-metallic solids to produce a liquid mixture of hydrocarbons and solids.

57. The process of claim 56, comprising adding a solvent to the shredder residue in connection with said reacting.

58. The process of claim 55, wherein the fractions comprises fractionally distilling the liquid mixture to produce at least a low molecular weight hydrocarbon fraction, a medium molecular weight hydrocarbon fraction and a high molecular weight fraction.

59. The process of claim 55, wherein the hydrolyzing comprises reacting at least the heavier hydrocarbon fractions in the presence of water at a temperature in the range of about 200-350° C. under a pressure of about 210-800 psig for a time sufficient to produce a medium weight hydrocarbon liquid and water mixture;

60. The process of claim 59, further comprising;
determining a contaminant content for the lighter fractions; and
directing the lower molecular weight fractions to said hydrolyzing when contaminant content exceeds a predetermined threshold.

61. The process of claim 60, wherein the contaminant is chlorine.

62. The process of claim 55, further comprising flashing the hydrocarbon liquid and water mixture to a reduced pressure and temperature after said hydrolzing.

63. The process of claim 55, further comprising controlling the reacting of the shredder residue and decomposable liquid to at least substantially avoid the formation of char or ash.

64. The process of claim 55, wherein said separating solids comprises washing solids with a solvent.

65. The process of claim 64, wherein the solvent is a hydrocarbon liquid produced in a later step of said process.

* * * * *